United States Patent
Bench et al.

(10) Patent No.: US 10,841,144 B1
(45) Date of Patent: Nov. 17, 2020

(54) SYSTEMS AND METHODS FOR DATA TRANSFER USING SELF-SYNCHRONIZING QUADRATURE AMPLITUDE MODULATION (QAM)

(71) Applicant: SeeScan, Inc., San Diego, CA (US)

(72) Inventors: Stephanie M. Bench, Carlsbad, CA (US); Roger B. Shaffer, San Diego, CA (US); Mark S. Olsson, La Jolla, CA (US)

(*) Notice: Subject to any disclaimer, the term of this patent is extended or adjusted under 35 U.S.C. 154(b) by 71 days.

(21) Appl. No.: 16/114,020

(22) Filed: Aug. 27, 2018

Related U.S. Application Data

(63) Continuation of application No. 15/483,924, filed on Apr. 10, 2017, now Pat. No. 10,069,667, which is a continuation of application No. 13/609,196, filed on Sep. 10, 2012, now Pat. No. 9,634,878.

(60) Provisional application No. 61/533,155, filed on Sep. 9, 2011, provisional application No. 61/532,517, filed on Sep. 8, 2011.

(51) Int. Cl.
  *H04L 27/34* (2006.01)
  *F17D 5/00* (2006.01)

(52) U.S. Cl.
  CPC ........... *H04L 27/34* (2013.01); *F17D 5/00* (2013.01); *H04L 27/3405* (2013.01); *H04L 27/3455* (2013.01)

(58) Field of Classification Search
  CPC ..... H04L 27/34; H04L 27/04; H04L 27/2626; H04L 27/2627; H04L 1/0041; H04L 2025/03401; H04L 2025/0342
  See application file for complete search history.

(56) References Cited

U.S. PATENT DOCUMENTS

| | | |
|---|---|---|
| 3,813,598 A | 5/1974 | Stuart |
| 3,849,730 A | 11/1974 | Ho |
| 4,574,244 A | 3/1986 | Head |
| 4,987,375 A | 1/1991 | Wu |
| 5,495,203 A | 2/1996 | Harp |
| 5,528,195 A | 6/1996 | Lu |
| 5,598,435 A | 1/1997 | Williams |
| 5,894,334 A | 4/1999 | Strolle |
| 5,966,412 A | 10/1999 | Ramaswamy |
| 6,359,525 B1 | 3/2002 | Mohan |
| 6,493,409 B1 | 12/2002 | Lin |
| 6,934,317 B1 | 8/2005 | Dent |
| 7,263,130 B1 | 8/2007 | Mitlin |
| 7,263,144 B2 | 8/2007 | Sasson |
| 7,283,599 B1 | 10/2007 | Herbig |
| 2007/0204205 A1 | 8/2007 | Miu |

(Continued)

FOREIGN PATENT DOCUMENTS

EP 0 752 185 B 1 7/2002

OTHER PUBLICATIONS

Altera, "Versatile Digital QAM Modulator," White Paper, 2005, Entire Document, Version 1.1, Altera Corporation, San Jose, CA, USA.

(Continued)

*Primary Examiner* — Siu M Lee

(74) *Attorney, Agent, or Firm* — Steven C. Tietsworth, Esq.

(57) ABSTRACT

Quadrature Amplitude Modulation (QAM) apparatus and systems for use in providing images or video via a wired connection in a video inspection system are disclosed.

5 Claims, 34 Drawing Sheets

*(Example Symbol Constellation Having a Non-Uniformly Spaced Rectangular Configuration)*

(56) References Cited

U.S. PATENT DOCUMENTS

| | | |
|---|---|---|
| 2008/0002789 A1 | 1/2008 | Jao |
| 2008/0170640 A1* | 7/2008 | Gao .................... H04L 27/3488 375/302 |
| 2008/0317168 A1 | 12/2008 | Yang |
| 2009/0044083 A1 | 2/2009 | Azenkot |
| 2009/0147839 A1 | 6/2009 | Grenabo |
| 2010/0225752 A1* | 9/2010 | Bench ................. H04L 27/3455 348/61 |

OTHER PUBLICATIONS

Citta, Richard et al, "ATSC Transmission System: VSB Tutorial," Montreuz Symposium Handout, Jun. 12, 1997, pp. 8-9, Zenith Electronics Corporation, USA.

Farhang-Boroujeny, Behrouz et al, Cosine Modulated and Offset QAM Filter Bank Multicarrier Techniques: A Continuous-Time Prospect, Academic Paper, Entire Document, ECE Department, University of Utah, USA.

Hyun, S. K. et al, "Interleaved 5B20 Code for Insertion of Carrier and Clock Pilots in 64-QAM Systems," Electronics Letters, Aug. 29, 1991, pp. 1635-1636, vol. 27, No. 18, Department of Electrical Engineering, Korea Advanced Institute of Science and Technology, Seoul. Korea.

Liu, Qijia et al, "A novel QAM Joint Frequency-Phase Carrier Recovery Method," Academic Paper, IEEE Xplore Digital Library, Feb. 20, 2006, pp. 1617 1621, Department of Electrical Engineering, Tsinghua University, Reijing, P.R. China.

O'Hara, Seam T. et al, "Orthogonal-Coded Selective Mapping (OCSM) for OFDM Peak-to-Average Power Reduction Without Side Information," SDR 04 Technical Conference and Product Exposition, 2004, Systems Technology Center, Syracuse Research Corporation, Syracuse, NY, USA.

Sparano, David, "What Exactly is 8-VSB Anyway?" Tutorial Article, 1997, Harris Corporation Broadcast website, Quincy, Illinois, USA.

Tariq, M. Fahim, et al, "Efficient Implementation of Pilot-Aided 32 QAM for Fixed Wireless and Mobile ISDN Applications," Academic Paper, 2000, UK.

Tariq, M. Fahim, et al, "Performance Comparison of Pilot-Aided and Pilot Symbol Aided QAM over a Mobile Radio Channel," Academic Paper, 2000, UK.

Williams, Thomas H., "Pilot-Assisted Frequency Domain Reciprocal Modulation for Microwave Channels with Dynamic Multipath," IEEE 802.16 Broadband Wireless Access Working Group, Oct. 29, 199, Longmont, CO, USA.

Yamanaka, Kazuya et al, "AMulti-Level QAM Demodulator LSI with Wideband Carrier Recovery and Dual Equalizing Multipath," Scientific Paper, System LSI Laboratory, Mitsubishi Electric Corporation, Hyogo, Japan.

* cited by examiner (Example Symbol Constellation Having Non-Uniformly Spaced Symbol Points and Zero Energy At Symbol Clock Frequency)

(Another Example Symbol Constellation Having Non-Uniformly Spaced Symbol Points and Zero Energy At Symbol Clock Frequency)

*(Example Symbol Constellation Having Non-Uniformly Spaced Symbol Points In Multiple Circular Symbol Arrays with Zero Energy At Symbol Clock Frequency)*

*(Example Symbol Constellation Having a Non-Uniformly Spaced Rectangular Configuration)*

*(Example Symbol Constellation Having a Non-Uniformly Spaced Circular Configuration with Rectangular Symbol Points)*

*(Example Symbol Constellation Having a Non-Uniformly Spaced Circular Configuration and Non-Uniformly Spaced Rectangular Symbol Points)*

*(Example Spectral Density Corresponding to Symbol Constellations Shown in FIGs. 23-25)*

(Example Symbol Constellation Having a Uniformly Spaced
Constellation with Non-Random Symbol Probabilities)

*(Example Symbol Constellation Having Non-Uniformly Spaced Symbol Points and Energy At Symbol Clock Frequency)*

*(Another Example Symbol Constellation Having Non-Uniformly Spaced Symbol Points and Energy At Symbol Clock Frequency)*

*(Example Symbol Constellation Having Non-Uniformly Spaced Symbol Points In Multiple Circular Symbol Arrays with Energy At Symbol Clock Frequency)*

*(Example Symbol Constellation Having a Non-Uniformly Spaced Rectangular Configuration with Energy at Symbol Clock Frequency)*

Example Symbol Constellation Similar to Constellation
2000 But Having Non-Uniformly Spaced Symbol Points
with Finite Energy At Symbol Clock Frequency Example Transmitter & Receiver Modules (Example Spectral Density Corresponding to Symbol Constellations Shown in FIGs. 28-31)

SYSTEMS AND METHODS FOR DATA TRANSFER USING SELF-SYNCHRONIZING QUADRATURE AMPLITUDE MODULATION (QAM)

CROSS-REFERENCE TO RELATED APPLICATIONS

This application is a continuation of and claims priority to co-pending U.S. patent application Ser. No. 15/483,924, entitled SYSTEMS AND METHODS FOR DATA TRANSFER USING SELF-SYNCHRONIZING QUADRATURE AMPLITUDE MODULATION (QAM), filed Apr. 10, 2017, which is a continuation of and claims priority to U.S. patent application Ser. No. 13/609,196, now U.S. Pat. No. 9,634,878, entitled SYSTEMS AND METHODS FOR DATA TRANSFER USING SELF-SYNCHRONIZING QUADRATURE AMPLITUDE MODULATION (QAM), filed Sep. 10, 2012, which claims priority under 35 U.S.C. § 119(c) to U.S. Provisional Patent Application Ser. No. 61/533,155, entitled SYSTEMS AND METHODS FOR DATA TRANSFER USING SELF-SYNCHRONIZING QUADRATURE AMPLITUDE MODULATION (QAM), filed Sep. 9, 2011, and to U.S. Provisional Patent Application Ser. No. 61/532,517, entitled SYSTEMS AND METHODS OF DATA TRANSFER USING SELF-SYNCHRONIZING QUADRATURE AMPLITUDE MODULATION (QAM), filed Sep. 8, 2011. The content of each of these applications is incorporated by reference herein in its entirety for all purposes.

FIELD OF THE INVENTION

This disclosure relates generally to digital communication systems using quadrature amplitude modulation (QAM). More particularly, but not exclusively, the disclosure relates to QAM systems for sending and receiving data in a video pipe inspection system that allow for efficient synchronization between transmitters and receivers by facilitating symbol clock recovery.

BACKGROUND

Analog and digital Quadrature Amplitude Modulation (QAM) methods for amplitude modulating two symbol clocks phase-locked in quadrature have been known and used since the early days of signal processing and are widely used today. For example, analog QAM was used to transfer the chroma component information in the 1953 National Television System Committee (NTSC) and the 1963 Phase Alternating Line (PAL) standard television signals, and a 1977 Compatible QAM variation (C-QUAM) is still used to transfer the stereo difference information in some AM stereo radio signals. More recently, a variety of digital QAM schemes (quantized QAM) were adapted for widespread use in cellular systems and for other wireless applications, including the WiMAX and Wi-Fi 802.11 standards.

Advantageously, digital QAM may be configured with Amplitude-Shift Keying (ASK) to provide many data bits per symbol and thereby increase data transfer rates in a channel without increasing Inter-Symbol Interference (ISI). Amplitude modulating two symbol clocks in quadrature (QAM) can be equivalently viewed as both amplitude modulating and phase modulating a single symbol clock and each such modulation value (amplitude and phase) can be represented as a single point (symbol) on the phase plane diagram, as is well-known in the art. For example, by using two distinct amplitudes and four phase shift states for each of these amplitudes, a single symbol clock cycle can serve to carry one symbol having eight states; equivalent to three bits of information. In this example, a 5 MHz channel baseband can transfer data at 15 Mb/s at the expense of requiring a more robust method for reducing the impact of noise and increasing the Signal-to-Noise Ratio (SNR) to permit recovery of the significantly higher number of discrete signal amplitudes involved in each symbol clock cycle.

Proper separation of the I(t) and Q(t) quadrature components of a digital or analog QAM signal requires the coherent demodulator signal phase at the receiver to be exactly in phase with the received QAM signal carrier. Even a small demodulating phase error introduces crosstalk between the I(t) and Q(t) quadrature components recovered from a digital or analog QAM signal. Both symbol clock and carrier recovery systems in a receiver attempt to derive information about timing from the received signal, often in a similar manner. While carrier recovery is only necessary in a coherent demodulation system, symbol clock recovery is required in all schemes, and accurate clock recovery is essential for reliable data transmission. Confusion often exists between clock and carrier recovery. Clock recovery attempts to synchronize the receiver clock with the baseband symbol rate transmitter clock, whereas carrier recovery attempts to align the receiver local oscillator with the transmitted carrier frequency.

Thus, symbol clock synchronization at the receiver must be handled somehow in any QAM system. Any phase and frequency variations introduced by the channel must be removed at the receiver by properly tuning the sine and cosine components of the local QAM demodulator, which requires a local symbol clock phase reference that is typically provided by some useful version of a local Phase-Locked Loop (PLL). But this local phase reference must somehow be synchronized with the received QAM signal symbol clock. For example, early analog QAM television systems transmit a burst of the color subcarrier after each horizontal synchronization pulse for local clock phase reference synchronization.

The QAM art has evolved in various ways to increase throughput and reliability. A typical QAM data communication system includes a transmitter, a receiver, and an unknown time-invariant channel in which a complex-valued sequence of input data representing a series of symbols selected from a complex symbol alphabet (also denominated a "constellation" on the complex I-Q plane or "phase plane") are sent through the channel to be interpreted by the receiver. Conventional QAM systems assume that channel noise is independent of input data and relatively stationary. Some distortion of the transmitted signal is typical of non-ideal channel media including wired and wireless connections.

The QAM demodulator is by far the most complex element of the QAM system. The demodulator must detect the phase and amplitude of the received signal, decode each symbol based on the phase and amplitude of the baseband symbol clock and then finally convert the symbol data back to a serial stream. The baseband symbol clock must be recovered to complete the symbol demodulation. Clock recovery is a recurring problem with any digital signal processing system.

The QAM art is replete with improvements intended to increase channel data transfer capacity while reducing receiver cost and complexity. There is an undesirable level of complexity and overhead in conventional QAM receivers for filtering signals and recovering baseband symbol clock synchronization. In applications where channel bandwidth is limited, such as pipe inspection system channels with a handful of hard-wired conductors, additional problems include correcting for a variable-length copper channel and limiting camera-end hardware complexity to facilitate the small package size necessary for movement inside pipes.

Practitioners in the art have proposed a wide variety of methods simplifying the QAM carrier and clock recovery problem. For example, in U.S. Publ. Appl. No. 2009/0,147,839 A1, Grenabo discloses an improved phase error detector for a QAM receiver but neither considers nor suggests any symbol constellation adjustments. Similarly, in U.S. Pat. No. 7,283,599 B1, Herbig discloses an improved phase error detector for a QAM receiver suitable for improving phase locking characteristics but neither considers nor suggests using an asymmetric symbol constellation. And, in U.S. Pat. No. 4,987,375, Wu et al. disclose a carrier lock detector for a QAM system employing symbol detection ratios useful for improved reliability at low SNR but neither consider nor suggest any symbol constellation adjustments.

Practitioners in the art have also proposed a wide variety of methods for improving QAM system performance through manipulation of the symbol constellations. For example, in U.S. Publ. Appl. No. 2008/0,317,168 A1, Yang et al. disclose an integer spreading rotation technique for shaping symmetric QAM symbol constellations to enhance signal space diversity but neither consider nor suggest techniques for improving baseband symbol clock recovery at the receiver. These practitioners appear to firmly believe that the QAM symbol constellation must be as symmetric as possible about the phase plane origin to minimize the system Bit-Error Rate (BER).

Some practitioners have found certain slight asymmetries in the QAM symbol constellation to have some utility but have neither taught nor suggested using changes to the symbol constellation to improve baseband symbol clock recovery in QAM system receivers. For example, O'Hara et al. ("Orthogonal-Coded Selective Mapping (OCSM) For OFDM Peak-To-Average Power Reduction Without Side Information," Proceeding of the SDR 04 Technical Conference and Product Exposition. 2004) propose a selective mapping (SM) method for reducing peak-to-average power (PAP) in Orthogonal Frequency Division Multiplexing (OFDM) systems that is achieved by introducing a very small asymmetry to the QAM subcarrier constellations before scrambling. But O'Hara et al. take pains to point out that this does not mean that the QAM subcarrier constellations are no longer zero-mean over time because the subsequent antipodal scrambling process returns the subcarrier symbol constellations to zero-mean symmetry again before transmission.

Other practitioners have suggested using a pilot tone in a QAM channel to improve channel estimation. For example, Tariq et al. ("Efficient Implementation Of Pilot-Aided 32 QAM For Fixed Wireless And Mobile ISDN Applications," Vehicle Tech. Conf. Proc., 2000, VTC 2000-Spring Tokyo. 2000 IEEE 51.sup.st, Vol. 1, pp. 680-684) disclose an improved QAM system where a gap is created in the center of the information bearing signal spectrum and a pilot tone inserted therein before transmission. Tariq et al. neither teach nor suggest that their pilot tone has any relationship to the QAM baseband symbol clock; in fact, they teach using the pilot tone at the receiver only for the purpose of channel estimation and compensation. In U.S. Pat. No. 3,813,598, Stuart discloses a pilot-tone aided QAM carrier recovery system that adds a pilot tone to the QAM transmission either above or below the QAM modulator output spectrum, which may be recovered and used to deduce channel distortion effects at the receiver, but Stuart neither considers nor suggests any manipulation of the symmetric QAM symbol constellation for baseband symbol clock recovery.

In U.S. Pat. No. 6,493,490 B1, Lin et al. disclose an improved phase detector for carrier recovery in a dual-mode QAM/VSB (Vestigial Sideband) receiver system. Lin et al. discuss creating a pilot-tone aided Offset-QAM signal by first delaying the Q component by one half of a symbol, thereby offsetting the Q rail, in time, from information on the I rail, but neither consider nor suggest using an asymmetric QAM symbol constellation. Hyun et al. ("Interleaved 5820 Code For Insertion Of Carrier And Clock Pilots In 64-QAM Systems," IEEE Electronics Letters, Vol. 27, No. 18, pp. 1635-6, 29 Aug. 1991) disclose a method for selecting symbols from a symmetric diamond-shaped symbol constellation to introduce a spectral null at the Nyquist frequency, thereby permitting the detection of a low-power clock pilot signal inserted at the null frequency, but neither consider nor suggest using an asymmetric QAM symbol constellation.

SUMMARY

This disclosure relates generally to digital communication systems using quadrature amplitude modulation (QAM). More particularly, but not exclusively, the disclosure relates to QAM systems for sending and receiving data in a video pipe inspection system that allow for efficient synchronization between transmitters and receivers by facilitating symbol clock recovery.

For example, in one aspect the disclosure relates to a method for providing a self-synchronizing Quadrature Amplitude Modulation (QAM) signal, such as in a video inspection system or other audio, video, or data transmission system. The method may include, for example, receiving, at a QAM transmitter module, a digital data stream. The digital data stream may represent video, audio, sensor, or other data or information, and may be compressed or uncompressed. The method may include mapping the digital data stream to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency. The method may further include sending the mapped data stream, such as through a cable or other wired connection or, in some embodiments, via a wireless connection.

In another aspect, the disclosure relates to a QAM transmitter. The QAM transmitter may include, for example, a memory, and a processor coupled to the memory. The processor may be configured, in conjunction with the memory, to receive a digital data stream, and map the digital data stream to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency.

In another aspect, the disclosure relates to a method for providing a self-synchronizing Quadrature Amplitude Modulation (QAM) signal from a QAM transmitter module, such as in a video inspection system or other audio, video, or data transmission system. The method may include, for example, receiving a digital data stream. The digital data stream may represent video, audio, sensor, or other data or information, and may be compressed or uncompressed. The method may further include mapping the digital data stream to ones of a plurality of symbol values corresponding to points on a circular symbol constellation including orthogonal I and Q axes, to generate a mapped data stream. The points defining the circular symbol array may be non-uniformly spaced such that the mapped data stream has finite energy at a symbol clock frequency. The method may further include sending the mapped data stream, such as through a cable or other wired connection or, in some embodiments, via a wireless connection.

In another aspect, the disclosure relates to a QAM Transmitter. The QAM transmitter may include, for example, a memory and a processor coupled to the memory. The processor, in conjunction with the memory, may be configured to receive a digital data stream, and map the digital data stream to ones of a plurality of symbol values corresponding to points on a circular symbol constellation including orthogonal I and Q axes, to generate a mapped data stream. The points defining the circular symbol array may be non-uniformly spaced such that the mapped data stream has finite energy at a symbol clock frequency.

In another aspect, the disclosure relates to a communications apparatus. The communications apparatus may include an input for receiving digital data, a Quadrature Amplitude Modulation (QAM) module coupled to the input configured to separate the digital data stream into in-phase (I) and quadrature (Q) data streams, a mapping module for mapping the I and Q data streams to a plurality of symbol values corresponding to points of a circular symbol constellation, wherein the points of the circular symbol constellation are non-uniformly spaced on the circular symbol constellation so as to facilitate symbol clock recovery, and a transmitter module configured to send the symbol values as a transmitted signal.

In another aspect, the disclosure relates to a method for inspecting a hidden or buried pipe or other cavity. The method may include, for example, generating, from an imaging element of a camera head, a video data stream. The video data stream may be compressed in the camera head. The method may further include mapping the digital data stream to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency. The method may further include sending the mapped data stream, such as through a cable or other wired connection or, in some embodiments, via a wireless connection, to a camera control unit, display, or other electronic computing system. The method may further include receiving the transmitted signal at a QAM receiver module of the camera control unit, display, or other electronic computing system. The method may further include applying the transmitted signal to a non-linearity module to recover the symbol clock. The method may further include decoding the received transmitted signal using the recovered symbol clock. The non-linear module may be a square-law processing module or other non-linear processing module configured to square or otherwise apply a non-linearity to the received transmitted signal to recover a symbol clock signal. Recovering the symbol clock may include narrowband filtering an output of the non-linearity device, and applying the output of the narrowband filter to a phase-locked loop to generate the symbol clock. The method may further include extracting the video data stream using the generated symbol clock. The method may further include providing the video stream as one or more images or a video on a display device.

In another aspect, the disclosure relates to apparatus and systems to implement the above-described methods, in whole or in part.

In another aspect, the disclosure relates to means for implementing the above-described methods, in whole or in part.

In another aspect, the disclosure relates to computer-readable media including instructions for causing a computer to implement the above-described methods, in whole or in part.

Various additional aspects, details, features, and functions are further described below in conjunction with the appended Drawings.

BRIEF DESCRIPTION OF THE DRAWINGS

The foregoing, together with other objects, features and advantages of this invention, can be better appreciated with reference to the following specification, claims and the accompanying drawings. For a more complete understanding of this invention, reference is now made to the following detailed description of the embodiments as illustrated in the accompanying drawings, in which like reference designations represent like features throughout the several views and wherein:

DETAILED DESCRIPTION OF EMBODIMENTS

Overview

Figure 1:
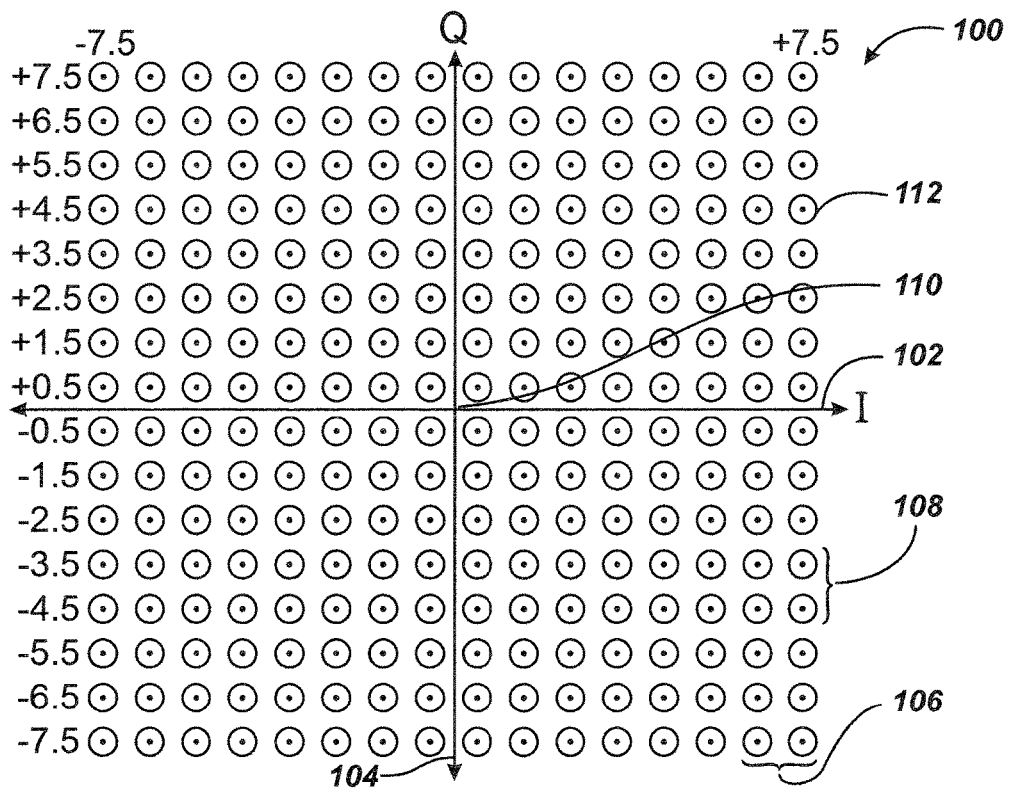
FIG. 1 is a schematic diagram illustrating a typical 256-QAM Type III symmetrical symbol constellation from the prior art.

Various aspects of this disclosure relate to the unexpectedly advantageous observation that operating a Quadrature Amplitude Modulation (QAM) transmitter modulator that creates an asymmetric two-dimensional (2-D) QAM symbol constellation provides baseband symbol clock signal leakage sufficient to facilitate quick and simple baseband symbol clock recovery at the QAM receiver without significantly degrading the system Bit-Error Rate (BER) or, in a symmetric symbol constellation, can provide a signal from which a clock may be recovered at a receiver by applying it to a non-linearity. The QAM methods of this invention may be used to flatten the system BER curve to reduce the Signal-to-Noise Ratio (SNR) required to provide lower BERs by as much as several decibels (dB). This is a profound and unexpected observation that has advantageous applications in many QAM systems, including (without limitation) pipe inspection systems, cell phone systems, commercial broadcast systems, Wi-Fi systems and many other systems requiring clock synchronization.

In one aspect, the disclosure relates to providing QAM channel baseband symbol clock recovery that reduces the system BER, complexity and computational load in certain SNR regions.

Various aspects as described herein may be extended to any system generally relying on QAM methods to encode a transmitted signal. More specifically, the QAM method of this invention may be adapted to improve the lower functional layers (the physical transmission, reception, media correction and timing recovery elements) in certain SNR regions of any data transmission and reception system using a variant of QAM or any of its derivatives that employ two-dimensional (2-D) symbol constellations, such as Orthogonal Frequency-Division Multiplexing (OFDM), Quotient Quadrature Amplitude Modulation (QQAM), as well as degenerate cases of QAM, such as N-Phase-Shift Keying (N-PSK) and/or Quadrature Phase-Shift Keying (QPSK). Accordingly, it is an advantage of this invention that systems employ amplitude only modulation or phase only modulation. In the case of phase only modulation, the terms "offset", "offsets", and "offsetting" may be used herein to refer to offsets with respect to phase. For example, in the case of phase shift only modulation, the amplitude offset as described herein may also refer to a phase offset. In particular, constellation points for N-Phase-Shift Keying (4-PSK) or QPSK are usually positioned with uniform angular spacing in a circular constellation at 0 degrees, 90 degrees, 180 degrees, and 270 degrees. With the amplitude held constant, the offset referred to are, for example, positioned at 60 degrees and 240 degrees. Except for the improved BER in certain SNR regions, the QAM methods described herein do not affect the higher QAM system functional layers known in the art, such as forward error correction coding, symbol scrambling, symbol mapping, etc.

In another aspect, various effects of the QAM channel characteristics can be automatically corrected at the receiver without additional receiver complexity or cost.

In another aspect, in a pipe inspection system with limited camera-transmitter space, the processing complexity may be constrained to the QAM receiver, reducing space and complexity requirements for the camera-transmitter.

In another aspect, the disclosure relates to methods for transferring data through the signal channel including the steps of encoding the data to produce a first baseband modulating signal I(t) and a second baseband modulating signal Q(t) whose amplitudes together represent a time series of complex symbols (I, Q) each selected from a two-dimensional (2-D) constellation of symbols distributed on the phase plane about the origin such that at least one of the baseband modulating signals has a substantially non-zero mean amplitude; multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature; summing the first and second modulation product signals to produce a transmitter output signal; coupling the transmitter output signal through the signal channel to the data receiver; and demodulating the first and second modulation product signals at the data receiver to recover the series of complex symbols (I, Q).

In another aspect, the disclosure relates to a communication system including a data transmitter having an input for accepting data, a Quadrature Amplitude Modulation (QAM) encoder coupled to the data input for producing, responsive to the data, a first baseband modulating signal I(t) and a second baseband modulating signal Q(t) whose amplitudes together represent a time series of complex symbols (I, Q) each selected from a two-dimensional (2-D) constellation of symbols distributed on the phase plane about the origin such that at least one of the baseband modulating signals has a substantially non-zero mean amplitude, a QAM modulator coupled to the QAM encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal, and an output for coupling the transmitter output signal to a signal channel; and a data receiver having a signal input coupled to the signal channel for accepting the transmitter output signal, and a QAM demodulator coupled to the signal input for recovering the series of complex symbols (I, Q) from the first and second modulation product signals.

In another aspect, this disclosure relates to a data modulator for a video transmitter including an input for accepting data; a Quadrature Amplitude Modulation (QAM) encoder coupled to the data input for producing, responsive to the data, a first baseband modulating signal I(t) and a second baseband modulating signal Q(t) whose amplitudes together represent a time series of complex symbols (I, Q) each selected from a two-dimensional (2-D) constellation of symbols distributed on the phase plane about the origin such that at least one of the baseband modulating signals has a substantially non-zero mean amplitude; and a QAM modulator coupled to the QAM encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal.

In another aspect, the disclosure relates to a pipe inspection system including a video transmitter having a video camera adapted to produce video data, and a QAM modulator coupled to the video camera, including a symbol encoder for producing, responsive to the video data, a first baseband modulating signal $I_T(t)$ and a second baseband modulating signal $Q_T(t)$ whose amplitudes together represent a time series of complex transmitter symbols ($I_T(t)$, $Q_T(t)$) each selected from a two-dimensional (2-D) constellation of symbols distributed on the phase plane about the origin such that at least one of the baseband modulating signals has a substantially non-zero mean amplitude, a baseband symbol clock oscillator for producing first and second baseband symbol clock signals generally fixed in quadrature, a dual multiplier coupled to the symbol encoder and baseband symbol clock oscillator for multiplying the first baseband modulating signal $I_T(t)$ by the first baseband symbol clock signal to produce a first modulation product signal and for multiplying the second baseband modulating signal $Q_T(t)$ by the second baseband symbol clock signal to produce a second modulation product signal, a summer coupled to the dual multiplier for summing the first and second modulation product signals to produce a transmitter output signal, and a filter coupled to the summer for producing a filtered transmitter output signal; a mechanical cable assembly coupled to the video transmitter for urging the video transmitter through a pipe under inspection and including an electrical conductor coupled to the QAM modulator for accepting the filtered transmitter output signal; and a video receiver having a signal conditioner coupled to the electrical conductor for producing a baseband receiver input signal representing the filtered transmitter output signal, a QAM demodulator coupled to the signal conditioner, including a baseband symbol clock detector for detecting the first baseband symbol clock signal from the receiver input signal, a baseband symbol clock recovery oscillator coupled to the baseband symbol clock detector for producing a first recovered baseband symbol clock signal generally synchronized with the first baseband symbol clock signal and for producing a second recovered baseband symbol clock signal generally fixed in quadrature with the first recovered baseband symbol clock signal, a dual multiplier coupled to the baseband symbol clock recovery oscillator for multiplying the baseband receiver input signal by the first and second recovered baseband symbol clock signals to produce first and second demodulation product signals, respectively, a dual filter coupled to the dual multiplier for producing, responsive to the first and second demodulation product signals respectively, first and second baseband demodulated signals, $I_R(t)$ and $Q_R(t)$, whose amplitudes together represent a time series of complex receiver symbols $(I_R, Q_R)$, and a decoder coupled to the QAM demodulator for recovering the video data from the first and second demodulated signals, $I_R(t)$ and $Q_R(t)$, and a video display coupled to the QAM demodulator for producing images responsive to the video data.

In another aspect, the disclosure relates to a method for providing a self-synchronizing Quadrature Amplitude Modulation (QAM) signal. The method may include, for example, receiving a digital data stream and mapping the digital data stream to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency. The method may further include sending the mapped data stream.

In another aspect, the disclosure relates to a method for providing a self-synchronizing Quadrature Amplitude Modulation (QAM) signal. The method may include, for example, receiving a digital data stream and mapping the digital data stream to ones of a plurality of symbol values corresponding to points on a circular symbol constellation including orthogonal I and Q axes, to generate a mapped data stream. The points defining the circular symbol array may be non-uniformly spaced such that the mapped data stream has finite energy at a symbol clock frequency. The method may further include sending the mapped data stream.

In another aspect, the disclosure relates to a communications apparatus. The communication apparatus may include, for example, an input module for receiving digital data, a Quadrature Amplitude Modulation (QAM) module coupled to the input configured to separate the digital data stream into in-phase (I) and quadrature (Q) data streams, a mapping module for mapping the I and Q data streams to a plurality of symbol values corresponding to points of a circular symbol constellation, wherein the points of the circular symbol constellation are non-uniformly spaced on the circular symbol constellation so as to facilitate symbol clock recovery, and a transmitter module configured to send the symbol values as a transmitted signal.

In another aspect, the disclosure relates to a self-synchronizing communication system. The communication system may include, for example, a data transmitter which may include an input for accepting data, a Quadrature phase-shift keying (QPSK) encoder coupled to the data input for producing, responsive to the data, a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a substantially non-zero mean phase, a QPSK modulator coupled to the QPSK encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal, and an output for coupling the transmitter output signal to a signal channel. The communication system may further include a data receiver, including a signal input coupled to the signal channel for accepting the transmitter output signal, and a QPSK demodulator coupled to the signal input for recovering the series of complex symbols (I, Q) from the first and second modulation product signals.

In another aspect, the disclosure relates to a communication system for transferring data through a signal channel to a data receiver including a data transmitter. The data transmitter may include, for example, an input for accepting data, a Quadrature phase-shift keying (QPSK) encoder coupled to the data input for producing, responsive to the data, a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a phase representation that is substantially non-uniformly distributed about a phase circle, a QPSK modulator coupled to the QPSK encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal whose summation produces a substantially circular phase constellation, and an output for coupling the transmitter output signal through the signal channel to the data receiver.

In another aspect, the disclosure relates to a remote inspection system including a video transmitter coupled through a signal channel to a video receiver and a corresponding method for transferring a video signal through the signal channel. The method may include, for example, encoding the video data to produce a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a phase representation that is substantially non-uniformly distributed about a phase circle, multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, summing the first and second modulation product signals to produce a transmitter output signal whose summation produces a substantially circular symbol phase constellation, coupling the transmitter output signal through the signal channel to the data receiver, and demodulating the first and second modulation product signals at the data receiver to recover the series of complex symbols Q).

In another aspect, the disclosure relates to a remote inspection system including a video transmitter coupled through a signal channel to a video receiver and a data modulator in the video transmitter for transferring a video signal through the signal channel. The data modulator may include, for example, an input for accepting data, a Quadrature phase-shift keying (QPSK) encoder coupled to the data input for producing, responsive to the data, a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a phase representation that is substantially non-uniformly distributed about a symbol constellation phase circle, and a QPSK modulator coupled to the QPSK encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal whose summation produces a substantially circular phase constellation.

In another aspect, the disclosure relates to a remote inspection system including a video transmitter. The video transmitter may include, for example, a video camera for producing video data, and a Quadrature phase-shift keying (QPSK) module coupled to the video camera. The QPSK module may include a symbol encoder coupled to the video camera for producing, responsive to the video data, a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a phase representation that is substantially non-uniformly distributed about a phase circle, a QPSK modulator coupled to the QPSK encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the first and second baseband symbol clock signals are generally fixed in quadrature, a summer circuit coupled to the QPSK modulator for summing the first and second modulation product signals to produce a transmitter output signal whose summation produces a substantially circular phase constellation, and a signal output for coupling the transmitter output signal to a signal channel. The system may further include a video receiver, which may include a video signal input coupled to the signal channel for producing a receiver input signal responsive to the transmitter output signal, a QPSK demodulator coupled to the video signal input for recovering the video data from the receiver input signal, and a video display coupled to the QPSK demodulator for producing images responsive to the video data.

In another aspect, the disclosure relates to a pipe inspection system with a video transmitter. The video transmitter may include, for example, a video camera adapted to produce video data, and a Quadrature phase-shift keying (QPSK) modulator coupled to the video camera, the modulator including a symbol encoder for producing, responsive to the video data, a first baseband modulating signal IT(t) and a second baseband modulating signal QT(t) whose phases together represent a time series of complex transmitter symbols (IT, QT) each selected from a two-dimensional (2-D) constellation of symbols distributed on the phase plane about the origin such that at least one of the baseband modulating signals has a phase representation that is substantially non-uniformly distributed about a phase circle, a baseband symbol clock oscillator for producing first and second baseband symbol clock signals generally fixed in quadrature, a dual multiplier coupled to the symbol encoder and baseband symbol clock oscillator for multiplying the first baseband modulating signal IT(t) by the first baseband symbol clock signal to produce a first modulation product signal and for multiplying the second baseband modulating signal QT(t) by the second baseband symbol clock signal to produce a second modulation product signal, a summer coupled to the dual multiplier for summing the first and second modulation product signals to produce a transmitter output signal whose summation produces a substantially circular phase constellation, and a filter coupled to the summer for producing a filtered transmitter output signal. The system may further include a mechanical cable assembly coupled to the video transmitter for urging the video transmitter through a pipe under inspection and including an electrical conductor coupled to the QPSK modulator for accepting the filtered transmitter output signal.

In another aspect, the disclosure relates to a method for providing a self-synchronizing Quadrature Amplitude Modulation (QAM) signal, such as in a video inspection system or other audio, video, or data transmission system. The method may include, for example, receiving, at a QAM transmitter module, a digital data stream. The digital data stream may represent video, audio, sensor, or other data or information, and may be compressed or uncompressed. The method may include mapping the digital data stream to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency. The method may further include sending the mapped data stream, such as through a cable or other wired connection or, in some embodiments, via a wireless connection.

The circular symbol constellation may be, for example, a four or more point array defined on a circle. Two or more symbol pairs may be non-uniformly spaced on the circle. The two or more symbol pairs may be in a mirror symmetry configuration about the I and/or Q axes. Alternately, the circular symbol constellation may include two or more circles with a plurality of symbols disposed thereon. Two or more symbol pairs may be non-uniformly spaced on one or more of the two or more circles. The two or more symbol pairs may be in a mirror symmetry configuration about the I and/or Q axes.

The circular symbol constellation may include, for example, a first circle and a second circle. The digital data stream may be mapped to points on the first circle and the second circle.

A portion of the digital data may, for example, be further mapped to ones of a plurality of symbol values corresponding to points on a rectangular or other non-circular symbol constellation. The symbol constellation may further include one or more restricted symbols. The restricted symbols may be used for receiver tuning, such as being provided only during a pre-determined window in a signaling frame.

The method may further include, for example, receiving the transmitted signal at a QAM receiver module. The method may further include applying the transmitted signal to a non-linearity module to recover the symbol clock. The method may further include decoding the received transmitted signal using the recovered symbol clock. The non-linear module may be a square-law processing module or other non-linear processing module configured to square or otherwise apply a non-linearity to the received transmitted signal to recover a symbol clock signal. The recovering the symbol clock may includes narrowband filtering an output of the non-linearity device, and applying the output of the narrowband filter to a phase-locked loop to generate the symbol clock.

The digital data stream may be, for example, a video data stream generated from a pipe inspection imaging element/camera. The method may further include compressing the video data stream in a camera head before providing the video data stream to the QAM module.

In another aspect, the disclosure relates to a machine readable medium that may include, for example, instructions for causing a processor or computer of a QAM transmitter module to receive a digital data stream, and map the digital data stream to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency.

In another aspect, the disclosure relates to a QAM transmitter. The QAM transmitter may include, for example, a memory, and a processor coupled to the memory. The processor may be configured, in conjunction with the memory, to receive a digital data stream, and map the digital data stream to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency.

The QAM transmitter may further include a camera head for enclosing the memory and processor. The QAM transmitter may further include a video compression module in the camera head for compressing the digital data stream before the digital data stream is mapped to the ones of a plurality of symbol values. The QAM transmitter may further include an interface module to couple a transmitter output signal to a transmission cable or wire. The transmission cable or wire may be coupled to a camera control unit or other video display device or electronic computing system.

In another aspect, the disclosure relates to a method for providing a self-synchronizing Quadrature Amplitude Modulation (QAM) signal from a QAM transmitter module, such as in a video inspection system or other audio, video, or data transmission system. The method may include, for example, receiving a digital data stream. The digital data stream may represent video, audio, sensor, or other data or information, and may be compressed or uncompressed. The method may further include mapping the digital data stream to ones of a plurality of symbol values corresponding to points on a circular symbol constellation including orthogonal I and Q axes, to generate a mapped data stream. The points defining the circular symbol array may be non-uniformly spaced such that the mapped data stream has finite energy at a symbol clock frequency. The method may further include sending the mapped data stream, such as through a cable or other wired connection or, in some embodiments, via a wireless connection.

The circular symbol constellation may be, for example, a four or more point array defined on a circle. Two or more symbol pairs may be non-uniformly spaced on the circle. Alternately, the circular symbol constellation may include two or more circles with a plurality of symbols disposed thereon. The two or more symbol pairs may be non-uniformly spaced on one or more of the two or more circles.

The circular symbol constellation may include, for example, a first circle and a second circle. The digital data stream may be mapped to points on the first circle and the second circle.

A portion of the digital data may, for example, be further mapped to ones of a plurality of symbol values corresponding to points on a rectangular or other non-circular symbol constellation. The symbol constellation may further include one or more restricted symbols. The restricted symbols may be used for receiver tuning, such as being provided only during a pre-determined window in a signaling frame.

The method may further include, for example, receiving the transmitted signal. The method may further include recovering a symbol clock signal from the received transmitted signal. The method may further include decoding the received transmitted signal using the recovered symbol clock. The recovering the symbol clock may include narrowband filtering the received transmitted signal, and applying the output of the narrowband filter to a phase-locked loop to generate the symbol clock.

In another aspect, the disclosure relates to a machine readable medium including instructions for causing a processor or computer to receive a digital data stream, and map the digital data stream to ones of a plurality of symbol values corresponding to points on a circular symbol constellation including orthogonal I and Q axes, to generate a mapped data stream. The points defining the circular symbol array may be non-uniformly spaced such that the mapped data stream has finite energy at a symbol clock frequency.

In another aspect, the disclosure relates to a QAM Transmitter. The QAM transmitter may include, for example, a memory and a processor coupled to the memory. The processor, in conjunction with the memory, may be configured to receive a digital data stream, and map the digital data stream to ones of a plurality of symbol values corresponding to points on a circular symbol constellation including orthogonal I and Q axes, to generate a mapped data stream. The points defining the circular symbol array may be non-uniformly spaced such that the mapped data stream has finite energy at a symbol clock frequency.

In another aspect, the disclosure relates to a communications apparatus. The communications apparatus may include an input for receiving digital data, a Quadrature Amplitude Modulation (QAM) module coupled to the input configured to separate the digital data stream into in-phase (I) and quadrature (Q) data streams, a mapping module for mapping the I and Q data streams to a plurality of symbol values corresponding to points of a circular symbol constellation, wherein the points of the circular symbol constellation are non-uniformly spaced on the circular symbol constellation so as to facilitate symbol clock recovery, and a transmitter module configured to send the symbol values as a transmitted signal.

In another aspect, the disclosure relates to a method for inspecting a hidden or buried pipe or other cavity. The method may include, for example, generating, from an imaging element of a camera head, a video data stream. The video data stream may be compressed in the camera head. The method may further include mapping the digital data stream to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency. The method may further include sending the mapped data stream, such as through a cable or other wired connection or, in some embodiments, via a wireless connection, to a camera control unit, display, or other electronic computing system. The method may further include receiving the transmitted signal at a QAM receiver module of the camera control unit, display, or other electronic computing system. The method may further include applying the transmitted signal to a non-linearity module to recover the symbol clock. The method may further include decoding the received transmitted signal using the recovered symbol clock. The non-linear module may be a square-law processing module or other non-linear processing module configured to square or otherwise apply a non-linearity to the received transmitted signal to recover a symbol clock signal. The recovering the symbol clock may includes narrowband filtering an output of the non-linearity device, and applying the output of the narrowband filter to a phase-locked loop to generate the symbol clock. The method may further include extracting the video data stream using the generated symbol clock. The method may further include providing the video stream as one or more images or a video on a display device.

In another aspect, the disclosure relates to apparatus and systems to implement the above-described methods, in whole or in part.

In another aspect, the disclosure relates to means for implementing the above-described methods, in whole or in part.

In another aspect, the disclosure relates to computer-readable media including instructions for causing a computer to implement the above-described methods, in whole or in part.

Various additional aspects, details, features, and functions are further described below in conjunction with the appended Drawings.

Various details of QAM signaling and data compression as described herein may be included in embodiments of video inspection systems and devices in conjunction with the disclosures of co-assigned patent applications including U.S. Utility patent application Ser. No. 12/715,684, entitled METHOD AND APPARATUS FOR HIGH-SPEED DATA TRANSFER EMPLOYING SELF-SYNCHRONIZING QUADRATURE AMPLITUDE MODULE, filed Mar. 2, 2010, U.S. Provisional Patent Application Ser. No. 61/157,884, entitled HIGH-BANDWIDTH SELF-CORRECTING QAM, filed on Mar. 5, 2009, as well as U.S. patent application Ser. No. 12/399,859, entitled PIPE INSPECTION SYSTEM WITH SELECTIVE IMAGE CAPTURE, filed Mar. 6, 2009. The content of each of these applications is hereby incorporated by reference herein in its entirety.

Quadrature Amplitude Modulators

Quadrature Amplitude Modulation (QAM) methods, apparatus, and systems including a QAM transmit modulator, which may include an unbalanced mixer or other apparatus, to generate an output signal using an asymmetric two-dimensional (2-D) QAM symbol constellation is disclosed. The asymmetrical symbol constellation provides baseband symbol clock signal leakage sufficient to facilitate quick and simple baseband symbol clock recovery and signal channel compensation at the QAM receiver without significantly degrading the system bit-error rate (BER). While slightly degrading static BER, overall system performance may be improved when considering baseband symbol clock recovery and received signal compensation for an imperfect signal channel, thereby allowing QAM to be deployed in systems where QAM is otherwise prohibitively expensive and improves overall system performance for any existing QAM system application without additional bandwidth, cost or complexity. The unbalanced mixer may also refer to offset phases in the case of a circular constellation and corresponding hardware and software to generate such offset phases. Depending on the specific asymmetry of the constellation, the clock may be recovered by doubling the input signal to produce a component at twice the incoming frequency, or directly for asymmetric constellations that produce a component at the incoming frequency.

Digital Quadrature Amplitude Modulation (QAM) schemes may be better understood with reference to the well-known two-dimensional (2-D) QAM symbol constellation diagram showing the QAM symbol states each represented as two (I and Q) amplitudes mapped as points on a complex I-Q plane (herein also denominated "the phase plane"). These 2-D symbol constellation mappings may also be represented as a radius amplitude and a phase angle measured from the phase plane origin, for example, but are generally understood to represent two amplitudes measured from the phase plane origin along the respective orthogonal I and Q axes. In QAM systems, the 2-D symbol constellation states are often arranged in a symmetrical square grid with equal vertical and horizontal spacing, although many other symmetrical configurations are known to be useful (e.g., Cross-QAM). As digital data are usually binary, the number of states (points or symbols) in the constellation is usually a power of two. Because the digital QAM symbol constellation is usually square, the common grids are numbered in powers of four; providing us with 16-QAM, 64-QAM, and 256-QAM systems, etc. These well-known square QAM symbol constellations go as high as 4096-QAM, which provides 4 kb/symbol with 64 different amplitude levels in both I and Q. With a higher-order constellation, the QAM system can transmit more bits per symbol but the points are more closely spaced for the same mean constellation energy and are thus more susceptible to noise and other corruption, producing higher bit error rates. Thus, higher-order QAM delivers more data less reliably than lower-order QAM for a given mean constellation energy.

These square symbol constellations are also denominated Type III QAM constellations. A Type I QAM symbol constellation has states arranged symmetrically about the phase plane origin along equally-spaced radial lines extending out from the phase plane origin with the same number of states in each of several concentric circles. A Type II QAM symbol constellation is similar to the Type I but reduces the number of states on the inner concentric circles (because phase angles detection is less accurate at lower amplitudes) while retaining symmetry about the phase plane origin. Type III QAM symbol constellations are square and centered on the phase plane origin. Each state is a 2-D value (I, Q) representing one of "n" amplitudes in I-space and one of "n" amplitudes in Q-space. It graphically represents each QAM symbol with amplitudes alone and the implicit phase angle defined on the phase plane by arctan(I/Q) arises only because of the 2-D representation of the amplitude pair (I, Q).

FIG. 1 is a schematic diagram illustrating a typical 256-QAM Type III constellation 100 from the prior art. In this "square" constellation, the I-space values are represented as sixteen amplitudes ranging from −7.5 units to +7.5 units spaced along the I-axis 102 and the Q-space values are represented as the same sixteen amplitude values spaced along the Q-axis 104. The I-space values are equally spaced by 1.0 unit as exemplified by the spacing 106 and the Q-space values are equally spaced by the same amount as exemplified by the spacing 108. I-axis 102 and Q-axis 104 cross orthogonally at the phase plane origin 110. Each symbol state is represented as a finite region about a point (I, Q), as exemplified by the symbol state 112, which represents eight bits of data; four bits encoded in each of the sixteen amplitude values reserved for I and four bits encoded in each of the sixteen amplitude values reserved for Q. Constellation 100 is disposed with the I-space and Q-space ranges symmetrically centered about phase plane origin 110 such that any I-space baseband modulating signal I(t) and Q-space baseband modulating signal Q(t) together representing a random time-series of (I, Q) symbols will both have zero-mean amplitudes (no DC components) to eliminate clock leakage in the manner well-known in the art.

Figure 2:
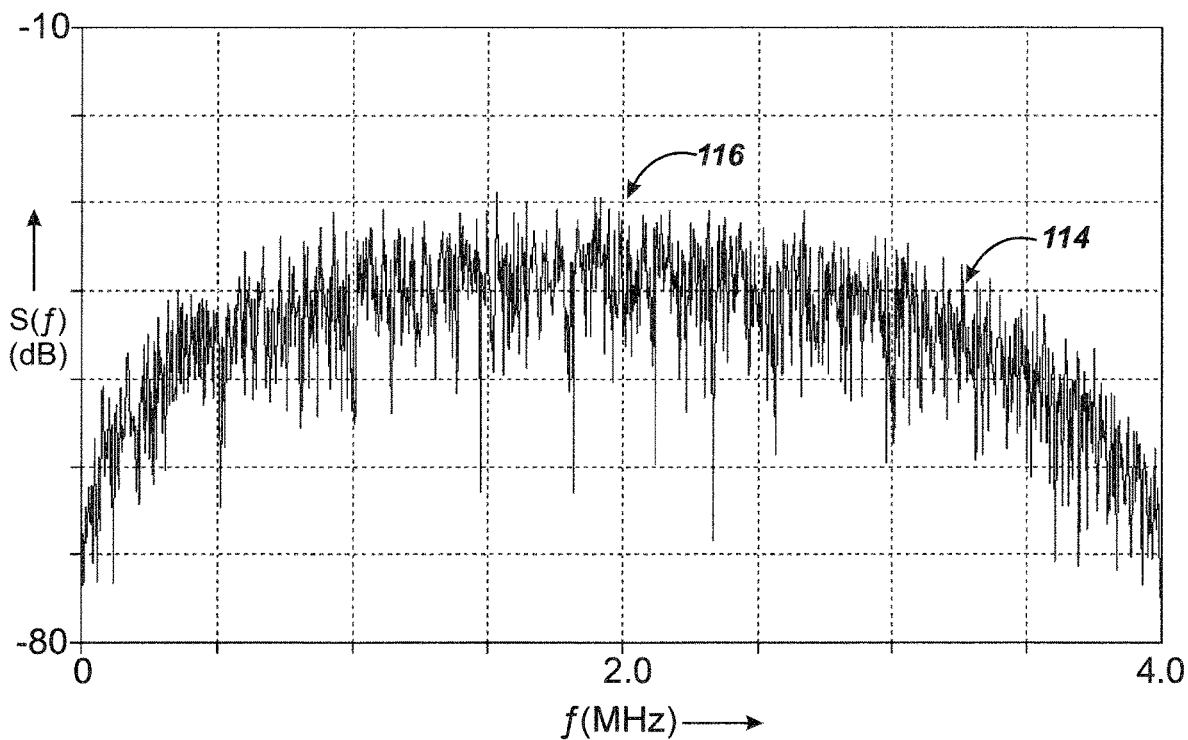
FIG. 2 is a graph of a typical signal spectrum from a typical 256-QAM data communication system from the prior art using the symbol constellation of FIG. 1 while transmitting pseudorandom data at two million symbols per second.

FIG. 2 is a graph of a typical 256-QAM signal spectrum 114 from a typical 256-QAM data transmission system from the prior art (e.g., FIG. 3) using symbol constellation 100 (FIG. 1) while transmitting pseudorandom data at two million symbols per second (using a baseband symbol clock frequency of 2 MHz). As seen in FIG. 2, there is no evidence of any additional signal at the baseband symbol clock frequency 116 or anything else sufficiently "obvious" to allow reconstruction of the baseband symbol clock timing at the receiver. Thus, the QAM reception problem remains complex and unreliable, as is well-known. Various timing recovery techniques are known in the art, ranging from "early-late" guesses (using a predictor-corrector method) to a combined phase-frequency detector, for example. Note that channel estimation and compensation also must be accomplished using the only available information, which is limited to wide-band or narrowband power estimation. Various channel estimation solutions known in the art include injecting separate "pilot" signals and other similarly complex techniques, for example. These constraints add unwanted complexity to any QAM receiver.

Figure 3:
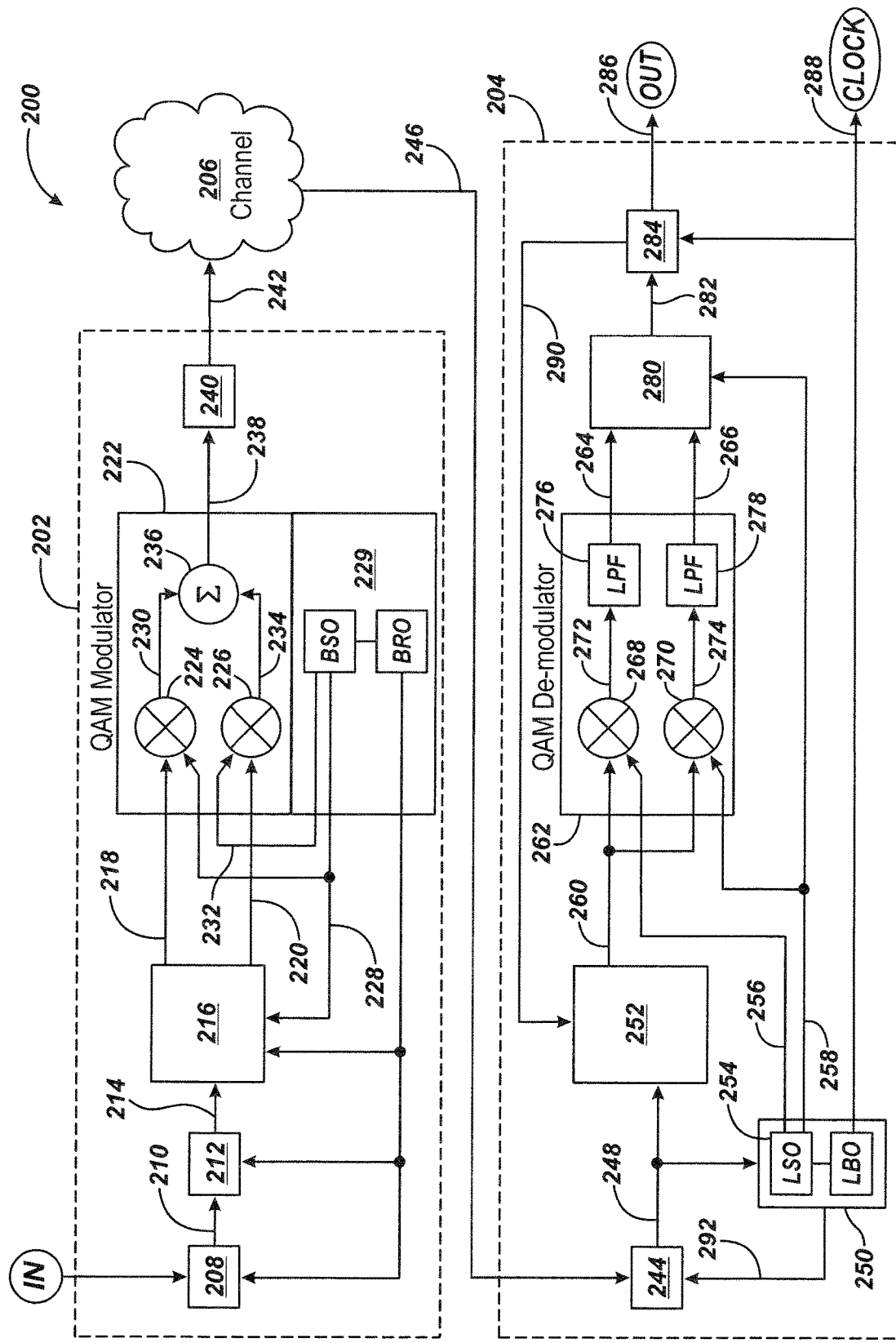
FIG. 3 is a schematic diagram illustrating a typical QAM data communication system from the prior art.

FIG. 3 is a schematic diagram illustrating a typical QAM communication system 200 from the prior art, including a QAM data transmitter 202 and a QAM data receiver 204 coupled by a signal channel 206. In FIG. 3, a data input 208 accepts a stream of incoming data 210 for processing and transmission. Incoming data 210 is routed to the encoder 212 for randomizing, interleaving, error-correction and other high-level encoding, for example. The randomized data 214 is then routed to the QAM encoder 216, which separates the data into the two baseband modulating signals, $I_T(t)$ 218 and $Q_T(t)$ 220, which together represent a time-series of complex transmitter symbols $(I_T, Q_T)$ (not shown) selected according to the mapping of each pair of four-bit sequences of randomized data 214 onto constellation 100 (FIG. 1). This mapping is important because each complex transmitter symbol $(I_T, Q_T)$ represents eight bits in this example. A channel deficiency is most likely to cause a symbol error by incorrectly assessing the corresponding received symbol as the one immediately adjacent the transmitted symbol in constellation 100 (FIG. 1), so encoder 212 must encode incoming data 210 to minimize the overall bit error rate arising from simple symbol errors. Simple binary coding, for example, is not very robust against bit errors (e.g., a single symbol step from 01111111 to 10000000 collects eight bit errors) so the symbol mapping strategy must be chosen carefully, as is well known. A "Gray" code is useful and commonly used.

The two baseband modulating signals, $I_T(t)$ 218 and $Q_T(t)$ 220, are accepted by a QAM modulator 222 that includes an I-modulator 224 and a Q-modulator 226 embodied as a dual multiplier. I-modulator 224 modulates a zero-degree-phase baseband symbol clock signal 228 from the baseband symbol clock oscillator 229 by multiplying it with baseband modulating signal $I_T(t)$ 218 to produce an I-modulation product signal 230 and Q-modulator 226 modulates a ninety-degree-phase baseband symbol clock signal 232 by multiplying it with baseband modulating signal $Q_T(t)$ 220 to produce a Q-modulation product signal 234. A summer 236 then adds I-modulation product signal 230 and Q-modulation product signal 234 in the usual manner to produce a transmitter output signal 238, which, in this example, is filtered and conditioned at the filter and driver assembly 240 to produce a filtered transmitter output signal 242 that is conditioned for transfer through the physical transmission medium in signal channel 206 to QAM receiver 204. Zero-degree-phase and ninety-degree-phase baseband symbol clock signals 228 and 232 are said to be generally fixed in quadrature because they are phase-locked to one another with a 90-degree phase difference in the usual manner. Signal channel 206 may include conductive wiring, optical fiber, modulated radio frequency or optical signals in free space, or any other useful channel means known in the art, for example. Filter and driver assembly 240 may include an additional modulator(s) (not shown) for reconditioning transmitter output signal 238 as a modulation product of another carrier signal more suited to the signal channel medium, for example.

Continuing with FIG. 3, a signal conditioner 244 in QAM data receiver 204 accepts from signal channel 206 a channel signal 246 that represents filtered transmitter output signal 242 in some manner, depending on particular channel characteristics, added noise, and the like. Signal conditioner 244 may include an additional demodulator(s) (not shown) for recovering the baseband component of channel signal 246 when using another carrier signal more suited to the signal channel medium, for example. Signal conditioner 244 restores the signal level and provides any additional (usually analog) reconditioning necessary to produce a baseband receiver input signal 248. From here, receiver input signal 248 takes two paths; the first taking it to a baseband symbol clock detector 250 for baseband symbol clock timing recovery and the second taking it to an equalization and correction circuit 252 for any additional processing necessary to correct for noise, intersymbol interference (ISI) and other unwanted effects of the trip through signal channel 206. Baseband symbol clock detector 250 includes a baseband symbol clock recovery oscillator 254 that produces a zero-degree-phase recovered baseband symbol clock signal 256 and a ninety-degree-phase recovered baseband symbol clock signal 258, which are generally fixed in quadrature and respectively synchronized with baseband symbol clock signals 228 and 232 above. Equalization and correction circuit 252 produces a baseband receiver input signal 260 that (as much as possible) represents the recovery of transmitter output signal 238.

The baseband receiver input signal 260 from equalization and correction circuit 252 is routed to the QAM demodulator 262 for recovery of the two baseband demodulated signals, $I_R(t)$ 264 and $Q_R(t)$ 266, together representing a time series of complex receiver symbols $(I_R, Q_R)$ that (as much as possible) represent the recovery of the initial time-series of complex transmitter symbols ($I_T$, $Q_T$) discussed above. This is accomplished by an I-demodulator 268 and a Q-demodulator 270 embodied as a dual multiplier. I-demodulator 268 demodulates baseband receiver input signal 260 by multiplying it with zero-degree-phase recovered baseband symbol clock signal 256 to produce an I-demodulation product signal 272 and Q-demodulator 270 demodulates baseband receiver input signal 260 by multiplying it with ninety-degree-phase recovered baseband symbol clock signal 258 to produce a Q-demodulation product signal 274. I-demodulation product signal 272 is passed through a first low-pass filter 276 to recover baseband demodulated signal $I_R(t)$ 264 and Q-demodulation product signal 274 is passed through a second low-pass filter 278 to recover baseband demodulated signal $Q_R(t)$ 266 in the usual manner. From QAM demodulator 262, both baseband demodulated signals, $IQ_R(t)$ 264 and $Q_R(t)$ 266 are presented to the QAM decoder 280 for reversal of the 2-D constellation mapping process performed in QAM encoder 216 and discussed above to produce the recovered randomized data 282. Finally, in the decoder 284, the randomizing, interleaving, error-correction and other high-level encoding processing performed in encoder 212 and discussed above is reversed to produce a stream of output data 286 corrected for errors where possible and timed according to a bit rate clock signal 288 from baseband symbol clock detector 250. A feedback line 290 to equalization and correction circuit 252 permits recovery optimization by adjusting the conditioning of receiver input signal 248 to minimize errors detected and corrected in recovered randomized data 282 by decoder 284, for example.

To appreciate the detailed operation of QAM communication system 200 (FIG. 3) consider a simple QAM encoding example based on 256-QAM Type III constellation 100 (FIG. 1). Referring to FIG. 3, consider the details of passing several complex transmitter symbols ($I_T$, $Q_T$) through QAM communication system 200 starting with QAM modulator 222 and assuming that transmitter output signal 238 passes through signal channel 206 to QAM data receiver 204 with perfect fidelity.

As QAM operates with quantized amplitudes, assume that the I-axis 102 and Q-axis 104 range from −7.5 units to 7.5 units, in 1.0 unit steps. For example, the units may represent volts or any other physical denomination suitable to the application. This arrangement thereby provides sixteen amplitudes along each axis that may be conveniently mapped (in any sequence) to the sixteen available four-bit binary sequences ranging from 0000 to 1111, consistent with the above discussion. Assume for this illustration that the stream of incoming data 210 is sixteen bits long and may be mapped by constellation 100 to the following two exemplary complex transmitter symbols ($I_T$, $Q_T$) over two complete four-part baseband symbol clock cycles (using logical amplitude units): [0063] Complex transmitter symbols ($I_T$, $Q_T$): (+1.5, −6.5) and (−3.5, +5.5)

So, the two baseband modulating signals, $I_T(t)$ 218 and $Q_T(t)$ 220 have the following amplitudes over the two four-part baseband symbol clock cycles: [0065] First baseband modulating signal, $I_T(t)$ 218: +1.5, +1.5, +1.5, +1.5, −3.5, −3.5, −3.5, −3.5 [0066] Second baseband modulating signal, $Q_T(t)$ 220: −6.5, −6.5, −6.5, −6.5, +5.5, +5.5, +5.5, +5.5

Assuming that, in QAM modulator 222, baseband symbol clock signal 228 is a square wave with either a 0 or 1 logical amplitude, the following symbol clock signal values describe the two complete four-part symbol clock cycles mapping onto these two complex transmitter symbols ($I_T$, $Q_T$): [0068] Zero-degree-phase baseband symbol clock signal 228 (I-clock): +1, +1, −1, −1, +1, +1, −1, −1 [0069] Ninety-degree-phase baseband symbol clock signal 232 (Q-clock): −1, +1, +1, −1, −1, +1, +1, −1

After the multiplications in I-modulator 224 and Q-modulator 226, the resulting modulation product signal amplitudes over the two four-part baseband symbol clock cycles are: [0071] I-modulation product signal 230: +1.5, +1.5, −1.5, −1.5, −3.5, −3.5, +3.5, +3.5 [0072] Q-modulation product signal 234: +6.5, −6.5, −6.5, +6.5, −5.5, +5.5, +5.5, −5.5

When added together at summer 236, the amplitude of transmitter output signal 238 over the two four-part baseband symbol clock cycles is: [0074] Transmitter output signal 238: +8.0, −5.0, −8.0, +5.0, −9.0, +2.0, +9.0, −2.0

In this example, transmitter output signal 238 is also the receiver input signal 248 arriving at QAM data receiver 204 from which two complex receiver symbols ($I_R$, $Q_R$) must be recovered and decoded to recover the stream of incoming data 210 without error if possible. [0076] Receiver input signal 248: +8.0, −5.0, −8.0, +5.0, −9.0, +2.0, +9.0, −2.0

Assuming that zero-degree-phase recovered baseband symbol clock signal 256 can be precisely synchronized with zero-degree-phase baseband symbol clock signal 228 in QAM data transmitter 202, then baseband symbol clock recovery oscillator 254 provides the following logical amplitudes over two complete four-part recovered baseband symbol clock cycles: [0078] Zero-degree-phase recovered baseband symbol clock signal 256: +1, +1, −1, −1, +1, +1, −1, −1 [0079] Ninety-degree-phase recovered baseband symbol clock signal 258: −1, +1, +1, −1, −1, +1, +1, −1

Thus, after the multiplications in I-demodulator 268 and Q-demodulator 270, the following two demodulation product signals are produced complete four-part recovered baseband symbol clock cycles: [0081] I-demodulation product signal 272: +8.0, −5.0, +8.0, −5.0, −9.0, +2.0, −9.0, +2.0 [0082] Q-demodulation product signal 274: −8.0, −5.0, −8.0, −5.0, +9.0, +2.0, +9.0, +2.0

Passing each of these two product signals through their respective low-pass filters 276 and 278 can be assumed to produce a average value over each full baseband symbol clock cycle, thereby producing the following logical amplitude averages for the two baseband demodulated signals, $I_R(t)$ 264 and $Q_R(t)$ 266 over two complete recovered baseband symbol clock cycles:

First baseband demodulated signal $I_R(t)$ 264: 6.0/4=+1.5, −14.0/4=−3.5 5] Second baseband demodulated signal $Q_R(t)$ 266: −26.0/4=−6.5, 22.0/4=+5.5 Complex receiver symbols ($I_R$, $Q_R$): (+1.5, −6.5) and (−3.5, +5.5).

Finally, in QAM decoder 280 and decoder 284, the two complex receiver symbols ($I_R$, $Q_R$) are decoded with reference to constellation 100 (FIG. 1) to obtain the stream of output data 286 that represents (ideally without error) original data stream 210. In this example, two symbols at the channel symbol rate serves to transmit and correctly receive sixteen bits of information. In a practical application, assuming adequate timing recovery means, the received signal may be sampled four times during the baseband symbol clock cycle to retrieve the data correctly.

Improving QAM Clock Recovery

Notice that some form of timing recovery must be performed in baseband symbol clock detector 250 to recover baseband symbol clock signals 256 and 258 as well as bit rate clock signal 288. The QAM receiver clock recovery function is expensive in terms of computing (and electrical) power and parts cost. The reason for this may be appreciated with reference to FIG. 2. Note that 256-QAM signal spectrum 114 in FIG. 2 is nulled at 0 Hz (DC) and 4 MHz (twice the 2 MHz symbol clock rate), but has no prominent component at the symbol clock rate 116 so that baseband symbol clock recovery is feasible only by applying exotic statistical methods to receiver input signal 248. But these exotic computational components are expensive. So, although QAM data communication system 200 provides some utility and QAM data transmitter 202 alone is relatively inexpensive, QAM data receiver 204 can be too complex and expensive for simple applications, such as pipe inspection systems, for example.

Figure 4:
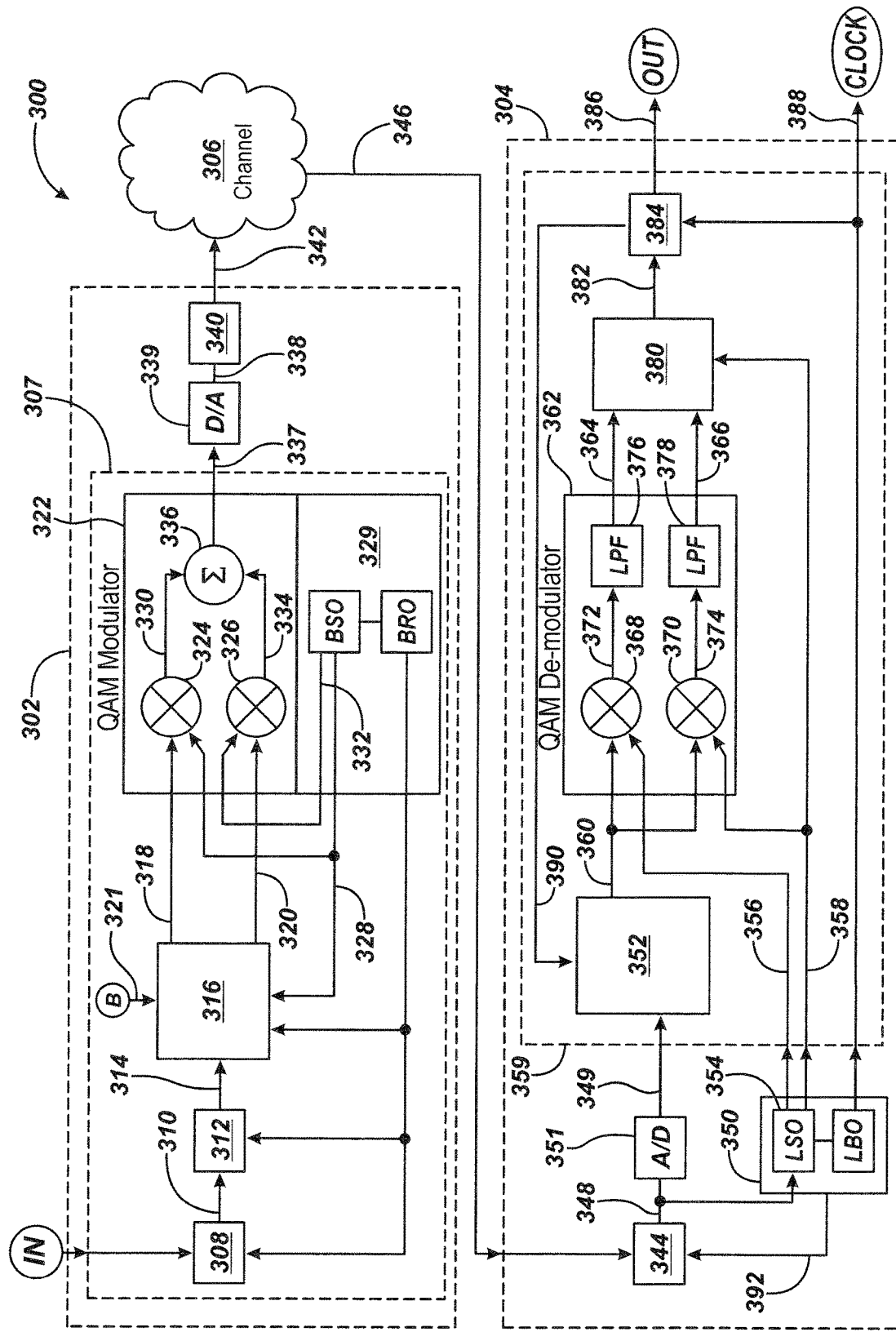
FIG. 4 is a schematic diagram illustrating an exemplary embodiment of a QAM data communication system of this invention.

FIG. 4 is a schematic diagram illustrating an exemplary QAM data communication system embodiment 300 of this invention, including a QAM data transmitter 302 and a QAM data receiver 304 coupled through a signal channel 306. In this embodiment, many of the transmitter functions in QAM data transmitter 302 are embodied as software (or firmware) programs in a Digital Signal Processor (DSP) 307 with programming adapted to accept a stream of incoming data 310 for processing and transmission. Incoming data 310 is routed to the encoder 312 for randomizing, interleaving, error-correction and other high-level encoding, for example. The randomized data 314 is then routed to the QAM encoder 316, which separates the data into the two baseband modulating signals, $I_T(t)$ 318 and $Q_T(t)$ 320, which together represent a time-series of complex transmitter symbols ($I_T$, $Q_T$) (not shown) selected according to the mapping of each pair of four-bit sequences of randomized data 314 onto an asymmetric symbol constellation of this invention exemplified by the 256-QAM asymmetrical symbol constellation 400 shown in FIG. 5A and by the 256-QAM asymmetrical symbol constellation 500 shown in FIG. 5B.

Figure 5A:
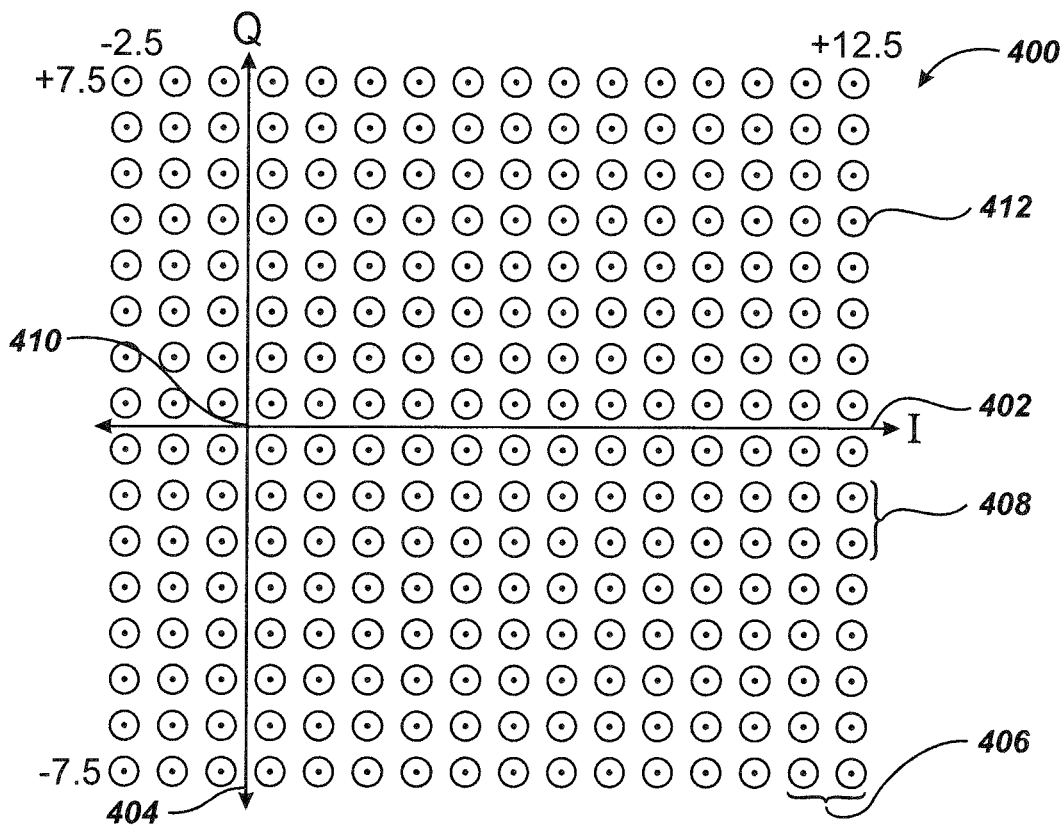
FIG. 5A is a schematic diagram illustrating an exemplary 256-QAM asymmetrical symbol constellation suitable for use in the system of this invention.
Figure 5B:
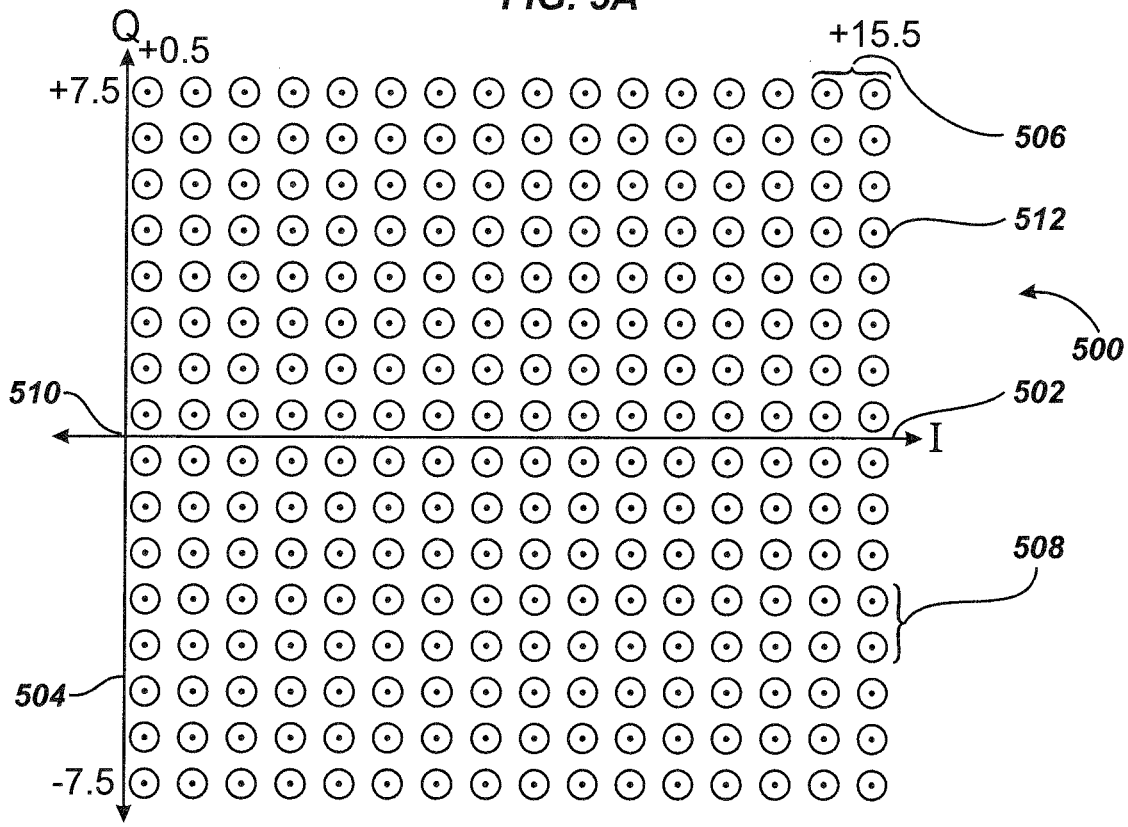
FIG. 5B is a schematic diagram illustrating an alternative 256-QAM asymmetrical symbol constellation suitable for use in the system of this invention.

FIG. 5A is a schematic diagram illustrating an exemplary 256-QAM asymmetrical symbol constellation 400 of this invention suitable for use in QAM communication system 300 (FIG. 4). In this "asymmetric" constellation, the I-space values are represented as sixteen amplitudes ranging from −2.5 units to +12.5 units spaced along the I-axis 402 and the Q-space values are represented as the same sixteen amplitudes ranging from −7.5 units to +7.5 units spaced along the Q-axis 404. The I-space values are equally spaced by 1.0 units as exemplified by the spacing 406 and the Q-space values are equally spaced by the same amount as exemplified by the spacing 408. I-axis 402 and Q-axis 404 cross orthogonally at the phase plane origin 410. Each symbol state is represented as a finite region about a point (I, Q), as exemplified by the symbol state 412, which represents eight bits of data; four bits encoded in each of the sixteen amplitude values reserved for I and four bits encoded in each of the sixteen amplitude values reserved for Q. Constellation 400 is disposed with the I-space and Q-space ranges asymmetrically about phase plane origin 410 such that any I-space baseband modulating signal I(t) and Q-space baseband modulating signal Q(t) together representing a random time-series of (I, Q) symbols will have mean amplitudes (DC components) that are substantially non-zero (+5.0 units in I-space for constellation 400) for I-space baseband modulating signal I(t) and substantially zero for Q-space baseband modulating signal Q(t). FIG. 5B is a schematic diagram illustrating an alternative 256-QAM asymmetrical symbol constellation 500 suitable for use in QAM communication system 300 (FIG. 4). In this "asymmetric" constellation, the I-space values are represented as sixteen amplitudes ranging from +0.5 units to +15.5 units spaced along the I-axis 502 and the Q-space values are represented as the same sixteen amplitudes ranging from −7.5 units to +7.5 units spaced along the Q-axis 504. The I-space values are equally spaced by 1.0 units as exemplified by the spacing 506 and the Q-space values are equally spaced by the same amount as exemplified by the spacing 508. I-axis 502 and Q-axis 504 cross orthogonally at the phase plane origin 510. Each symbol state is represented as a finite region about a point (I, Q), as exemplified by the symbol state 512, which represents eight bits of data; four bits encoded in each of the sixteen amplitude values reserved for I and four bits encoded in each of the sixteen amplitude values reserved for Q. Constellation 500 is disposed with the I-space and Q-space ranges asymmetrically about phase plane origin 510 such that any I-space baseband modulating signal I(t) and Q-space baseband modulating signal Q(t) together representing a random time-series of (I, Q) symbols will have mean amplitudes (DC components) that are substantially non-zero (+8.0 units in I-space for constellation 500) for I-space baseband modulating signal I(t) and substantially zero for Q-space baseband modulating signal Q(t). The non-zero DC bias of at least one of the two baseband modulating signals is an important element of the system of this invention and either or both of the two baseband modulating signals may be biased to create a suitable asymmetric constellation in accordance with these teachings.

Returning to FIG. 4, a constellation bias signal 321 is shown as an input to QAM encoder 316 to illustrate the method for shifting the symbol constellation exemplified by constellation 400, which may be thought of as adding a DC bias to either or both baseband modulating signals, $I_T(t)$ 318 and $Q_T(t)$ 320 during the encoding process in QAM encoder 316, for example. This facilitates using constellation bias signal 321 to adjust the asymmetric constellation exemplified by constellation 400 in response to channel type and conditions or for other purposes, for example.

The two baseband modulating signals, $I_T(t)$ 318 and $Q_T(t)$ 320, are accepted by a QAM modulator 322 that includes an I-modulator 324 and a Q-modulator 326 embodied as a dual multiplier. I-modulator 324 modulates a zero-degree-phase baseband symbol clock signal 328 from the baseband symbol clock oscillator 329 by multiplying it with baseband modulating signal $I_T(t)$ 318 to produce an I-modulation product signal 330 and Q-modulator 326 modulates a ninety-degree-phase baseband symbol clock signal 332 from baseband symbol clock oscillator 329 by multiplying it with baseband modulating signal $Q_T(t)$ 320 to produce a Q-modulation product signal 334. A summer 336 then adds I-modulation product signal 330 and Q-modulation product signal 334 in the usual manner to produce a digital transmitter output signal 337, which is then converted to an analog transmitter output signal 338 by the digital-to-analog converter 339. Transmitter output signal 338 is filtered and conditioned at the filter and driver assembly 340 to produce a filtered transmitter output signal 342 that is conditioned for transfer through the physical transmission medium in signal channel 306 to QAM receiver 304. Zero-degree-phase and ninety-degree-phase baseband symbol clock signals 328 and 332 are said to be generally fixed in quadrature because they are phase-locked to one another with a 90-degree phase difference in the usual manner. Signal channel 306 may include conductive wiring, optical fiber, modulated radio frequency or optical signals in free space, or any other useful channel means known in the art, for example. Filter and driver assembly 340 may include an additional modulator(s) (not shown) for reconditioning transmitter output signal 338 as a modulation product of another carrier signal more suited to the signal channel medium, for example.

Continuing with FIG. 4, a signal conditioner 344 in QAM data receiver 304 accepts from signal channel 306 a channel signal 346 that represents filtered transmitter output signal 342 in some manner, depending on particular channel characteristics, added noise, and the like. Signal conditioner 344 may include an additional demodulator(s) (not shown) for recovering the baseband component of channel signal 346 when using another carrier signal more suited to the signal channel medium, for example. Signal conditioner 344 restores the signal level and provides any additional (usually analog) reconditioning necessary to produce a baseband receiver input signal 348, which may now be converted back to a digital receiver input signal 349 by means of an analog-to-digital converter 351, which may be synchronized with baseband symbol clock detector 350 substantially as shown. In this embodiment, many of the receiver functions in QAM data receiver 304 are embodied as software (or firmware) programs in a Digital Signal Processor (DSP) 359 with programming adapted to accept the digital receiver input signal 349 for decoding and processing. In addition to the functional elements shown FIG. 4, DSP 359 may also embrace portions of baseband symbol clock detector 350. Most remaining complexity in QAM data receiver 304 is found in signal conditioner 344 and the remainder of baseband symbol clock detector 350. But baseband symbol clock detector 350 may now be implemented as a "simple" Phase Locked Loop (PLL) circuit, for example, because of the asymmetrical symbol constellation 400 used in QAM transmitter 302, for the reasons discussed herein below in connection with FIGS. 15-16. Notice that using DSP 359 in QAM data receiver 304 and the simple PLL implementation of provides a simple and cost effective embodiment of the receiving element of this invention, thereby meeting the primary purpose of the system of this invention. This allows QAM techniques to be applied in a much more cost effective manner than previously known, making QAM feasible for applications for which it was previously cost prohibitive.

Continuing with the remainder of FIG. 4, from signal conditioner 344, receiver input signal 348 takes two paths; the first taking it to a baseband symbol clock detector 350 for baseband symbol clock timing recovery and the second taking it to analog-to-digital converter 351 for digitization to produce digital receiver input signal 349, which is presented to an equalization and correction circuit 352 for any additional processing necessary to correct for noise, intersymbol interference (ISI) and other unwanted effects of the trip through signal channel 306. Baseband symbol clock detector 350 includes a baseband symbol clock recovery oscillator 354 that produces a zero-degree-phase recovered baseband symbol clock signal 356 and a ninety-degree-phase recovered baseband symbol clock signal 358, which are generally fixed in quadrature and respectively synchronized with baseband symbol clock signals 328 and 332 above.

Equalization and correction circuit 352 produces a baseband receiver input signal 360 that (as much as possible) represents the recovery of transmitter output signal 338. The baseband receiver input signal 360 from equalization and correction circuit 352 is routed to the QAM demodulator 362 for recovery of the two baseband demodulated signals, $I_R(t)$ 364 and $Q_R(t)$ 366, together representing a time series of complex receiver symbols $(I_R, Q_R)$ that (as much as possible) represent the recovery of the initial time-series of complex transmitter symbols $(I_T, Q_T)$ discussed above. This is accomplished by an I-demodulator 368 and a Q-demodulator 370 embodied as a dual multiplier. I-demodulator 368 demodulates baseband receiver input signal 360 by multiplying it with zero-degree-phase recovered baseband symbol clock signal 356 to produce an I-demodulation product signal 372 and Q-demodulator 370 demodulates baseband receiver input signal 360 by multiplying it with ninety-degree-phase recovered baseband symbol clock signal 358 to produce a Q-demodulation product signal 374. I-demodulation product signal 372 is passed through a first low-pass filter 376 to recover baseband demodulated signal $I_R(t)$ 364 and Q-demodulation product signal 374 is passed through a second low-pass filter 378 to recover baseband demodulated signal $Q_R(t)$ 366 in the usual manner. From QAM demodulator 362, both baseband demodulated signals, $I_R(t)$ 364 and $Q_R(t)$ 366 are presented to the QAM decoder 380 for reversal of the 2-D constellation mapping process performed in QAM encoder 316 and discussed above to produce the recovered randomized data 382. Finally, in the decoder 384, the randomizing, interleaving, error-correction and other high-level encoding processing performed in encoder 312 and discussed above is reversed to produce a stream of output data 386 corrected for errors where possible and timed according to a bit rate clock signal 388 from baseband symbol clock detector 350. A feedback line 390 to equalization and correction circuit 352 permits recovery optimization by adjusting the conditioning of receiver input signal 348 to minimize errors detected and corrected in recovered randomized data 382 by decoder 384, for example.

Figure 6:
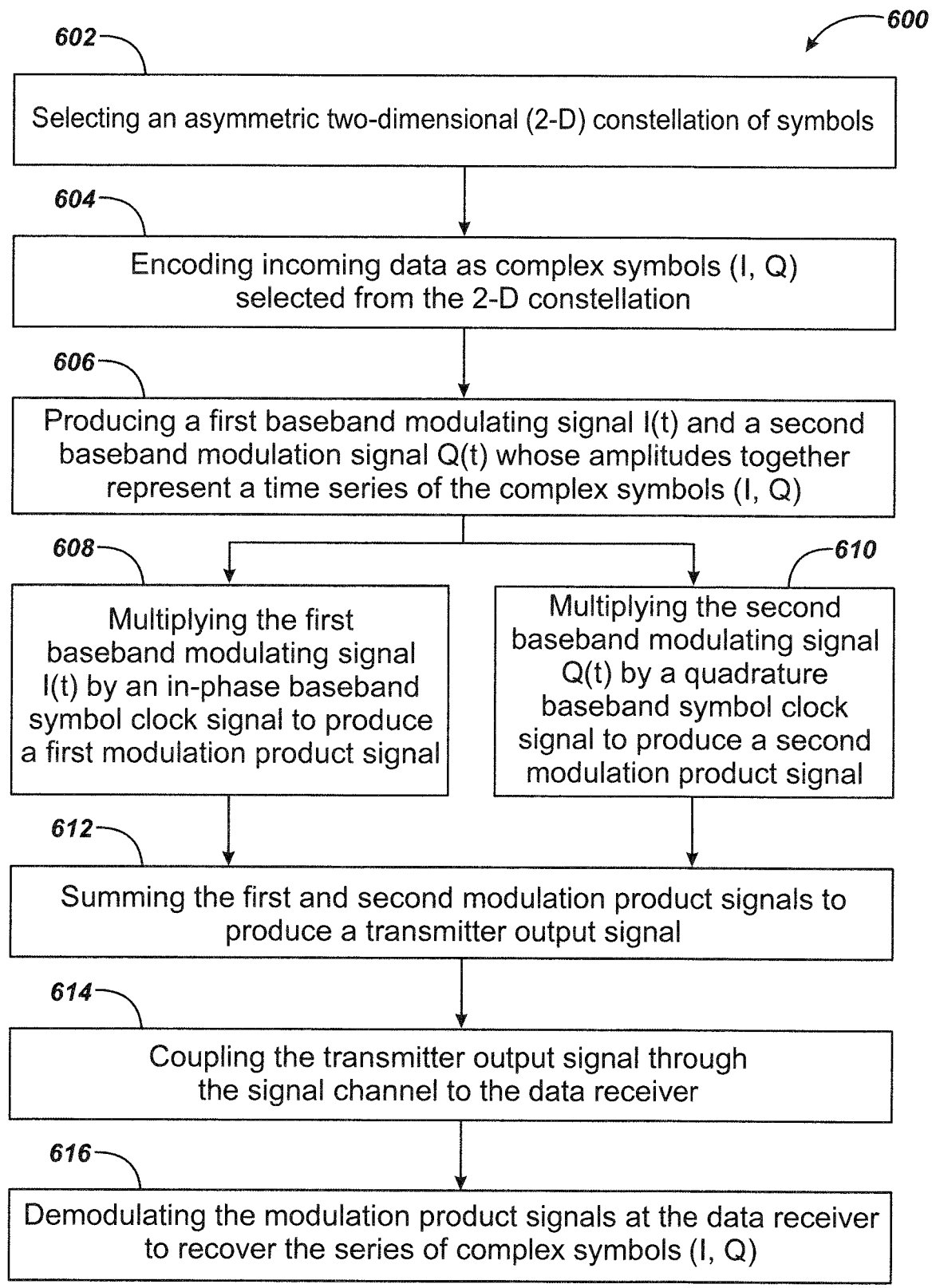
FIG. 6 is a flowchart illustrating an exemplary method of this invention for transferring data through a signal channel.

FIG. 6 is a flowchart illustrating an exemplary method 600 of this invention for transferring data through signal channel 306. Method 600 begins at the step 602 by first selecting a two-dimensional (2-D) constellation of symbols distributed on the phase plane asymmetrically about the origin, such as constellation 400 or constellation 500 discussed above in connection with FIGS. 5A-B, for example. Next, at the step 604, the incoming data are encoded as complex symbols (I, Q) selected from the 2-D constellation, and, in the step 606, first and second baseband modulating signals I(t) and Q(t) are produced, whose amplitudes together represent the time series of complex symbols (I, Q) and at least one of the baseband modulating signals has a substantially non-zero mean amplitude. Then, in the step 608, the first baseband modulating signal I(t) is multiplied by an in-phase baseband symbol clock signal to produce a first modulation product signal as, in the step 610, the second baseband modulating signal Q(t) is multiplied by a quadrature baseband symbol clock signal to produce a second modulation product signal. In the step 612, the first and second modulation product signals are summed to produce a transmitter output signal, which is coupled through the signal channel to the data receiver in the step 614. Finally, in the step 616, the two modulation product signals are demodulated at the data receiver to recover the series of complex symbols (I, Q), thereby facilitating recovery of the incoming data (not shown).

Improving QAM Bit Error Rate (BER) Performance

The Type III (square) 2-D symbol constellation known in the art and exemplified by constellation 100 (FIG. 1), is disposed so that the modulating signal amplitudes are symmetrical around zero (phase plane origin 110), as are all other 2-D QAM symbol constellations of any type. This is a well-known QAM system requirement arising from the universal and well-founded belief that QAM communication system BER performance is diminished when any power is "wasted" in a carrier (baseband symbol clock) signal. As is known in the art, adding sufficiently exotic (and expensive) timing recovery means to the QAM receiver can overcome much of the timing recovery problem arising from the complete suppression of the carrier (baseband symbol clock) signal and thereby avoid most of the BER performance penalty arising from baseband symbol clock recovery error. This situation, and the unexpectedly advantageous observation leading to the method of this invention, may be better appreciated with reference to the following discussion of the effects of various system abnormalities on theoretical QAM system BER.

Figure 7:
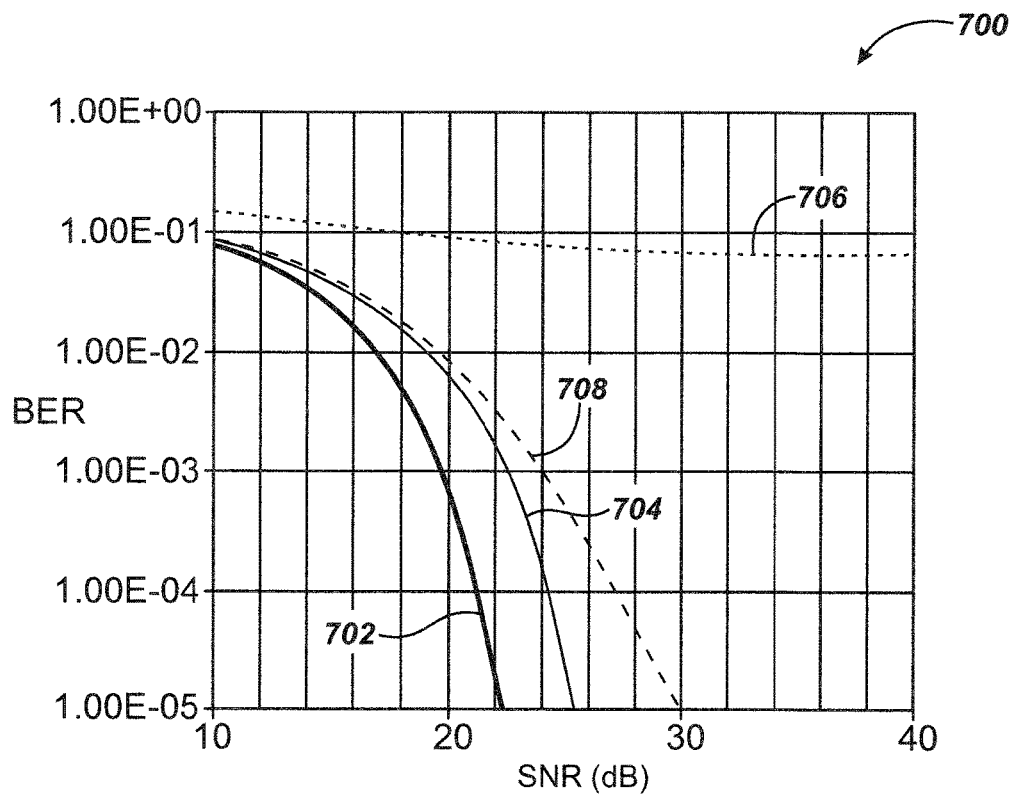
FIG. 7 is a graph illustrating the theoretical Bit Error Rate (BER) characteristics for several 256-QAM system embodiments from the prior art.
Figure 8A:
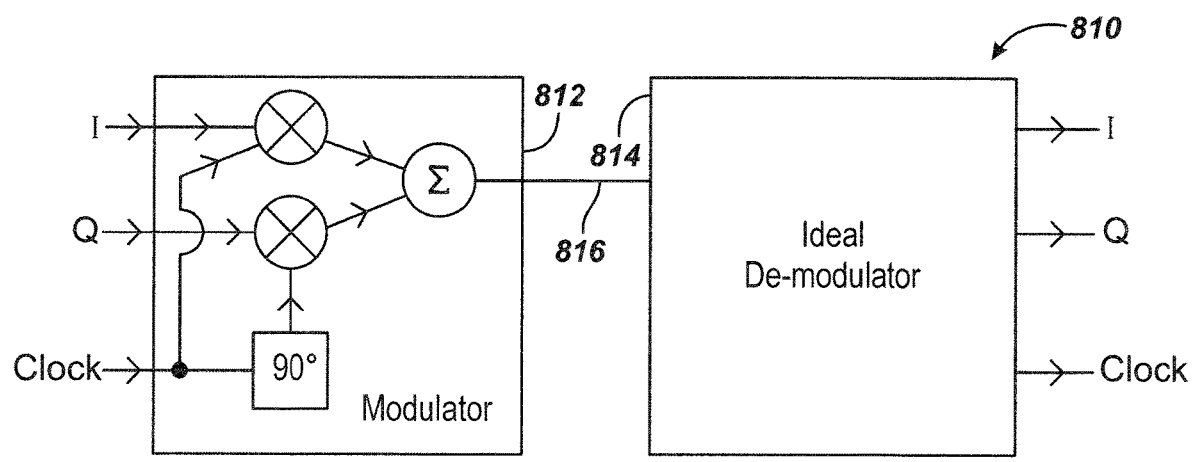
FIG. 8A is a block diagram illustrating a first embodiment of a QAM modulator and demodulator assuming ideal demodulation.

FIG. 7 provides a graph 700 illustrating the theoretical BER under various operating conditions for several 256-QAM communications system embodiments from the prior art. The BER curve 702 provides the predicted BER of the ideal theoretical QAM modulator and demodulator embodiment 810 shown in FIG. 8A. As shown in FIG. 8A, embodiment 810 includes a QAM modulator 812 coupled to a QAM demodulator 814 through an ideal signal channel 816. No actual channel or baseband symbol clock apparatus is shown because theoretically ideal demodulation is assumed for the purposes of predicting BER curve 702.

Figure 8B:
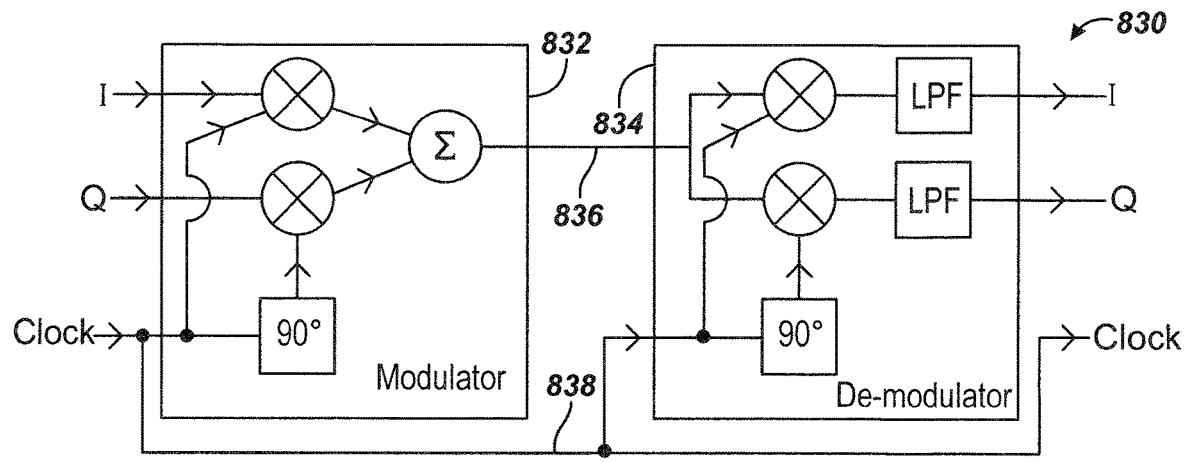
FIG. 8B is a block diagram illustrating a second embodiment of a QAM modulator and demodulator using the undistorted modulator baseband symbol clock signal at the demodulator.

In FIG. 7, the BER curve 704 provides the predicted BER of the theoretical QAM modulator and demodulator embodiment 830 shown in FIG. 8B. As shown in FIG. 8B, embodiment 830 includes a QAM modulator 832 coupled to a QAM demodulator 834 through an ideal signal channel 836. The original baseband symbol clock signal 838 is assumed to be available to QAM demodulator 834 with neither distortion nor delay other than the addition of Additive White Gaussian Noise (AWGN). The 3 dB reduction in performance in BER curve 704 compared to the ideal baseline BER curve 702 is understandable because the four samples per symbol clock cycle assumed for these predictions implies a loss of information otherwise available by integrating out the effects of AWGN.

Figure 8C:
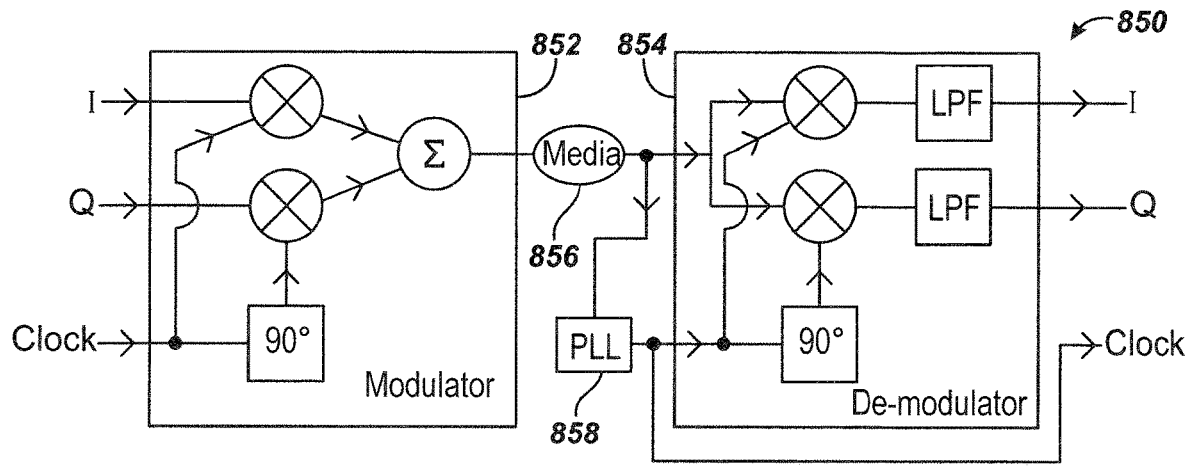
FIG. 8C is a block diagram illustrating a third embodiment of a QAM modulator and demodulator from the prior art using a cable and preamplifier channel and a Phase-Locked Loop (PLL) for demodulator baseband symbol clock recovery.

Returning to FIG. 7, the BER curve 706 provides the predicted BER of the QAM modulator and demodulator embodiment 850 shown in FIG. 8C. As shown in FIG. 8C, embodiment 850 includes a QAM modulator 852 coupled to a QAM demodulator 854 through a cable and preamplifier signal channel 856. The baseband symbol clock timing is recovered at QAM demodulator 854 by means of a simple PLL 858. The performance shown by BER curve 706 is dismal because the complete suppression of the baseband symbol clock signal from QAM modulator 852 makes the reliance on a "simple" PLL 858 for clock recovery an unrealistic solution to the clock recovery problem.

Figure 8D:
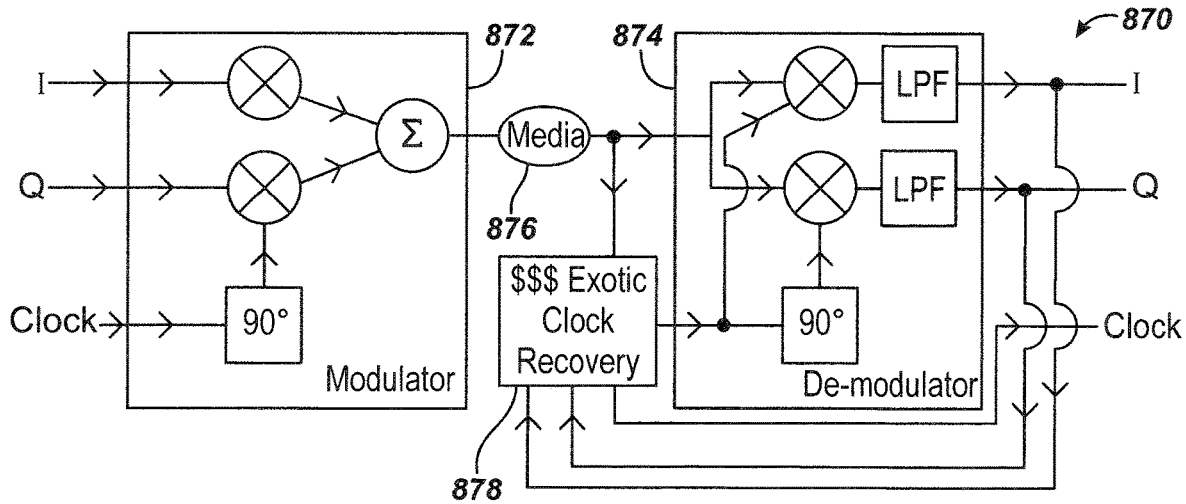
FIG. 8D is a block diagram illustrating a fourth embodiment of a QAM modulator and demodulator from the prior art using a cable and preamplifier channel and an exotic means for demodulator baseband symbol clock recovery.

In FIG. 7, the BER curve 708 provides the predicted BER of the QAM modulator and demodulator embodiment 870 shown in FIG. 8D. As shown in FIG. 8D, embodiment 870 includes a QAM modulator 872 coupled to a QAM demodulator 874 through a cable and preamplifier signal channel 876. The baseband symbol clock timing is recovered at QAM demodulator 874 by means of a complex "exotic" clock recovery means 878. By using any sufficiently sophisticated baseband symbol clock timing recovery mechanism known in the art for the exotic recovery means 878, BER curve 708 provides a performance that is no worse than BER curve 704 at higher BER values and no more than 5-6 dB worse at lower BER values. This variation between BER curves 704 and 708 is related to timing and equalization error degradation and is accepted in the art as a performance sacrifice made to avoid the undesirable performance reduction from "carrier leakage" in QAM systems (FIG. 9).

Figure 9:
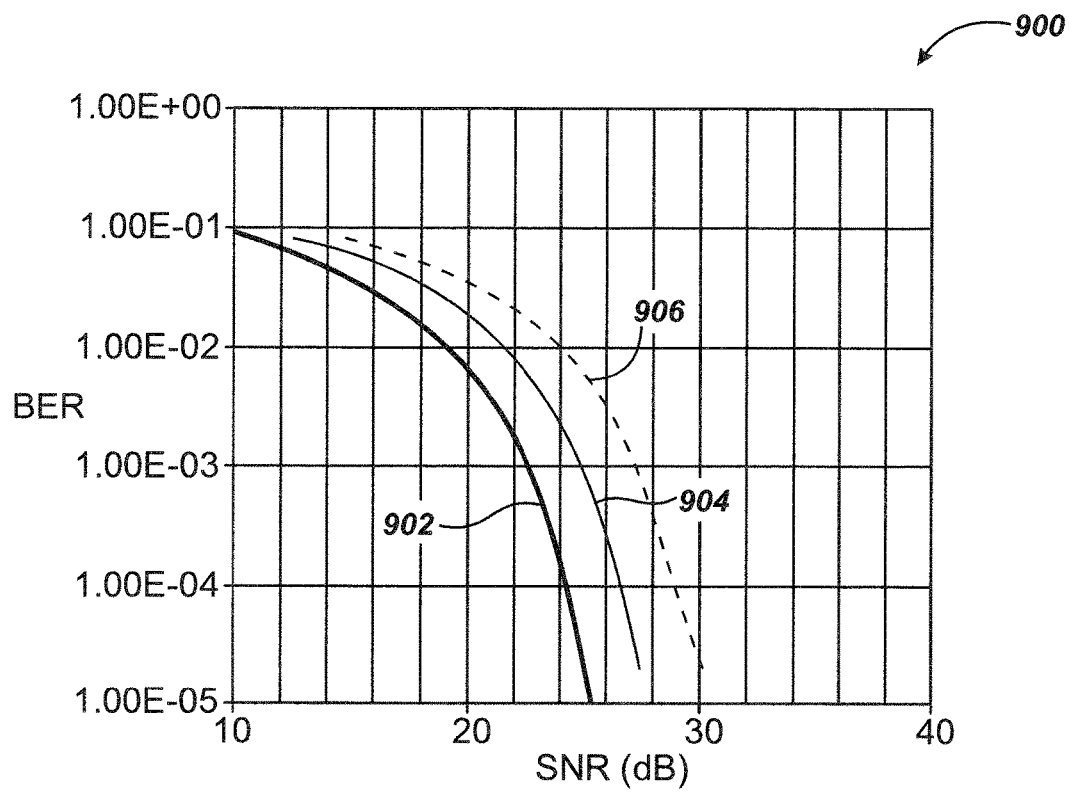
FIG. 9 is a graph illustrating the theoretical BER characteristics for several 256-QAM system embodiments of this invention.
Figure 10A:
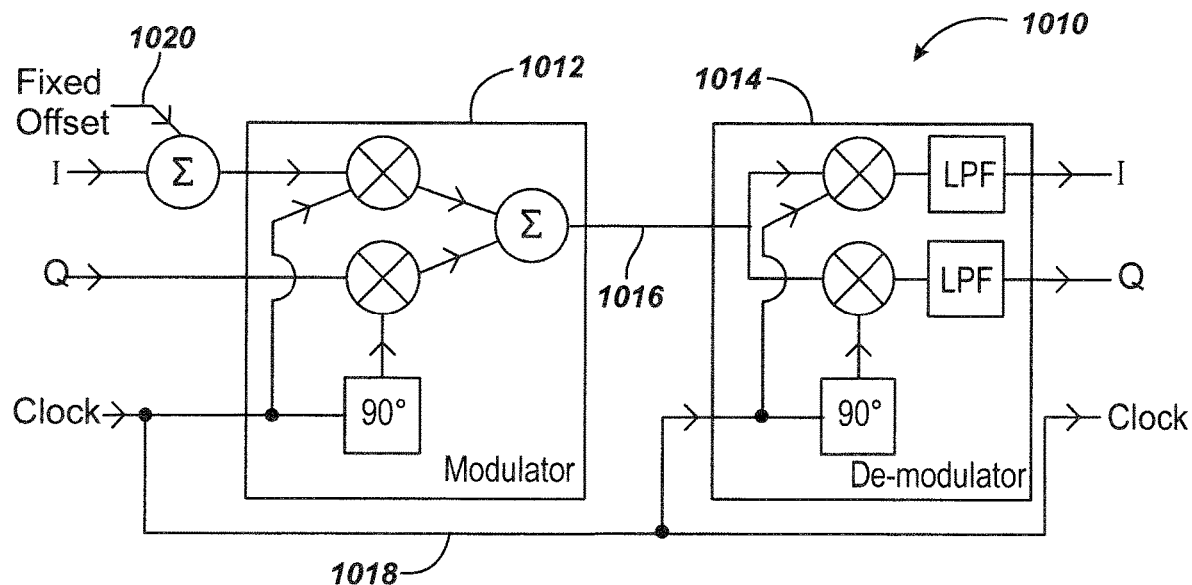
FIG. 10A is a block diagram illustrating a first embodiment of a QAM modulator and demodulator of this invention using the undistorted modulator baseband symbol clock signal at the demodulator.

The effects on BER of an asymmetric QAM constellation may be appreciated with reference to FIG. 9. FIG. 9 provides a graph 900 illustrating the theoretical BER under various operating conditions for two 256-QAM communications system embodiments using the exemplary asymmetric symbol constellations 400 and 500 discussed above (FIGS. 5A-5B). The BER curve 902 provides the predicted BER of QAM modulator and demodulator embodiment 830 discussed above (FIG. 8B) and is identical to BER curve 704 in FIG. 7. The BER curves 904 and 906 provide the predicted BER of the QAM modulator and demodulator embodiment 1010 shown in FIG. 10A under two different conditions. As shown in FIG. 10A, embodiment 1010 includes a QAM modulator 1012 coupled to a QAM demodulator 1014 through an ideal signal channel 1016. The original baseband symbol clock signal 1018 is assumed to be provided to QAM demodulator 1014 with neither distortion nor delay for the purposes of predicting BER curves 904 and 906. A baseband symbol constellation offset 1020 is provided to move the 2-D baseband symbol constellation (not shown) with respect to one of the phase plane axes and thereby insert a "power wasting" baseband symbol clock signal in accordance with the method and system of this invention. For BER curve 904, offset 1020 is set to +5.0 units to create symbol constellation 400 (FIG. 5A) and, for BER curve 906, offset 1020 is set to +8.0 units to create symbol constellation 500 (FIG. 5B).

In FIG. 9, note that offsetting the symbol amplitudes by 5.0 units along the I-axis of the phase plane (FIG. 5A) provides the BER curve 904, which shows a BER performance reduction of 2-3 dB with respect to BER curve 902. Offsetting the symbol amplitudes by another 3.0 units along the I-axis of the phase plane (FIG. 5B) provides the BER curve 906, which shows a BER performance reduction of an additional 2-3 dB with respect to BER curve 904. This "power-wasting" penalty is the well-known reason why (until now) all 2-D symbol constellations are forced into symmetry about the phase plane origin. Also, this BER performance loss is consistent with the relative root mean square (RMS) powers contained in the respective time-domain waveforms, as may be appreciated with reference to the following discussion of FIGS. 11-12.

Figure 11:
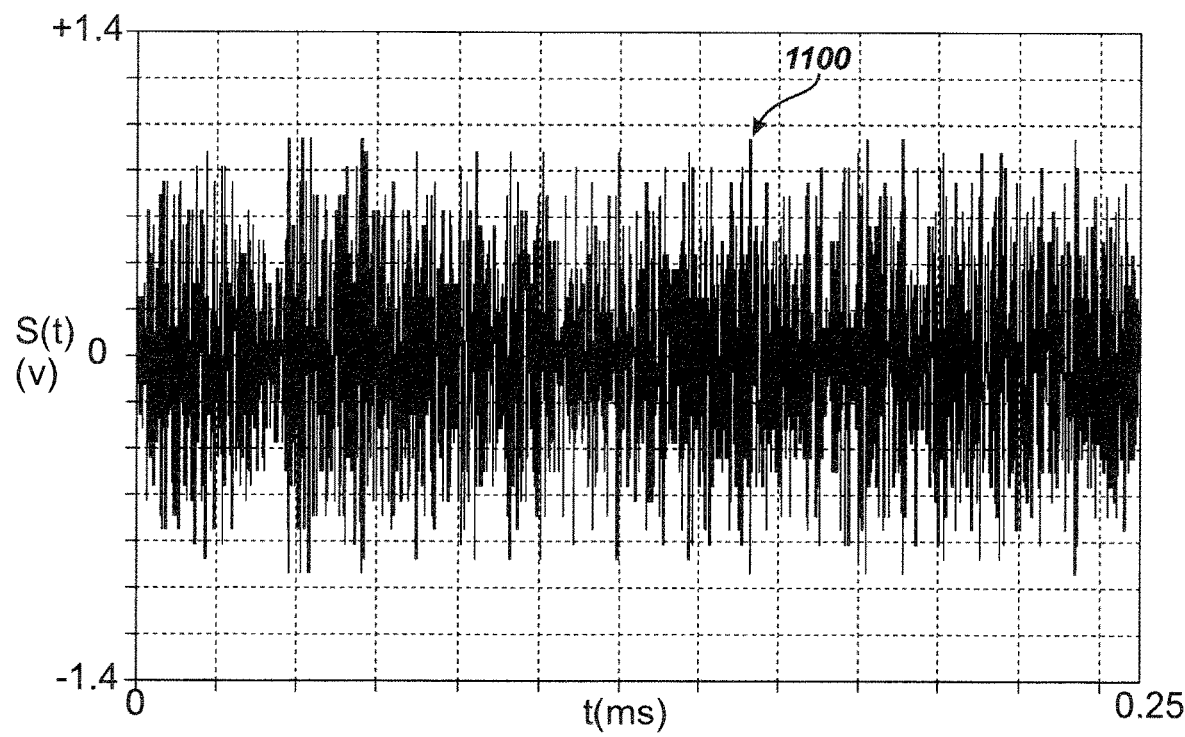
FIG. 11 is a graph illustrating the baseband transmitter output signal in the time domain from a 256-QAM system embodiment using the symmetrical Type III symbol constellation from FIG. 1.
Figure 12:
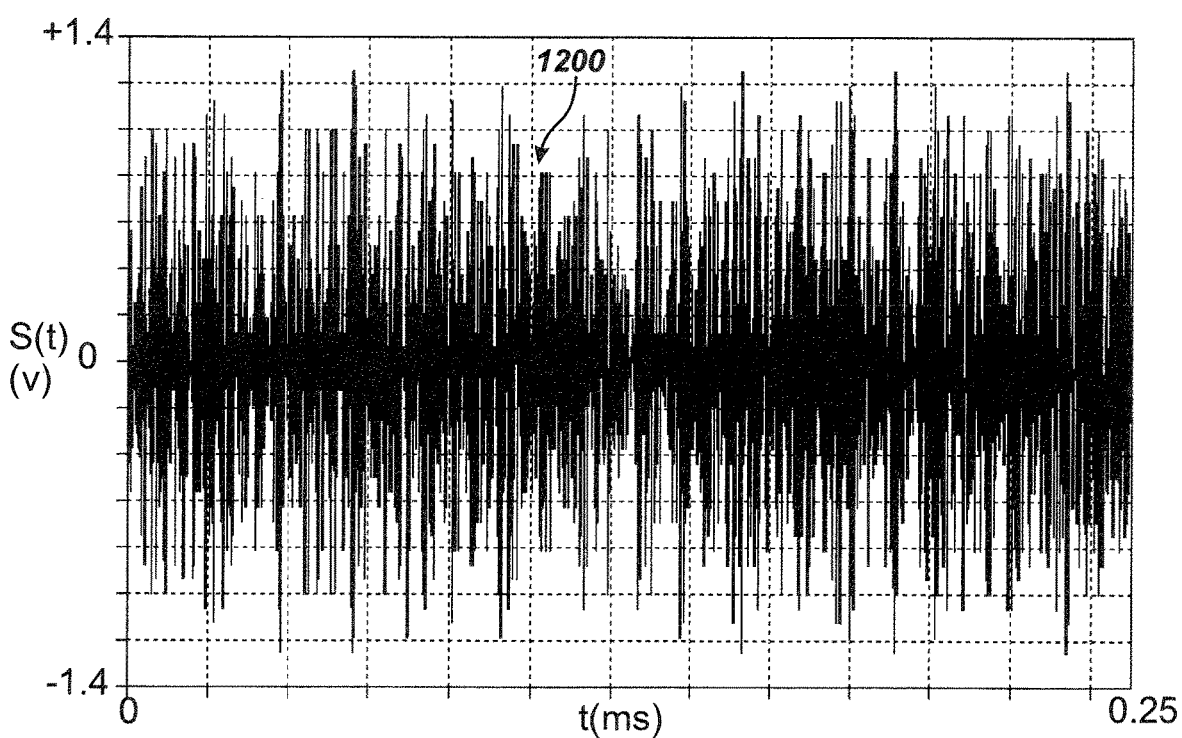
FIG. 12 is a graph illustrating the baseband transmitter output signal in the time domain from a 256-QAM system embodiment using the exemplary asymmetrical Type III symbol constellation of this invention from FIG. 5A.

FIG. 11 is a graph illustrating the baseband transmitter output signal 1100 in the time domain from 256-QAM system embodiment 200 (FIG. 3) using symmetrical symbol constellation 100 (FIG. 1). FIG. 12 is a graph illustrating the baseband transmitter output signal 1200 in the time domain from 256-QAM system embodiment 300 (FIG. 4) using asymmetrical symbol constellation 400 (FIG. 5A). Note that some additional ("wasted") RMS power is clearly evident in baseband transmitter output signal 1200 when compared with baseband transmitter output signal 1100.

Figure 13:
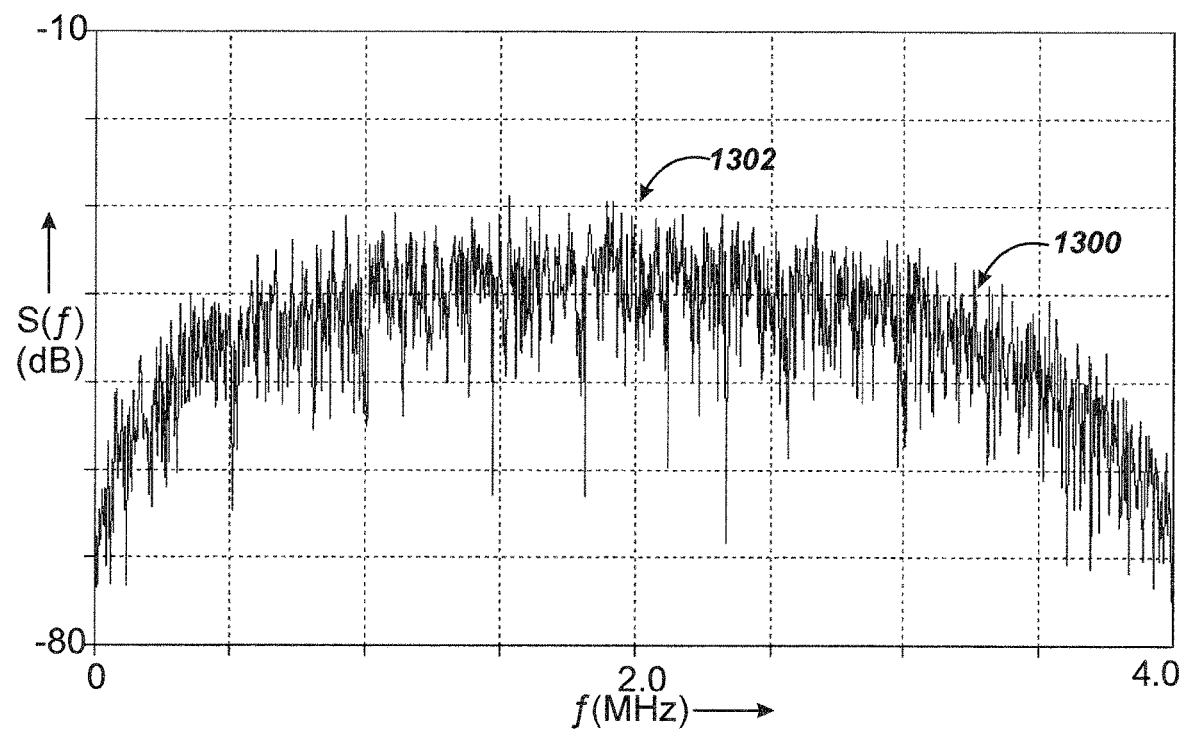
FIG. 13 is a graph illustrating the signal of FIG. 11 in the spectral domain.
Figure 14:
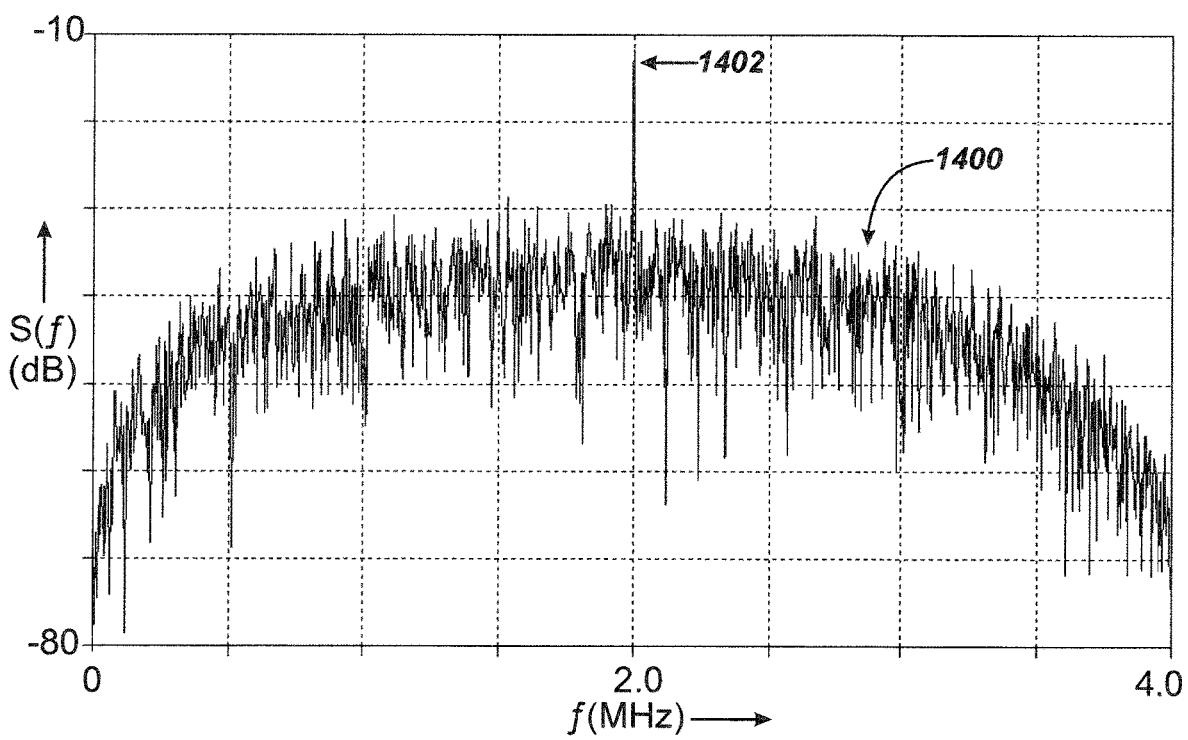
FIG. 14 is a graph illustrating the signal of FIG. 12 in the spectral domain.

But examining these same two baseband transmitter output signals 1100 and 1200 in the frequency domain provides additional useful insight into the baseband symbol clock recovery problem and the method of this invention. FIG. 13 provides a baseband transmitter output spectrum 1300 illustrating baseband transmitter output signal 1100 (FIG. 11) in the spectral domain and FIG. 14 provides a baseband transmitter output spectrum 1400 illustrating baseband transmitter output signal 1200 (FIG. 12) in the spectral domain. Even though system performance is degraded by 2 dB because of the 2 dB increase in RMS power in baseband transmitter output signal 1200 over the RMS power in baseband transmitter output signal 1100, the power at the baseband symbol clock frequency 1402 in baseband transmitter output spectrum 1400 now rises above the remainder of the spectrum by about 18 dB compared to the power at the baseband symbol clock frequency 1302 in baseband transmitter output spectrum 1300. This is more than adequate to facilitate a very simple means for symbol clock timing recovery in the manner now discussed. Note that the two baseband transmitter output spectra 1300 and 1400 are substantially identical except for the 18 dB spike at the baseband symbol clock frequency 1402 (FIG. 14).

Figure 15:
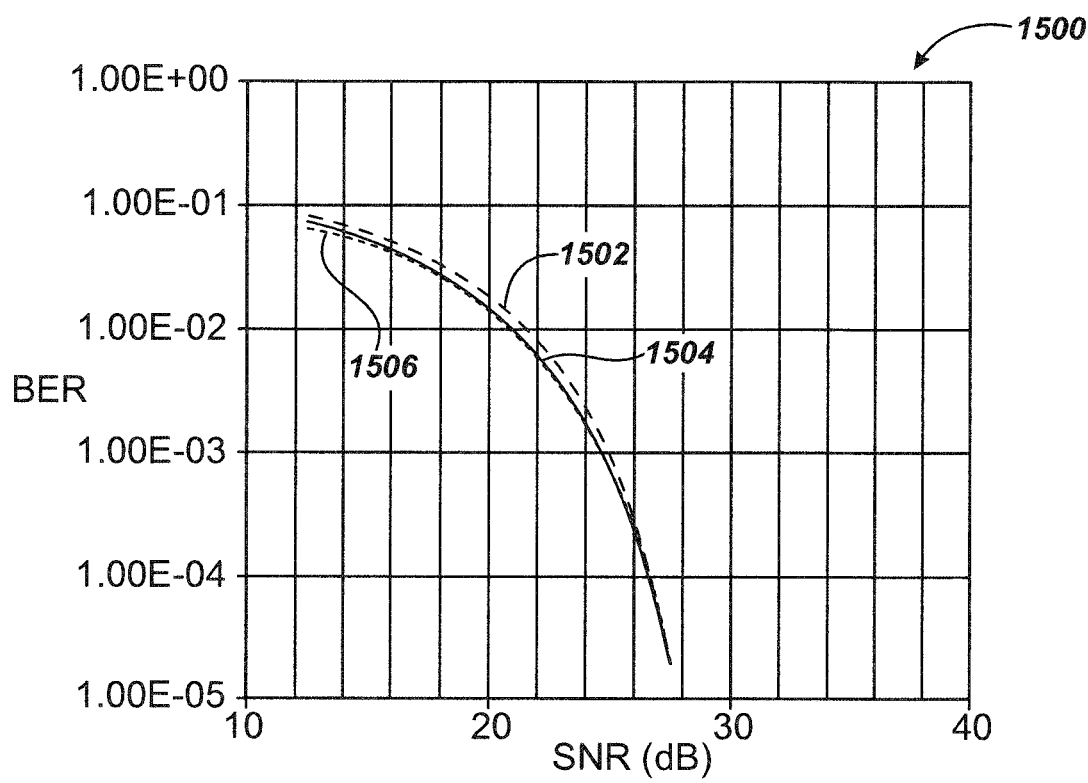
FIG. 15 is a graph illustrating the theoretical BER characteristics for several 256-QAM system embodiments of this invention.

FIG. 15 is a graph 1500 illustrating the theoretical BER under various operating conditions for 256-QAM communications system embodiments of this invention using asymmetric symbol constellation 400 (FIG. 5A). The BER curve 1502 provides the predicted BER of QAM modulator and demodulator embodiment 1010 with offset 1020 set to +5.0 units and is identical to curve 904 from FIG. 9.

Figure 10B:
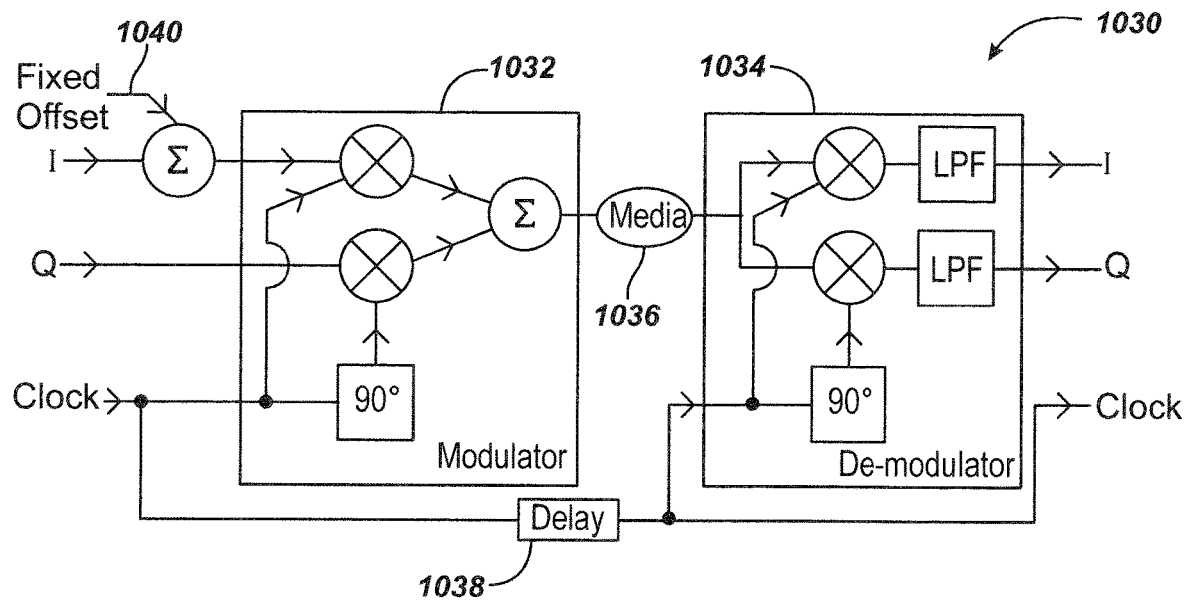
FIG. 10B is a block diagram illustrating a second embodiment of a QAM modulator and demodulator of this invention using a cable and preamplifier channel and a delayed modulator baseband symbol clock signal at the demodulator.

In FIG. 15, the BER curve 1504 provides the predicted BER of the QAM modulator and demodulator embodiment 1030 shown in FIG. 10B. As shown in FIG. 10B, embodiment 1030 includes a QAM modulator 1032 coupled to a QAM demodulator 1034 through a cable and preamplifier signal channel 1036. The original baseband symbol clock signal 1038 is assumed to be provided to QAM demodulator 1034 with delay only and no distortion. The performance of BER curve 1504 is not significantly different from BER curve 1502 because the delayed but otherwise unaffected baseband symbol clock signal is also available at QAM demodulator 1034.

Figure 10C:
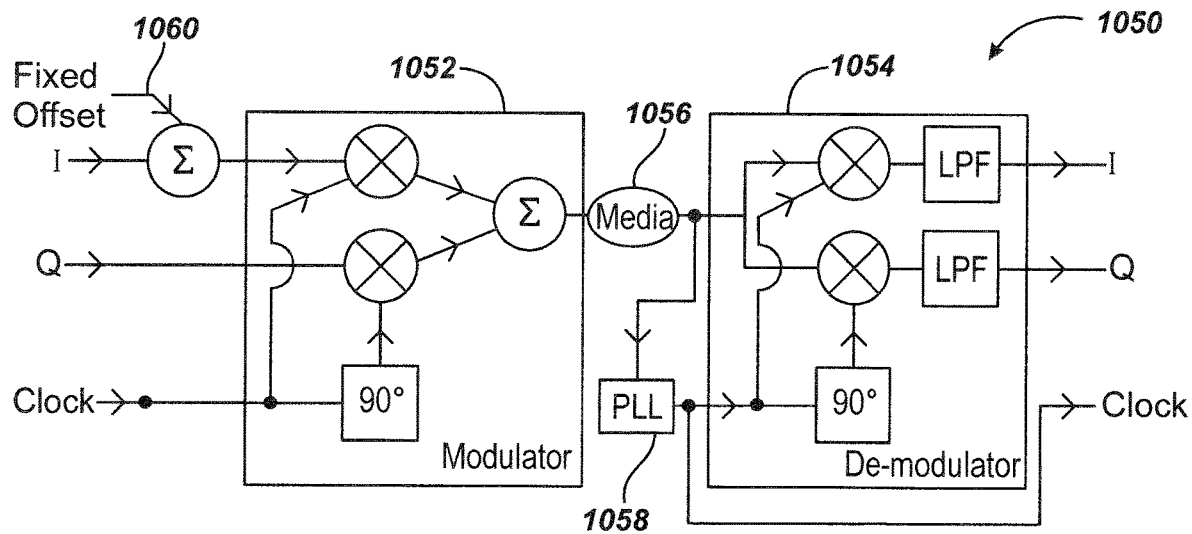
FIG. 10C is a block diagram illustrating a third embodiment of a QAM modulator and demodulator of this invention using a cable and preamplifier channel and a PLL for demodulator baseband symbol clock recovery.

In FIG. 15, the BER curve 1506 provides the predicted BER of the QAM modulator and demodulator embodiment 1050 shown in FIG. 10C and is generally indistinguishable from BER curve 1502 because of the advantageous effects of the asymmetric symbol constellation 400 (FIG. 5A) used in accordance with the method of this invention. As shown in FIG. 10C, embodiment 1050 includes a QAM modulator 1052 coupled to a QAM demodulator 1054 through a cable and preamplifier signal channel 1056. The baseband symbol clock timing is recovered at QAM demodulator 1054 by means of a simple PLL 1058. Curve 1504 BER performance is not significantly different from curve 1502 because the 18 dB spike at the baseband symbol clock frequency 1402 (FIG. 14) permits the reliance on a "simple" PLL 1058 for effective clock recovery, for the first time.

Note that the advantages of the method of this invention may be appreciated by comparing BER curve 706 (FIG. 7) to BER curve 1506 (FIG. 15). Although both examples use simple PLL baseband symbol clock recovery, the performance of BER curve 1506 demonstrates that there is no additional timing recovery penalty. Timing can be recovered without appreciable performance loss using the simple and inexpensive recovery means exemplified by PLL 1058 (FIG. 10C).

And there are additional benefits as well, including the availability of the large single frequency spike at the baseband symbol clock frequency 1402 (FIG. 14) for predicting abnormalities in signal channel 306 (FIG. 4). Referring to FIG. 4, this channel prediction capability facilitates the simplification of signal conditioner 344, which represents the only remaining element of QAM communications system 300 having any significant complexity or expense. Recall that the remainder of baseband symbol clock detector 350 and all other remaining complexity in QAM data receiver 304 are embodied within the simple and inexpensive DSP 359.

This asymmetric symbol constellation technique differs significantly from and avoids several disadvantages (e.g., increased signal envelope fluctuation and spectral spreading) of a concept for inserting a separate tone in the transmitted signal to facilitate measurement of signal channel characteristics that is sometimes denominated Transparent-Tone-In-Band (TTIB) modulation. The TTIB concept neither considers nor suggests using a simple offset signal to shift the baseband symbol clock constellation about the phase plane as described above. TTIB requires the creation of a separate tone and insertion into the channel in the communications band. The separate tone must then be removed somehow from the received signal before attempting demodulation and decoding. This adds complexity and expense to the communications system rather than reducing complexity. The TTIB modulation may be characterized as offsetting the baseband symbol clock signal in time instead of offsetting the baseband symbol constellation in amplitude on the phase plane and results in generating overlapping sidebands, thereby altering the frequency spectrum and bandwidth of the transmitted signal. This introduces additional well-known problems that may be appreciated with reference to, for example, McGeehan et al. ["Phase-Locked Transparent Tone In Band (TIM): A new spectrum configuration particularly suited to the transmission of data over SSB mobile radio networks," IEEE Transactions on Communications, vol COM32, 1984] and Hanzo et al. ["Quadrature Amplitude Modulation," Second Edition, IEEE Press, 2004, John Wiley].

Figure 16:
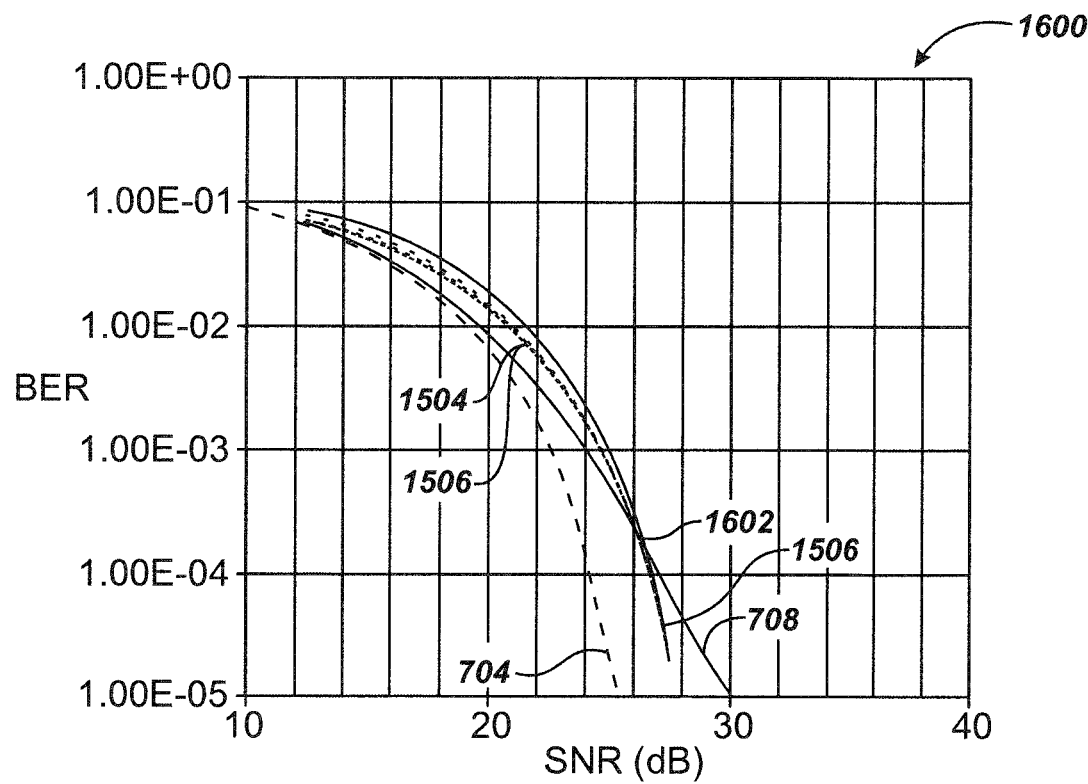
FIG. 16 is a graph comparing the theoretical BER characteristics from FIG. 15 to several BER characteristics from FIG. 7.

The utility and advantage of embodiments of the invention may be appreciated with reference to FIG. 16, which is a graph 1600 comparing BER curves 704 and 708 from FIG. 15 to BER curves 1502 and 1506 from FIG. 7. Recall that BER curve 704 provides the system BER performance assuming perfect recovery of the original baseband symbol clock signal 838 at QAM demodulator 834 (FIG. 8B). And BER curve 708 provides just about the best system BER performance known in the QAM art for a real signal channel and is obtained only by using any sophisticated baseband symbol clock timing recovery mechanism known in the art for exotic recovery means 878 (FIG. 8D). Note that, compared to BER curve 708, BER curves 1502 and 1506 both show superior BER performance below the BER value represented by a crossover point 1602 (about 2E-04 to 3E-04 in this example) and falls only 1-2 dB behind BER curve 708 at the BER values well above crossover point 1602. In other words, the method and system of this invention improves BER performance over the QAM prior art in any application operating beyond crossover point 1602 (SNR=about 26 dB in this example) and does this with substantially less complexity and expense.

By offsetting the 2-D baseband symbol constellation with respect to the phase plane origin, symbol clock leakage is inserted into the transmitted QAM signal. While this slightly degrades static BER performance alone, this discussion discloses for the first time that the asymmetrical constellation actually improves overall system performance when considering baseband symbol clock recovery and received signal compensation for an imperfect signal channel. This improvement, for the first time, allows QAM to be deployed in systems where QAM is otherwise prohibitively expensive. This improvement, for the first time, also allows overall system per-tem performance to be improved for any existing QAM system without additional bandwidth, cost or complexity.

As is known in the art, QAM systems are typically designed to have no energy at the symbol clock frequency, nor can the symbol clock be recovered by applying a non-linearity to a received signal, such as by applying square-law processing, to recover energy at the clock frequency or a related frequency. The examples described previously herein (as well as additional subsequent examples described with respect to FIGS. 27-32) generate output signals having finite energy at the symbol clock frequency to take advantage of this distinction.

However, in another aspect, a symbol constellation having an asymmetry with zero energy at a symbol clock frequency, but allowing for recovery of the clock signal by applying a non-linearity to the received signal, such as by squaring (self-mutipying) the received signal or a processed/filtered version of the received signal, may be advantageously used in some embodiments to allow for clock recovery and self-synchronization. These symbol constellations, example of which are further described below with respect to FIGS. 20-25, may be denoted as zero-clock energy constellations or ZCECs. ZCECs may be implemented by providing a symbol constellation that is asymmetric but maintains mirror symmetry in at least one axes or lines through the constellation origin, such as through the I or Q axes, with applied uniformly distributed random input data.

Alternately, or in addition, ZCECs may be implemented by use of a symmetric constellation, such as the constellation shown in FIG. 1 (or other constellations having symmetry about the I and/or Q axes), by adjusting the incoming data, such as in an encoder or other processor, so that the data is mapped to the symbols to provide an offset (e.g., the incoming data is either non-random or non-uniformly distributed coming in or is otherwise adjusted, such as by processing the data to have an offset or bias in probability, such as by making the probability of a binary one value greater than 0.5 (and making the probability of a binary zero value correspondingly less than 0.5).

Figure 20:
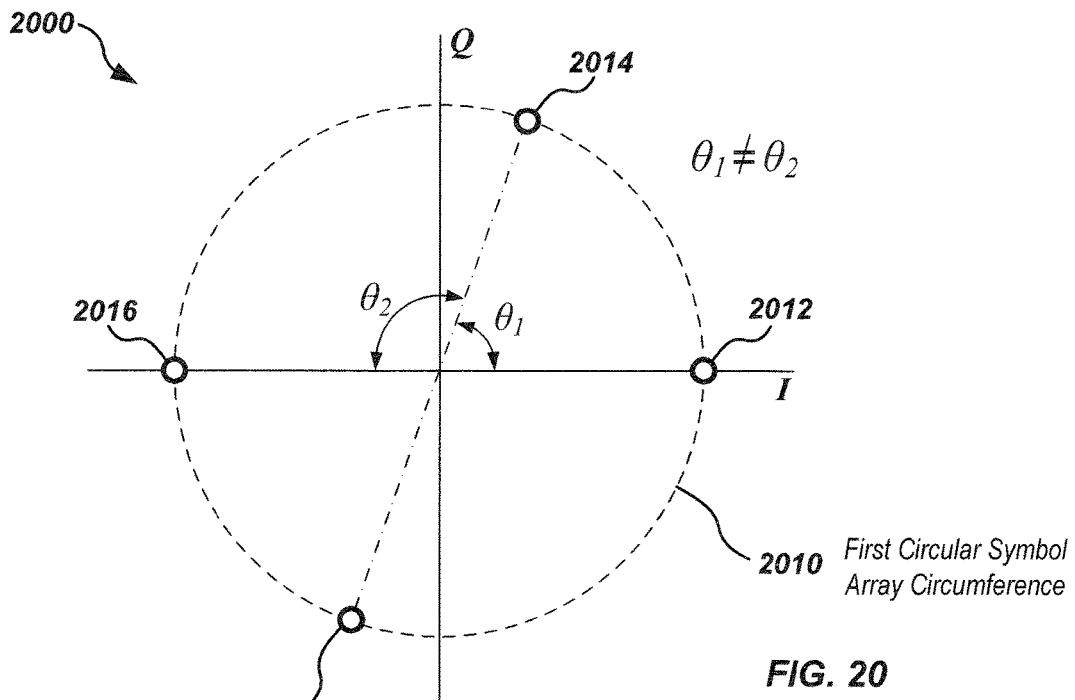
FIGS. 20-25 illustrate various embodiments of symbol constellations having zero clock frequency energy and mirror symmetry.

Rectangular asymmetric symbol constellations were described previously herein with respect to FIGS. 5A and 5B and may be used in some embodiments. However, ZCEC symbol constellations, which have mirror symmetry, may be used instead of or in addition to constellations such as shown in FIGS. 5A and 5B. Examples of such constellation embodiments are illustrated in FIGS. 20-25. For example, FIG. 20 illustrates an embodiment of a circular symbol constellation 2000 including a plurality of symbol points (in the example, points 2012, 2014, 2016, and 2018) on a constellation circle 2010. Although four symbol points are shown in this example on the circle, other numbers of symbol points may be disposed on circle 2010 in various embodiments. In addition, as described subsequently, some symbol constellations may include multiple circles and/or additional symbol points, such as symbols mapped to rectangular symbol points.

Returning to FIG. 20, in circular symbol constellation 2000, incoming data may be mapped by a data mapping module to one of the four symbol points shown, such as by using gray coding (e.g., 2 bits may be mapped to each symbol such that each symbol varies by only one digital bit) for transmission. The incoming data may be encoded before being applied to a symbol mapping module, such as to mitigate noise, channel characteristics, etc.

Mapping is typically done using random incoming data and/or non-random incoming data that is randomized, such as at an encoder or other processing element, before being mapped in di-bits to the symbols. For example, in the constellation shown in FIG. 20, incoming data may be divided into di-bits and then mapped according to a mapping rule such as di-bit (1,0) to symbol 2016, di-bit (1,1) to symbol 2014, di-bit (0,1) to symbol 2010, and di-bit (0,0) to symbol 2018. Other mappings may be used in various embodiments, such as mapping in tri-bits when 8 symbol points on one or more circles are used, etc.

Figure 26:
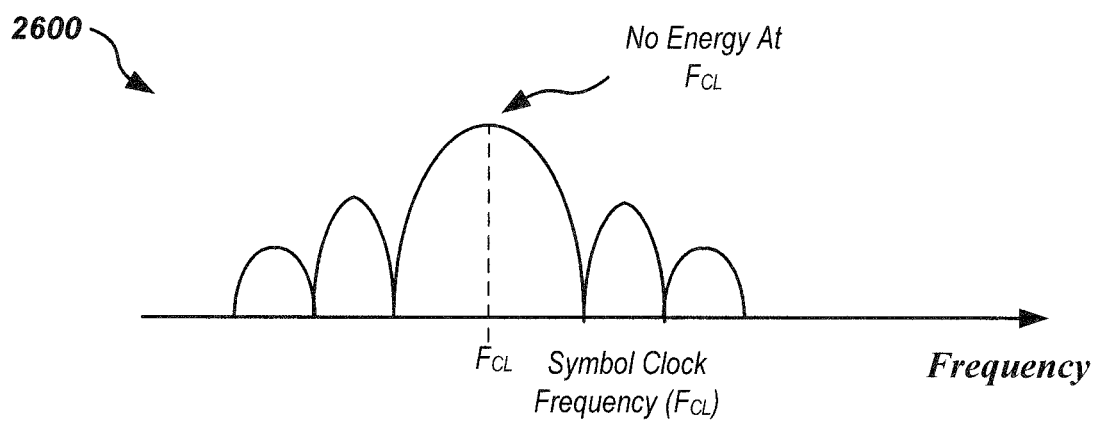
FIG. 26 illustrates an example output signal spectrum corresponding with the symbol constellations of FIGS. 20-25.

If the incoming data is randomized at the time of mapping, the resulting transmitted signal will have a zero clock frequency component, such as shown in the example spectrum of FIG. 26, where there is no finite energy at the clock frequency $F_{CL}$. In effect, the energy of symbol pairs (2012, 2016) and (2014, 2018) will cancel each other to result in zero clock frequency energy in the transmitted signal, and no finite clock frequency component (as contrasted to the example spectra of FIGS. 13 and 14, where clock frequency components 1302 and 1402, respectively, occur within the transmitted signal spectra 1300 and 1400).

If angles $\theta_1$ and $\theta_2$ are equal, a standard QPSK signal constellation results. However, if the angles $\theta_1$ and $\theta_2$ are configured to be non-equal (e.g., by non-uniformly spacing at least two pairs of points on circle 2010 of symbol constellation 2000), a signal component of non-zero energy may be recovered at the clock frequency at a corresponding receiver by applying non-linearity processing, such as by squaring, to the received signal. This signal recovery processing at the receiver is discussed in further detail subsequently herein.

In the example asymmetric symbol constellation 2000 of FIG. 20, the received signal may be non-linearly processed, such as by doubling the incoming frequency by squaring, to recover clock. As the transmitted signal has no amplitude modulation, two symbol constellation points, or "phases", rest on the I-axis (i.e., symbol points 2012 and 2016. The remaining constellation points, 2014 and 2018, are mirror symmetrical, but offset, with respect to the Q-axis. Thus, the four phases are spaced non-uniformly to give a circular symbol constellation 2000. Constellation points 2014 and 2018 indicate the relative displacement, or degree of phase offset with respect to the Q-axis. The symbols may be offset in pairs, however, they not need to be. The degree of phase offset is similar to that of the degree of amplitude offset as illustrated in FIGS. 5A and 5B. With phase offset displaced in this manner, there is no increase in carrier level. However, by doubling the incoming data stream at the receiver, a twice carrier frequency component becomes available for symbol clock recovery.

In general, the concept illustrated in FIG. 20 can be applied to any symbol constellation having two or more non-uniformly spaced symbol points with mirror symmetry, such as about the I and/or Q axes. For example, in FIG. 21, an alternate symbol constellation embodiment 2100 is shown with 8 symbol points (2111 through 2118), and the spacing between at least two pairs of points along circle 2110 (e.g., symbol points 2111, 2112, and 2112, 2113) is different. In particular, angles $\theta_1$ and $\theta_2$ as shown are non-equal angles, which may be used to recover a signal component at the receiver by applying the received signal to a non-linearity, such as by squaring.

Figure 22:
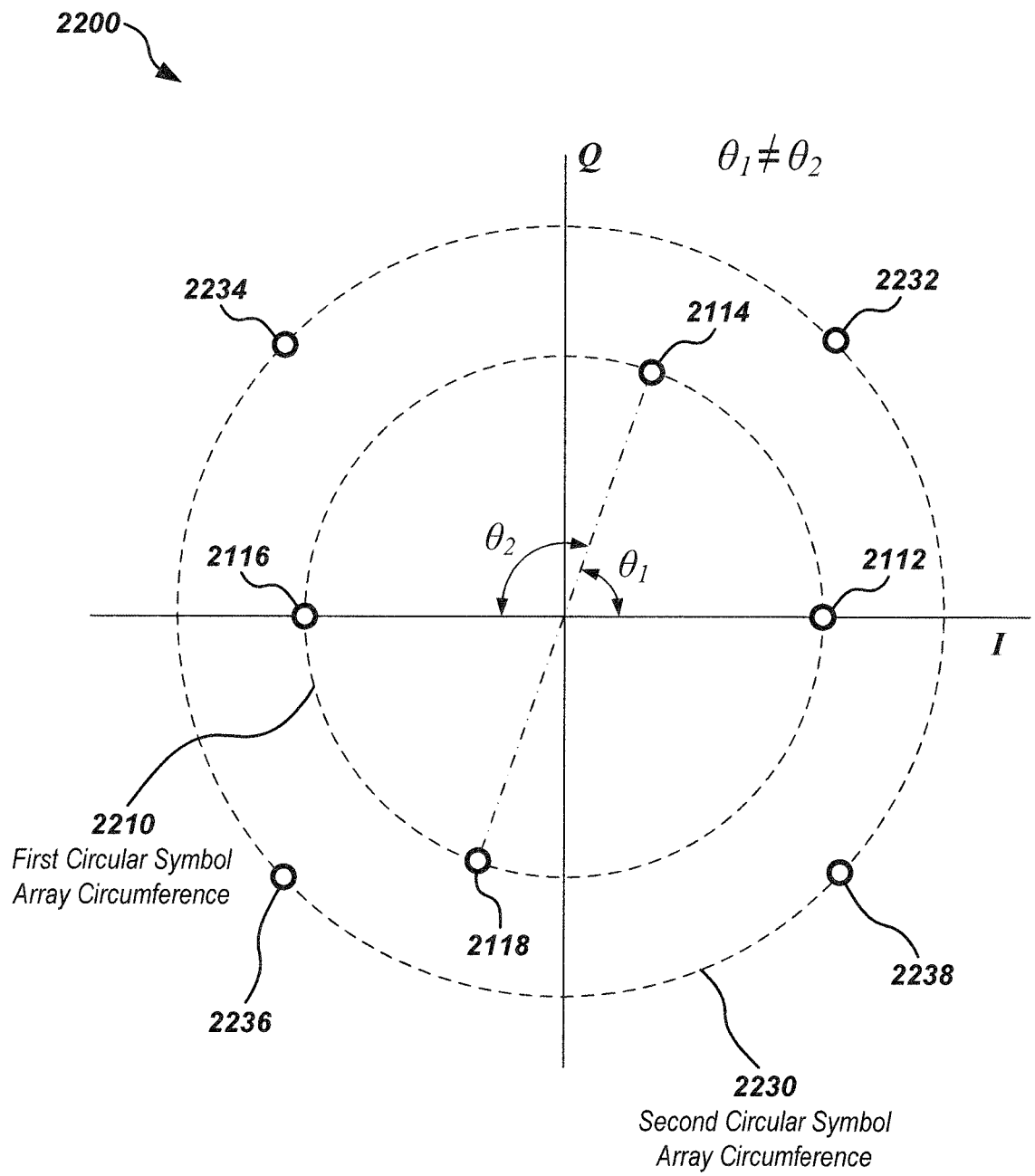

FIG. 22 illustrates details of another circular symbol constellation embodiment 2200 which includes two circles, 2210 and 2230. Symbol points 2112, 2114, 2116, and 2118 are disposed on the first circle 2210, and symbol points 2232, 2234, 2236, and 2238 are disposed on the second circle 2230. At least two pairs of symbols, such as symbol pairs (2114, 2118) and (2112, 2116) are non-uniformly spaced on their respective circles in a mirror symmetry configuration, such as in the configuration shown. In other embodiments, additional symbols, such as symbols on circle 2230, may also be non-uniformly spaced on their respective circles so as to create a constellation having zero clock frequency energy.

Figure 23:
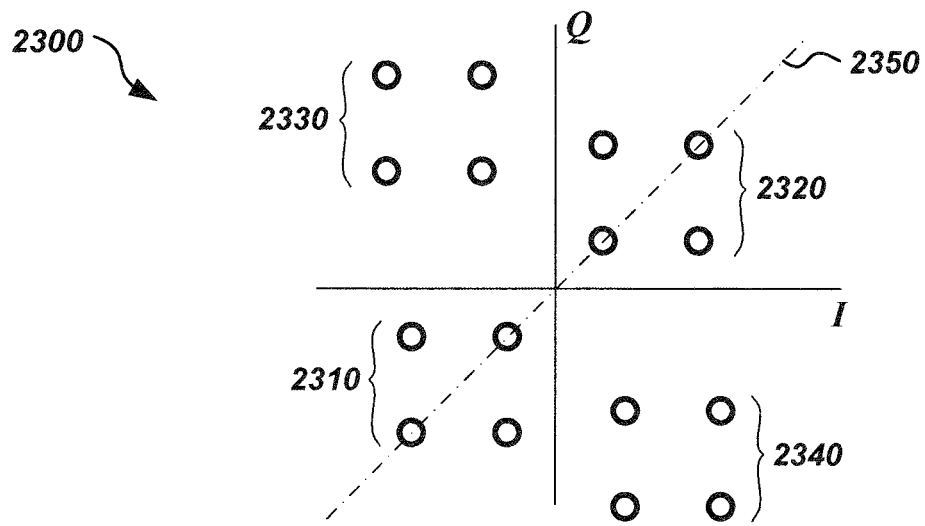
Figure 24:
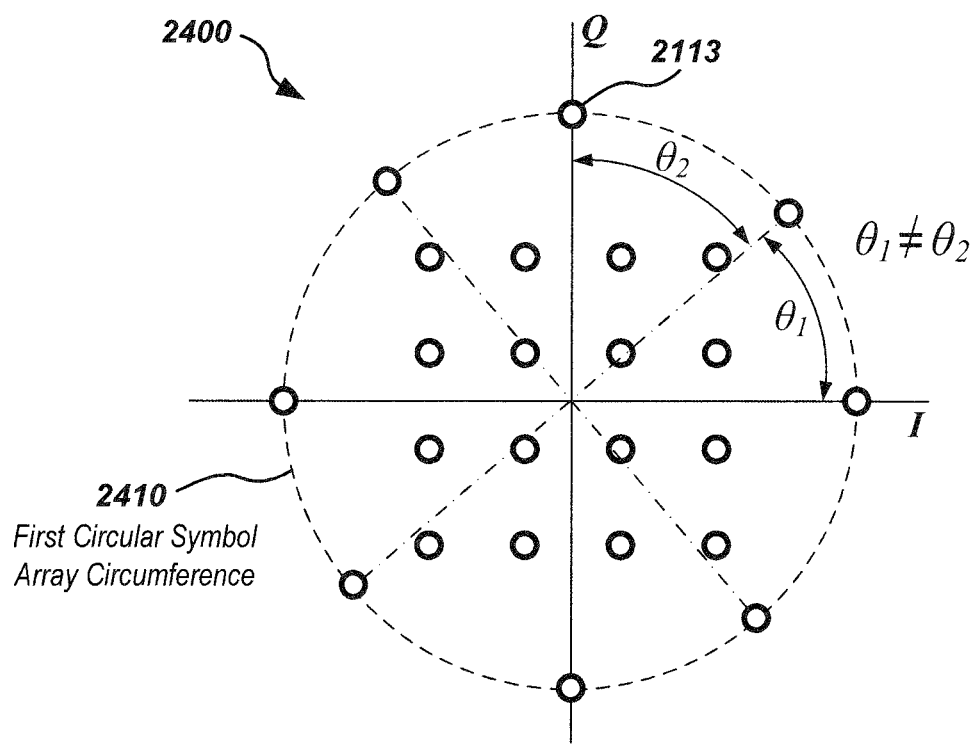
Figure 25:
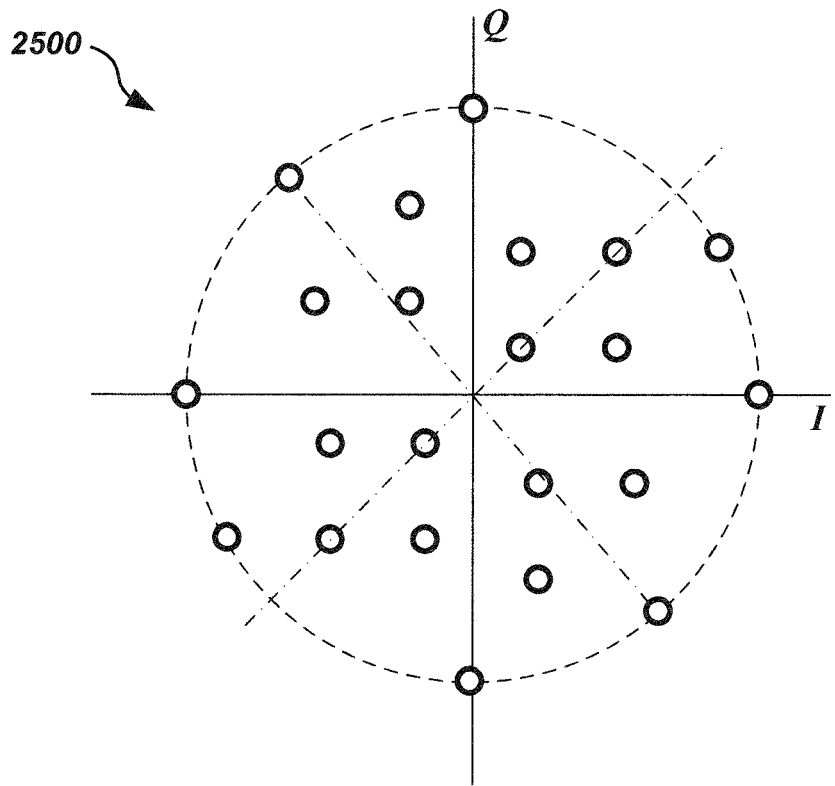

Additional example constellation embodiments 2300, 2400, and 2500 are shown in FIGS. 23, 24, and 25, respectively. For example, constellation 2300 includes a rectangular symbol constellation with 16 symbol points grouped into four sets, 2310, 2320, 2330, and 2340. Symbol sets 2330 and 2340 are offset from the I and Q axes differently than sets 2310 and 2320, thereby providing a symbol constellation with zero symbol clock frequency energy, while maintaining mirror symmetry about the I and Q axes. Other rectangular constellations having different symbol numbers and/or spacing, while maintaining mirror symmetry, may alternately be used.

Figure 21:
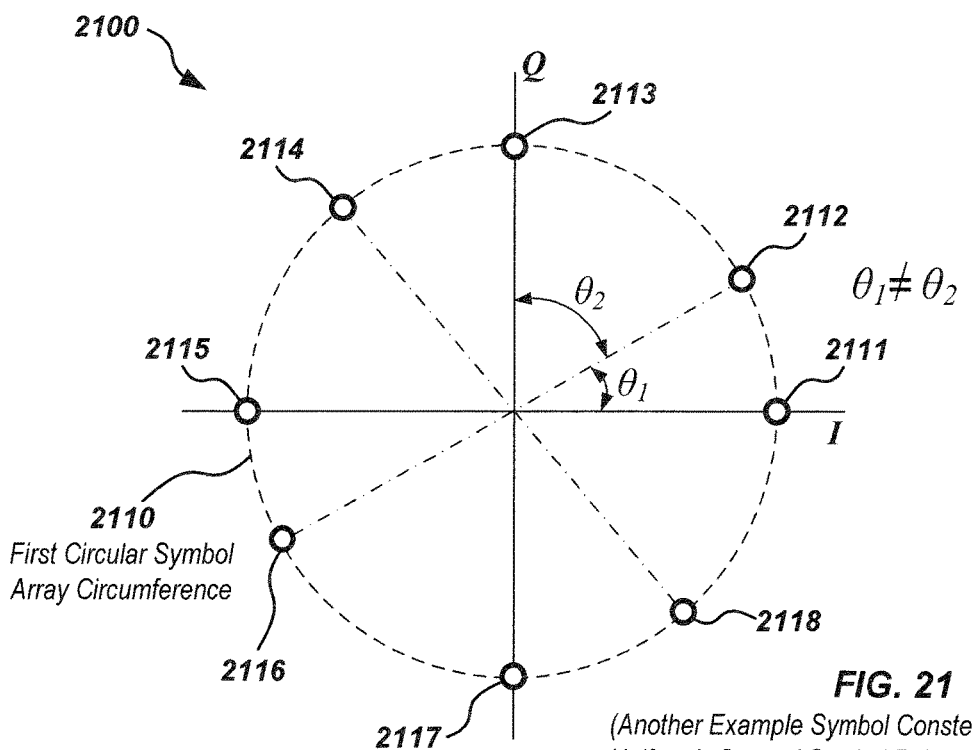

Symbol constellation 2400 includes a combination of circular and rectangular symbol configurations, corresponding to a combination of the mirror symmetric constellation of FIG. 21 and a rectangular (square) constellation. In various embodiments, the mirror symmetry may include the circular symbols, rectangular symbols, or both. For example, FIG. 25 illustrates another symbol constellation embodiment 2500, which includes mirror symmetric circular symbols, similar to those shown in FIG. 21, along with mirror symmetric rectangular symbols, similar to those shown in FIG. 23 (but with fewer symbols in the vicinity of the circular symbol points).

Figure 27:
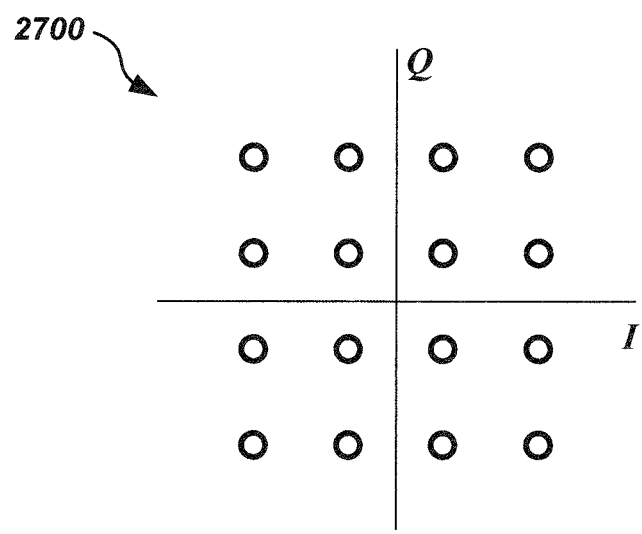
FIG. 27 illustrates an example symmetric rectangular symbol constellation to which non-uniformly distributed data may be applied to generate an output signal having finite clock frequency energy.

In another aspect, rather than use of asymmetric symbol constellations, such as shown in FIGS. 5A & 5B, a symmetric constellation, such as shown in FIG. 27, may be used in combination with a non-random input data stream to generate signals having energy at the symbol clock frequency. As noted previously, if the incoming data bits are random and mapped to a symmetric constellation, no energy at the clock frequency will be generated in the output signal. However, if the incoming data stream is non-random, and/or is adjusted to include some non-random components, energy at the clock frequency will be generated in the output signal. For example, using the 16 point constellation shown in FIG. 27, with the incoming digital data mapped to quad-bits and one of the 16 symbol points (e.g., quad-bits 0000, 0001, . . . 1111 mapped to corresponding ones of the 16 symbols), if the probability of a binary 1 at the input is greater than 0.5, with the probability of a binary zero correspondingly offset (e.g., less than 0.5) the output signal will have finite energy at the clock frequency, similarly to the resulting output signal spectrum corresponding to the symbol constellations of FIGS. 5A & 5B.

Figure 28:
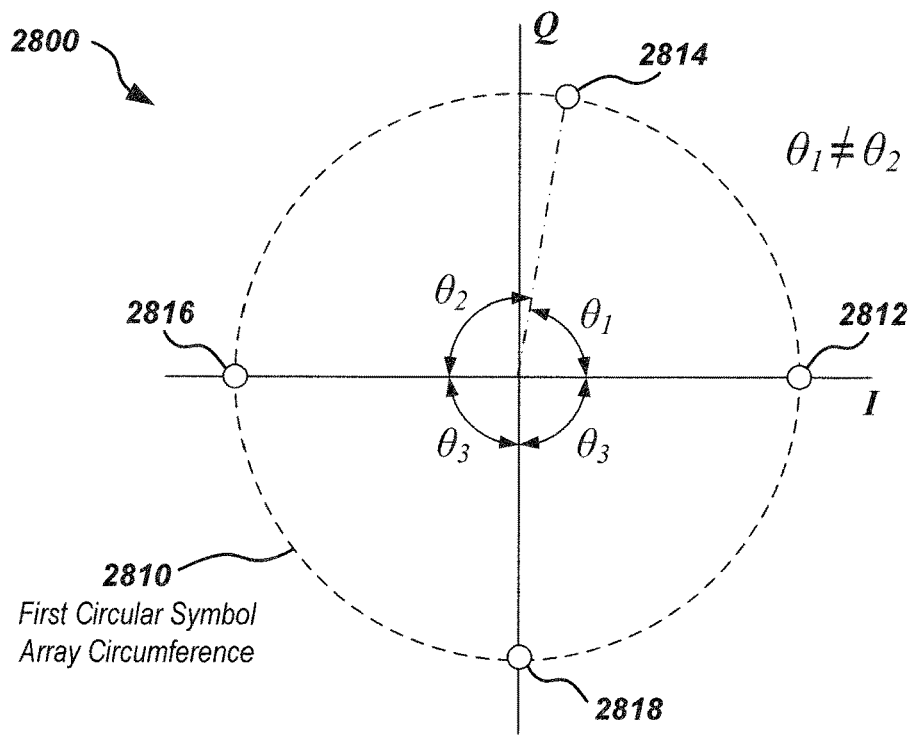
FIGS. 28-32 illustrate various embodiments of symbol constellations having finite clock frequency energy.

In another aspect, an output signal having finite energy at the clock frequency may be generated by using a circular symbol constellation having non-uniform spacing between symbol points in a non-mirror symmetric configuration. For example, such a circular symbol constellation embodiment 2800 is shown in FIG. 28. Circular symbol constellation 2800 includes four symbol points, 2812, 2814, 2816, 2818 on a circle 2810. At least one of the symbol points may be non-uniformly spaced on circle 2810, such as symbol point 2814, which is offset relative to the other three symbol points (e.g., angles $\theta_1$, $\theta_2$, and $\theta_3$, are different). As such, the circular symbol constellation is not mirror symmetric as with the constellations shown in FIGS. 20 through 25, and will therefore have finite energy at the clock frequency (assuming uniformly distributed random input data). Received signals with finite energy at the clock frequency may be decoded at a received such as described previously herein with respect to the symbol constellations shown in FIGS. 5A & 5B.

Figure 29:
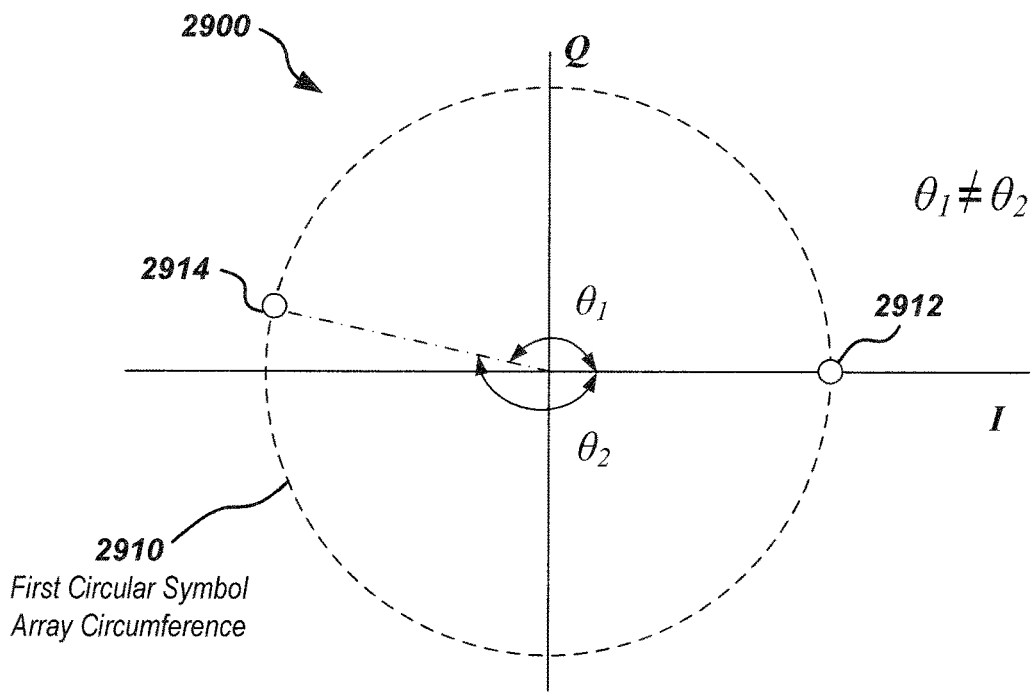
Figure 30:
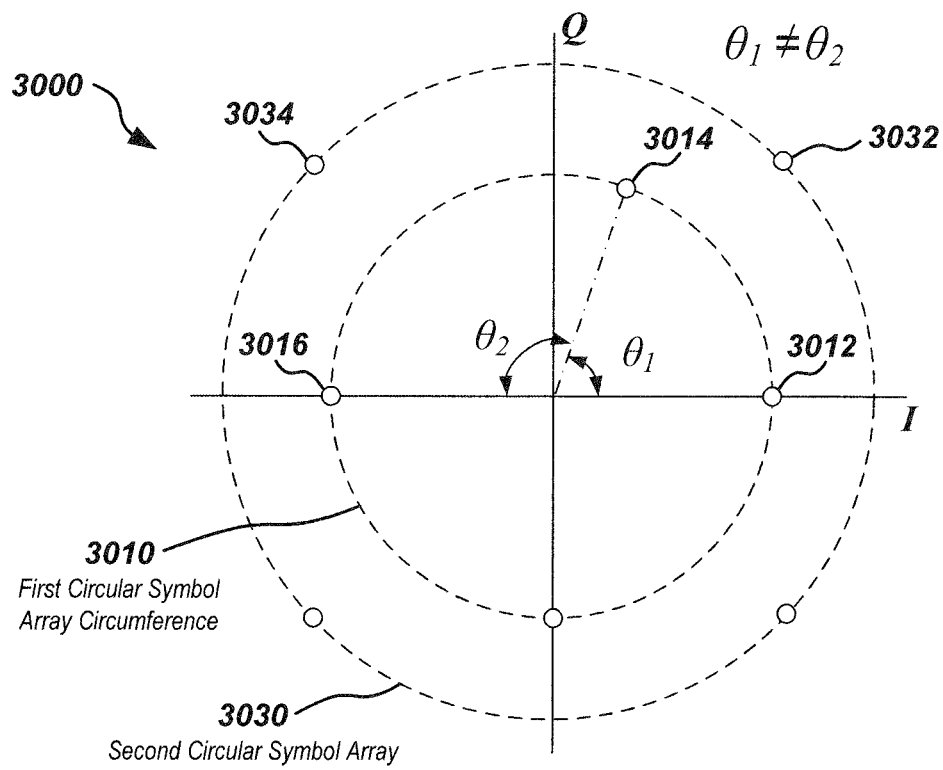
Figure 43:
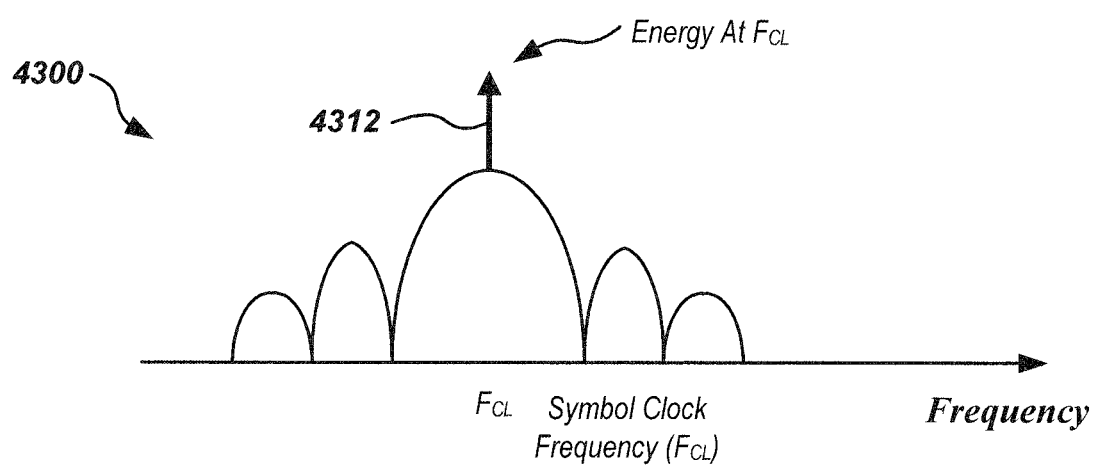
FIG. 43 illustrates details of an example output signal spectrum corresponding with the symbol constellations of FIGS. 28-32.

Additional examples of circular symbol constellation embodiments having asymmetry with finite clock frequency energy are shown in FIGS. 29 and 30. In constellation 2900 shown in FIG. 29, which is similar to a phase shift keying (PSK) constellation, symbol point 2912 is located along the I axis, while symbol point 2914 is offset slight above the I axis, thereby having a Q component (e.g., angles $\theta_1$ and $\theta_2$ are not equal), resulting in non-uniformly spaced symbol points. In this circular symbol constellation configuration, finite energy will be generated in the output signal at the symbol clock frequency, such as shown in FIG. 43 as spectral component 4312 of spectral diagram 4300.

The circular symbol constellation embodiment 3000 as shown in FIG. 30 includes multiple symbol circles 3010 and 3020, with corresponding symbol points distributed on each of the circles. At least one of the symbol points on at least one of the circles may be non-uniformly distributed on the circle to generate finite energy at the clock frequency, similarly to as described with respect to FIG. 29, with a resulting spectrum similar to the spectrum shown in FIG. 36. In the example shown in FIG. 30, symbol point 3014 is non-uniformly distributed on circle 3010 with respect to symbol points 3012 and 3016, however, in other embodiments, additional and/or other symbol points, such as, for example, symbol points 3032 or 3034, may be non-uniformly distributed on their corresponding circles.

Figure 31:
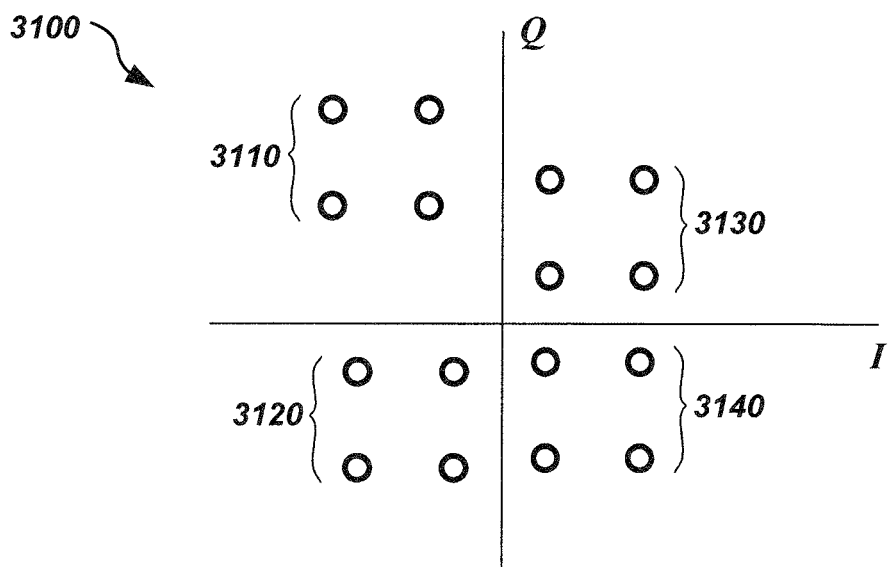

FIG. 31 illustrates a rectangular symbol constellation embodiment 3100 having 16 symbol points in four groups of four points, 3110, 3120, 3130, and 3140. In this embodiment, group 3110 is offset asymmetrically as compared to groups 3120, 3130, and 3140. In alternate embodiments, various other symbol point non-uniformities may be used to similarly generate finite energy in an output signal at the symbol clock frequency.

Figure 32:
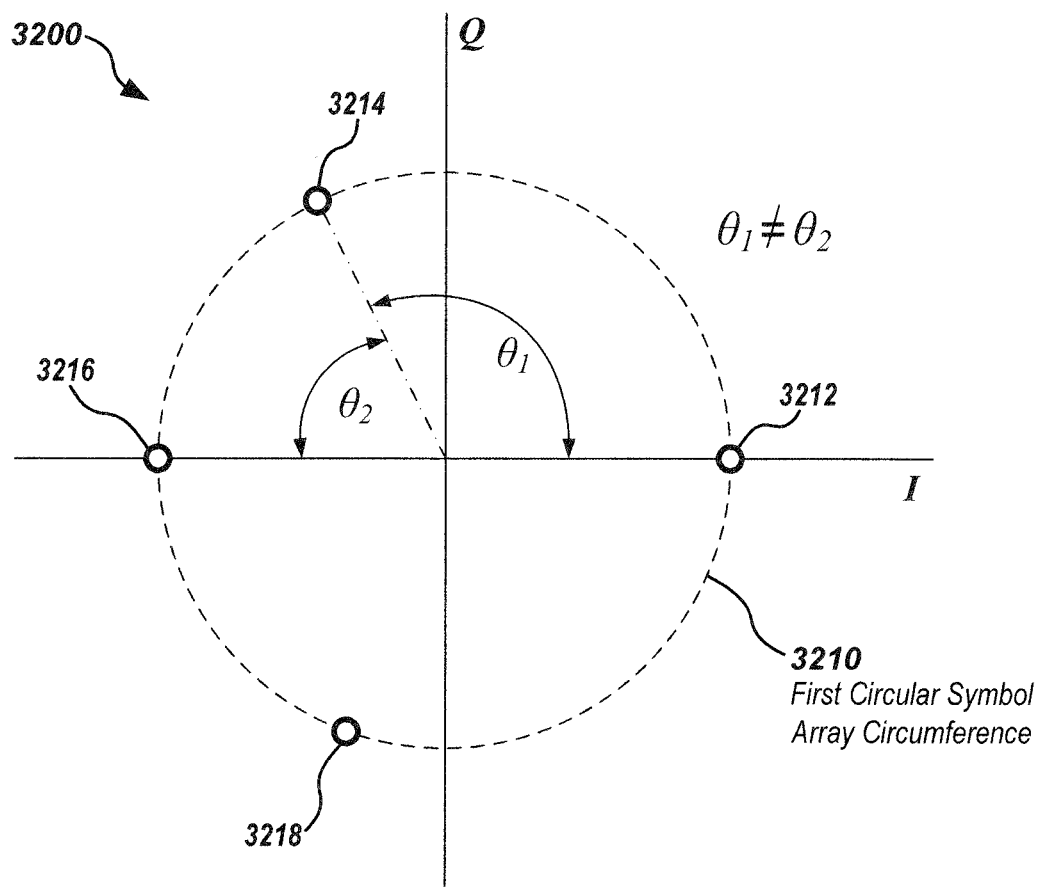

FIG. 32 illustrates another circular symbol constellation embodiment similar to constellation 2000 of FIG. 20, but having an alternately placed symbol point 3214 rather than symbol point 2014 of FIG. 20 (in this example, symbol points 3212, 3216, and 3218 correspond with symbol points 2012, 2016, and 2018, respectively). In implementations using this embodiment or similar embodiments, as the transmitted signal has no amplitude modulation, two symbol constellation points (3212 and 3216), or "phases", rest on the I-axis. The remaining constellation points (3214 and 3218) are asymmetrical and offset, with respect to the Q-axis, but both in the left half plane rather than being mirror asymmetric as in constellation 2000. Thus, the four phases are spaced non-uniformly to give an asymmetric circular constellation. Constellation points 3214 and 3218 indicate the relative displacement, or degree of phase offset with respect to the Q-axis. Although these points may be offset in pairs, they need not be. With phase offset displaced in this manner, there is finite energy at the carrier frequency, such that a carrier frequency component is available for symbol clock recovery.

The above-described symbol constellation techniques may be used in wide range of other constellation configurations beyond those specifically shown. For example, these constellations may be used in degenerate cases of phase-shift keying (PSK), amplitude-shift keying (ASK), as well as other systems using multiple symbol constellations.

Figure 33:
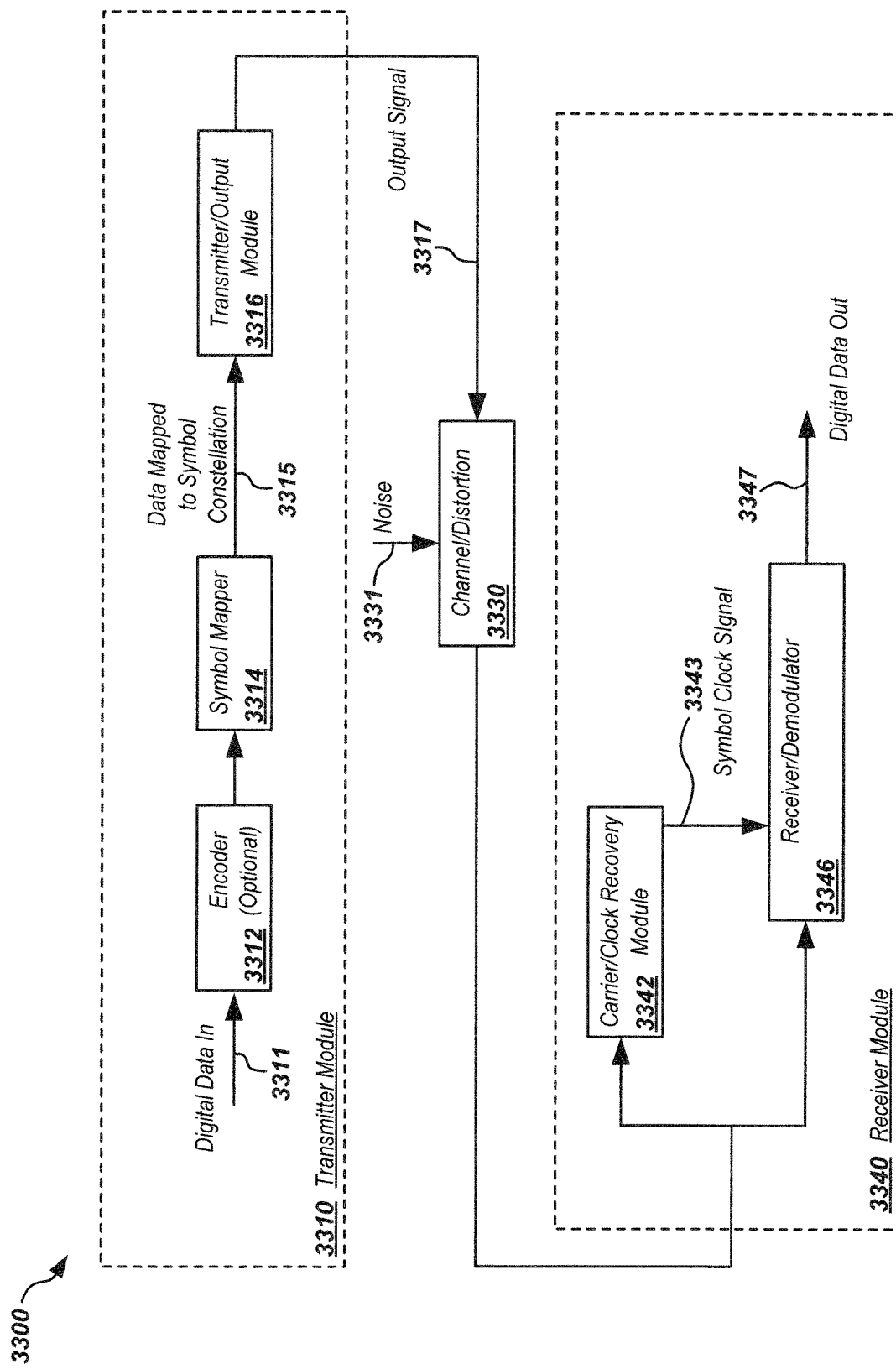
FIG. 33 illustrates an example system embodiment of a transmitter module and receiver module on which QAM signaling may be implemented.

FIG. 33 illustrates an example embodiment of a system 3300 including a transmitter module 3310 for generating modulated output signals using a symbol constellation with either mirror asymmetry with no clock frequency energy or asymmetry with finite clock frequency energy, such as described previously in FIGS. 20-25 and FIGS. 27-32, respectively, and corresponding receiver module 3340.

As shown in FIG. 33, incoming digital data may optionally be provided to an encoder 3312 module or other input processing, such as an interleaver as described previously herein, and then mapped, via a symbol mapping module 3314, to a symbol constellation as mapped data 3315. The symbol constellation may be a circular symbol constellation, a rectangular symbol constellation, a combination circular and rectangular symbol constellation, and/or another symbol constellation having similar characteristics to these described previously herein. At stage 3316, the mapped data may be amplified, modulated, filtered, and/or be subject to other output processing before being sent through a channel 3330, which may add noise 3331 and/or distortion to the output signal.

A received signal, which may be distorted and/or have added noise, may then be received at a receiver module 3340. The receiver module may be configured similarly to the receiver embodiments described previously herein, and/ or may include additional processing elements, such as a non-linearity processing element. For example, if the transmitted signal has zero or substantially zero energy at the clock frequency, such as signals generated using symbol constellations as described with respect to FIGS. 20-25, the received signal may be provided to a carrier/clock recovery module 3342 for symbol clock recovery. The symbol clock may be recovered by applying non-linear processing to the received signal. For example, by squaring the received signal, the squared received signal will include a finite energy component at a multiple of the clock frequency, which can then be divided down to recover the symbol clock.

The recovered symbol clock signal 3343 may then be provided to a receiver/demodulator module 3346 for use in decoding the received signal. Receiver/demodulator 3346 may include modules to perform inverse functions to those implemented in the transmitter, such as a de-mapper module 3348 to convert the received symbols to corresponding binary data, as well as other processing modules as are known in communications receivers (not shown for clarity). The decoded signal may then be provided as a digital data output 3349 for output, storage, and/or further processing. Other communication receiver functions, such as phase-locked loops, filtering, downconversion, and the like (not shown for clarity) may be included in receiver module 3340.

In embodiments using an asymmetric symbol constellation having finite energy at the clock frequency, such as with the symbol constellations shown in FIGS. 28-30, the received signal may be processed in a carrier/clock recovery module 3342 (or other module) similarly to the receiver processing described previously with respect to the symbol constellations of FIGS. 5A & 5B.

Figure 34:
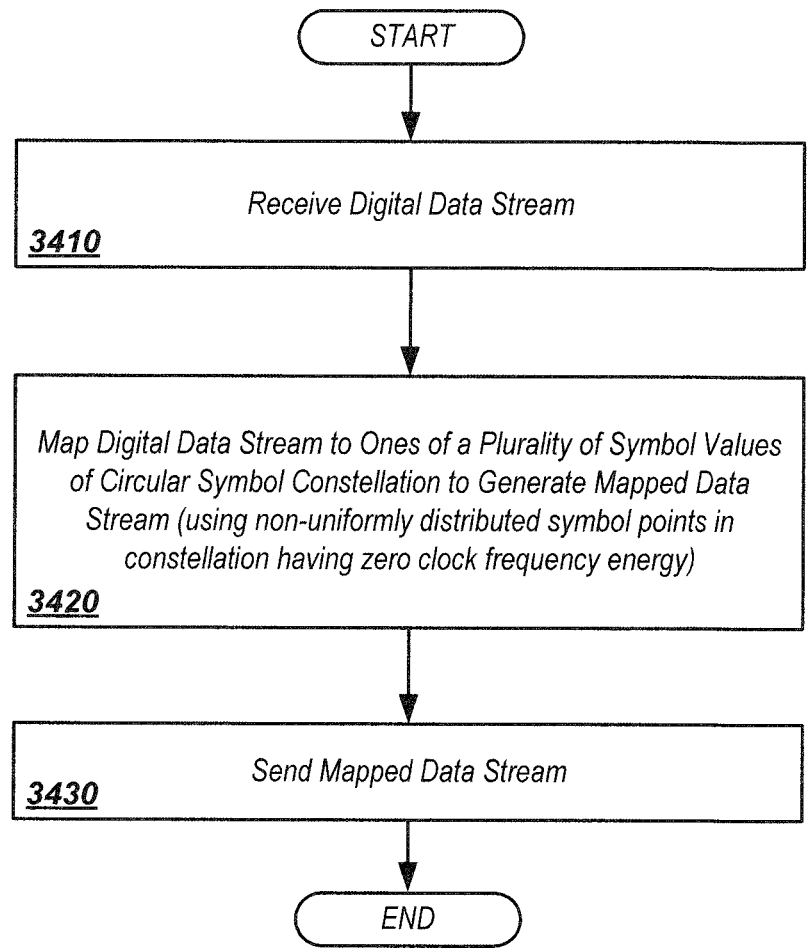
FIG. 34 illustrates an embodiment of a process for generating a QAM output signal having zero clock frequency energy.

FIG. 34 illustrates details of an embodiment of a process 3400 for generating a QAM signal with zero clock frequency energy that may be decoded by non-linear processing in a receiver. At stage 3410, a digital data stream may be received. At stage 3420, the digital data stream may be mapped to ones of a plurality of symbol values corresponding to points on a circular symbol constellation, including orthogonal I and Q axes, to generate a mapped data stream. The points defining the circular symbol array may be non-uniformly spaced such that the mapped data stream has substantially zero energy at a symbol clock frequency. At stage 3430, the mapped data stream may be sent to a receiver.

The circular symbol constellation may be, for example, a four point array defined on a first circle, and two symbol pairs may be non-uniformly spaced on the first circle in a mirror symmetry configuration about the I and/or Q axes. Alternately, the circular symbol constellation may be an eight point array defined on a first circle, and two or more symbol pairs may be non-uniformly spaced on the first circle in a mirror symmetry configuration about the I and/or Q axes. Alternately, the circular symbol constellation may be a sixteen point array and two or more symbol pairs may be non-uniformly spaced on one or more circles in a mirror symmetry configuration about the I and/or Q axes.

Alternately, the circular symbol constellation may be a sixty four point array and two or more symbol pairs may be non-uniformly spaced on one or more circles in a mirror symmetry configuration about the I and/or Q axes. Alternately, the circular symbol constellation may be a one hundred twenty eight point array and two or more symbol pairs may be non-uniformly spaced on one or more circles in a mirror symmetry configuration about the I and/or Q axes. Alternately, the circular symbol constellation may be a two hundred fifty six point array and two or more symbol pairs may be non-uniformly spaced on one or more circles in a mirror symmetry configuration about the I and/or Q axes. Alternately, the circular symbol constellation may be a five hundred twelve point array and two or more symbol pairs may be non-uniformly spaced on one or more circles in a mirror symmetry configuration about the I and/or Q axes.

The circular symbol constellation may include, for example, two or more circles with symbols disposed thereon, wherein two or more symbol pairs may be non-uniformly spaced on one or more of the circles in a mirror symmetry configuration about the I and/or Q axes. The circular symbol constellation may include a first circle and a second circle, and the digital data stream may be mapped to symbol points on the first circle and the second circle. A portion of the digital data may be mapped, for example, to ones of a plurality of symbol values corresponding to points on a rectangular symbol constellation.

The process 3400 may further include, for example, receiving the transmitted signal, applying the transmitted signal to a non-linearity module to recover the symbol clock, and decoding the received transmitted signal using the recovered symbol clock. The non-linear module may be a square-law processing module configured to square the received transmitted signal to facilitate symbol clock recovery.

The symbol clock recover may include, for example, narrowband filtering an output of the non-linearity device, and applying the output of the narrowband filter to a phase-locked loop to generate the symbol clock.

Figure 36:
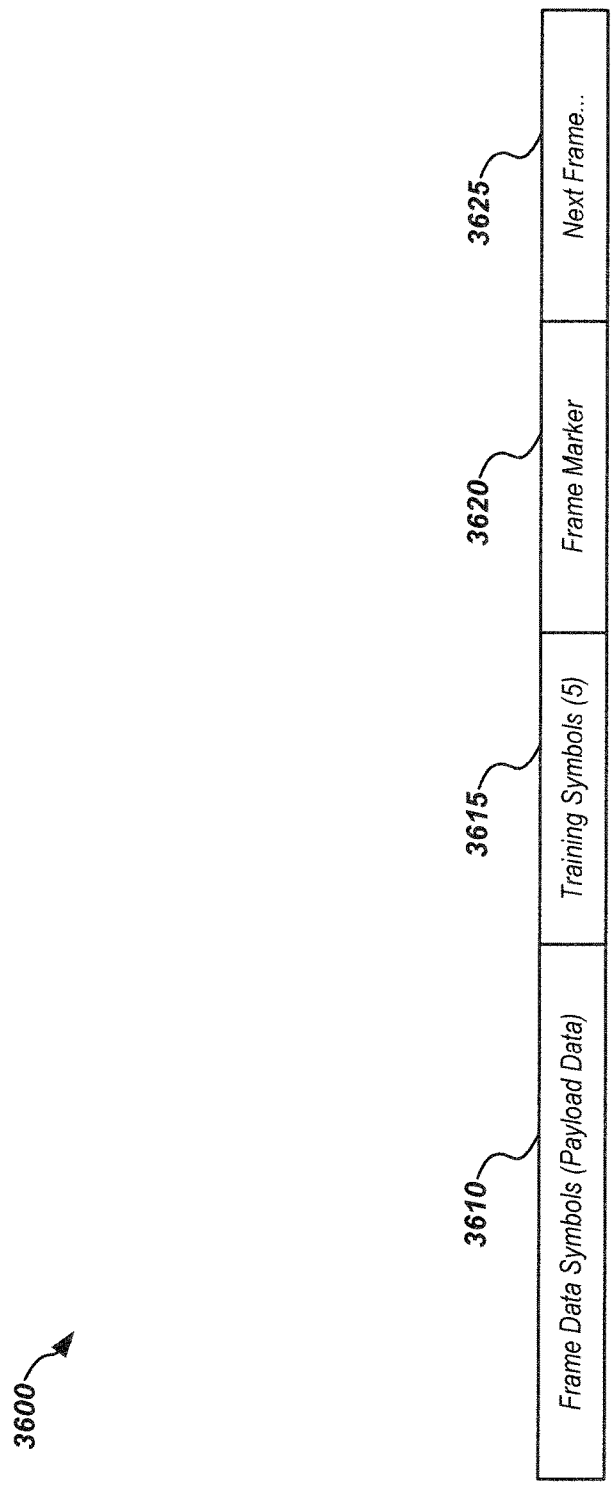
FIG. 36 illustrates an embodiment 3600 of a frame structure for a QAM transmit signal.

FIG. 36 illustrates an example output signal spectrum including finite energy 3610 at the symbol clock frequency, such as may be generated by embodiments using a symbol constellation such as shown in FIGS. 27-32.

Figure 35:
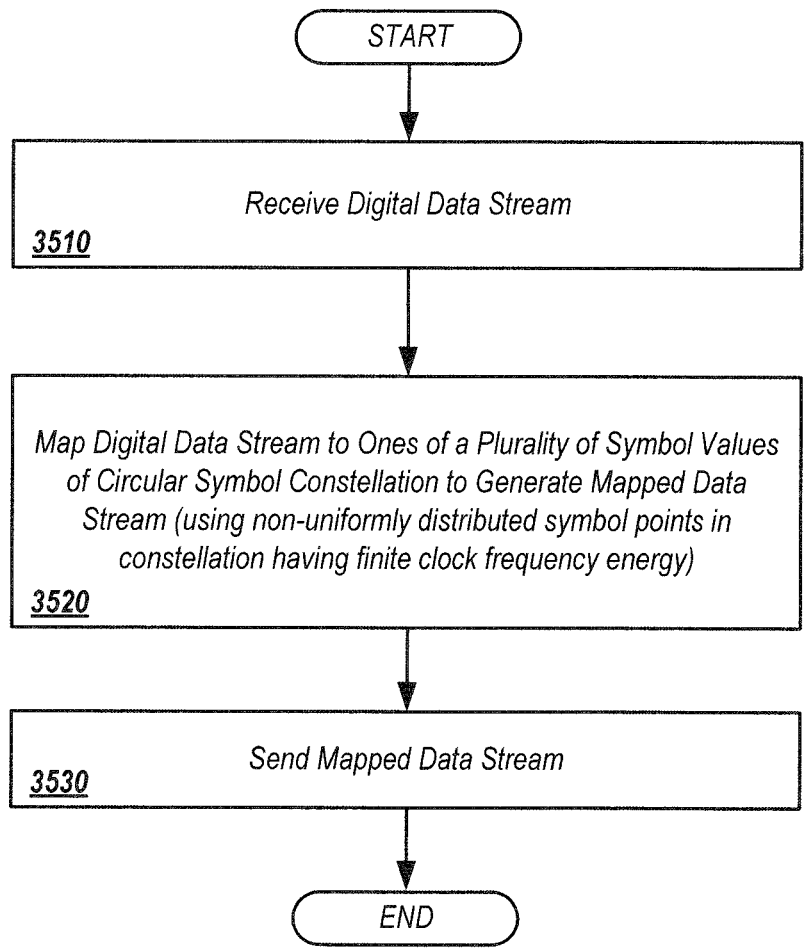
FIG. 35 illustrates an embodiment of a process for generating a QAM output signal having finite clock frequency energy.

FIG. 35 illustrates an embodiment of a process for providing a self-synchronizing Quadrature Amplitude Modulation (QAM) signal. At stage 3510, a digital data stream may be received. At stage 3520, the digital data stream may be mapped to ones of a plurality of symbol values corresponding to points on a circular symbol constellation including orthogonal I and Q axes, to generate a mapped data stream. The points defining the circular symbol array may be non-uniformly spaced such that the mapped data stream has finite energy at a symbol clock frequency. At stage 3530, the mapped data stream may be sent, such as to a receiver.

The circular symbol constellation may be, for example, a four point array defined on a circle, and two or more of the symbols may be non-uniformly spaced on the first circle. Alternately, the circular symbol constellation array may be an eight point array defined on a first circle, and two or more of the symbols may be non-uniformly spaced on the first circle. Alternately, the circular symbol constellation may be a sixteen point array and two or more symbols may be non-uniformly spaced on one or more circles of the array. Alternately, the circular symbol constellation may be a sixty four point array and two or more symbols may be non-uniformly spaced on one or more circles of the array. Alternately, the circular symbol constellation a one hundred twenty eight point array and two or more symbols may be non-uniformly spaced on one or more circles of the array. Alternately, the circular symbol constellation may be a two hundred fifty six point array and two or more symbols may be non-uniformly spaced on one or more circles of the array. Alternately, the circular symbol constellation may be a five hundred twelve point array and two or more symbols are non-uniformly spaced on one or more circles of the array.

The circular symbol constellation may include, for example, two or more circles with symbols disposed thereon. Two or more of the symbols may be non-uniformly spaced on ones of the two or more circles of the array. The circular symbol constellation may include a first and a second circle. The digital data stream may be mapped to points on the first circle and the second circle. A portion of the digital data may be further mapped to ones of a plurality of symbol values corresponding to points on a rectangular symbol constellation.

The process 3500 may further include, for example, receiving the transmitted signal, recovering a symbol clock signal from the received transmitted signal, and decoding the received transmitted signal using the recovered symbol clock.

The recovering the symbol clock may, for example, include narrowband filtering the received transmitted signal and applying the output of the narrowband filter to a phase-locked loop to generate the symbol clock.

An Example Pipe Inspection System Embodiment

Advantageously, QAM systems and methods as described herein may be embodied in a video transmitter to send high definition video signal up a pipe-inspection system cable to a video receiver. This QAM video signal does not interfere with data link and other cable uses in the pipe-inspection system. For example, the QAM video signal does not use bandwidth near 32 kHz or 512 Hz, so it does not suffer from interference from the system's sonde (512 Hz) or tracer frequency (32,768 Hz). This embodiment provides performance superior to a standard NTSC signal, which is degraded by the cable, offers less picture quality, and interferes with sonde and/or tracer operation.

Figure 17:
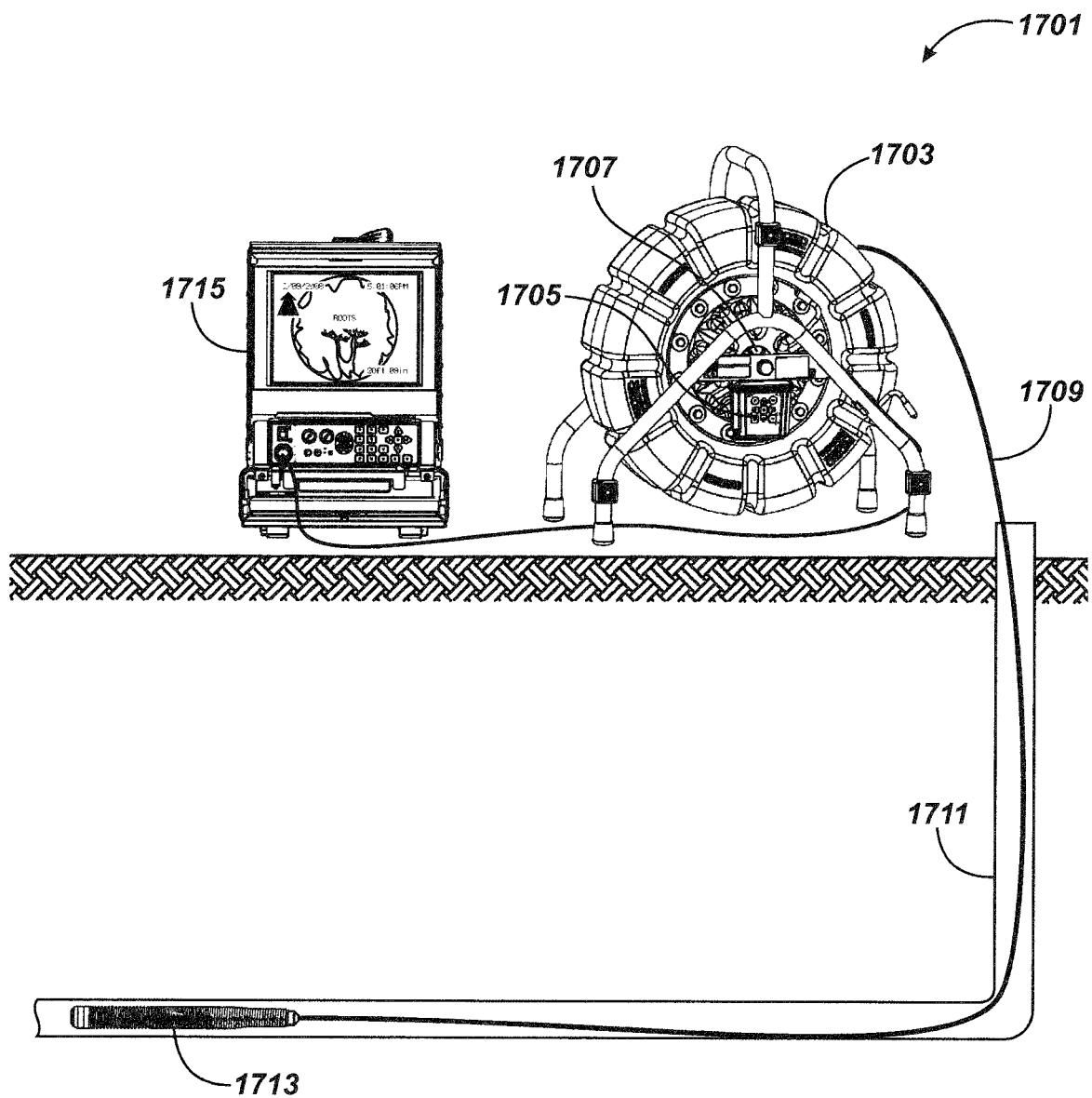
FIG. 17 is a perspective diagram illustrating an exemplary embodiment of a pipe mapping system of this invention incorporating the data transfer system of this invention.

FIG. 17 is a perspective diagram illustrating an exemplary pipe inspection system embodiment 1701 incorporating the data transfer system and method of this invention. Referring to FIG. 17, a pipe inspection system 1701 includes a camera head 1713 operatively connected to the distal end of a push-cable 1709. The proximal end of the push-cable 1709 is operatively connected to a cable-counter and user interface panel 1705 through a slip-ring assembly 1707. Examples of suitable constructions for the camera head 1713 are disclosed in U.S. Pat. No. 6,831,679 entitled "Video Camera Head with Thermal Feedback Control," granted to Mark S. Olsson et al. on Dec. 14, 2004, and in U.S. patent application Ser. No. 10/858,628 entitled "Self-Leveling Camera Head," of Mark S. Olsson filed Jun. 1, 2004, the entire disclosures of which are hereby incorporated by reference. Push-cable constructions and termination assemblies suitable for use in connecting the proximal and distal ends of a push-cable are disclosed in U.S. Pat. No. 5,939,679 entitled "Video Push Cable" granted Aug. 17, 1999 to Mark S. Olsson, U.S. Pat. No. 6,958,767 entitled "Video Pipe Inspection System Employing Non-Rotating Cable" granted Oct. 25, 2005, to Mark S. Olsson et al., U.S. patent application Ser. No. 12/371,540 filed Feb. 13, 2009 entitled "Push-Cable for Pipe Inspection System," and U.S. Patent Application Ser. No. 61/152,947 filed Feb. 16, 2009 by Mark S, Olsson et al. entitled "Pipe Inspection System with Replaceable Cable Storage Drum," the entire disclosures of which are hereby incorporated by reference. In FIG. 17, a reel 1703 holds coils of the push-cable 1709. The push-cable 1709 is paid out from reel 1703 to force camera head 1713 down pipe 1711. Examples of a suitable reel 1703 and push-cable 1709 are disclosed in the aforementioned U.S. Pat. No. 6,958,767. Within the reel 1703, a slip-ring assembly 1707 provides rotary signals to an associated circuit board (not shown) which enables them to be translated into digital measurements of distance traversed by the push-cable 1709 based on the rotation of the drum. One example of a suitable slip ring assembly is disclosed in U.S. Pat. No. 6,908,310 entitled "Slip Ring Assembly with Integral Position Encoder," granted Jun. 21, 2005, to Mark S. Olsson et al., the entire disclosure of which is hereby incorporated by reference. The camera head 1713 with its on-board circuitry transmits image information through embedded conductors such as wires in the push-cable 1709. A display unit 1715 shows the updated field of view (FOV) image from the camera head 1713 with an overlay indicating the distance down-pipe and the direction of travel based on the values transmitted from the slip ring assembly 1707. Circuit boards within the user-interface assembly 1705 provide memory and processing, user information display and input controls.

Figure 18:
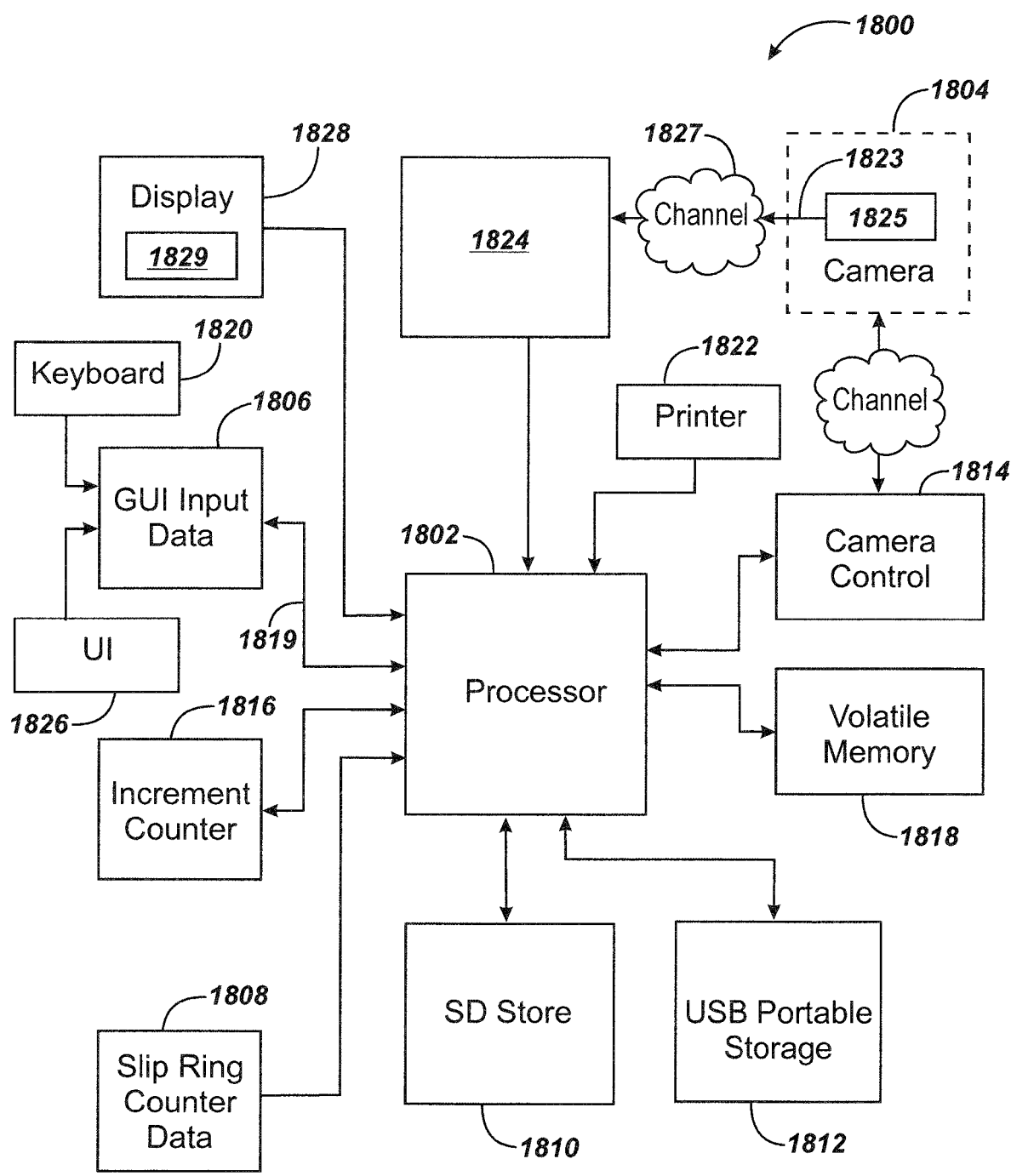
FIG. 18 is a block diagram illustrating the electronic portion of the system of FIG. 17 using a method for transferring a video signal through the signal channel that processes the flow of image data, camera control data, distance counter data, user interface data, and display information.

Turning now to FIG. 18, the electronic portion 1800 of pipe inspection system 1701 includes a central processor 1802 associated with a volatile memory 1818, which receives input data 1819 from a user interface 1806, a slip-ring counter 1808, a remote video camera 1804 including a video transmitter 1825, which incorporates the elements of QAM data transmitter 302 substantially as shown in FIG. 4 and operating substantially as discussed above. Video transmitter 1825 providing a video signal 1823 representing image data passing through a signal channel 1827 to a video receiver 1824, which incorporates the elements of QAM data receiver 304 substantially as shown in FIG. 4 and operating substantially as discussed above. Signal channel 1827 is embodied as one or more electrical conductors disposed within push-cable 1709 (FIG. 17). Central processor 1802 is also associated with camera control circuitry 1814, a system graphical user interface (GUI) 1826, and a keyboard 1820. The central processor 1802 sends output signals to the camera control 1814, volatile memory 1818, SD card storage 1810, USB portable (thumb drive) storage 1812, and the user GUI 1826 with its associated display 1828, which also displays images 1829 responsive to video signal 1823 arriving at video receiver 1824 upon proper user or software command. The transfer of image and other data may be automated through firmware programming or initiated from the GUI 1826 using on-board key presses, or by means of the keyboard 1820. Algorithmic options in the firmware may permit parameters such as distance interval between image captures, for example, to be set to default values in automatic operation or to be set to user selected values using menu options exercised through UI 1826 or keyboard 1820.

Figure 19:
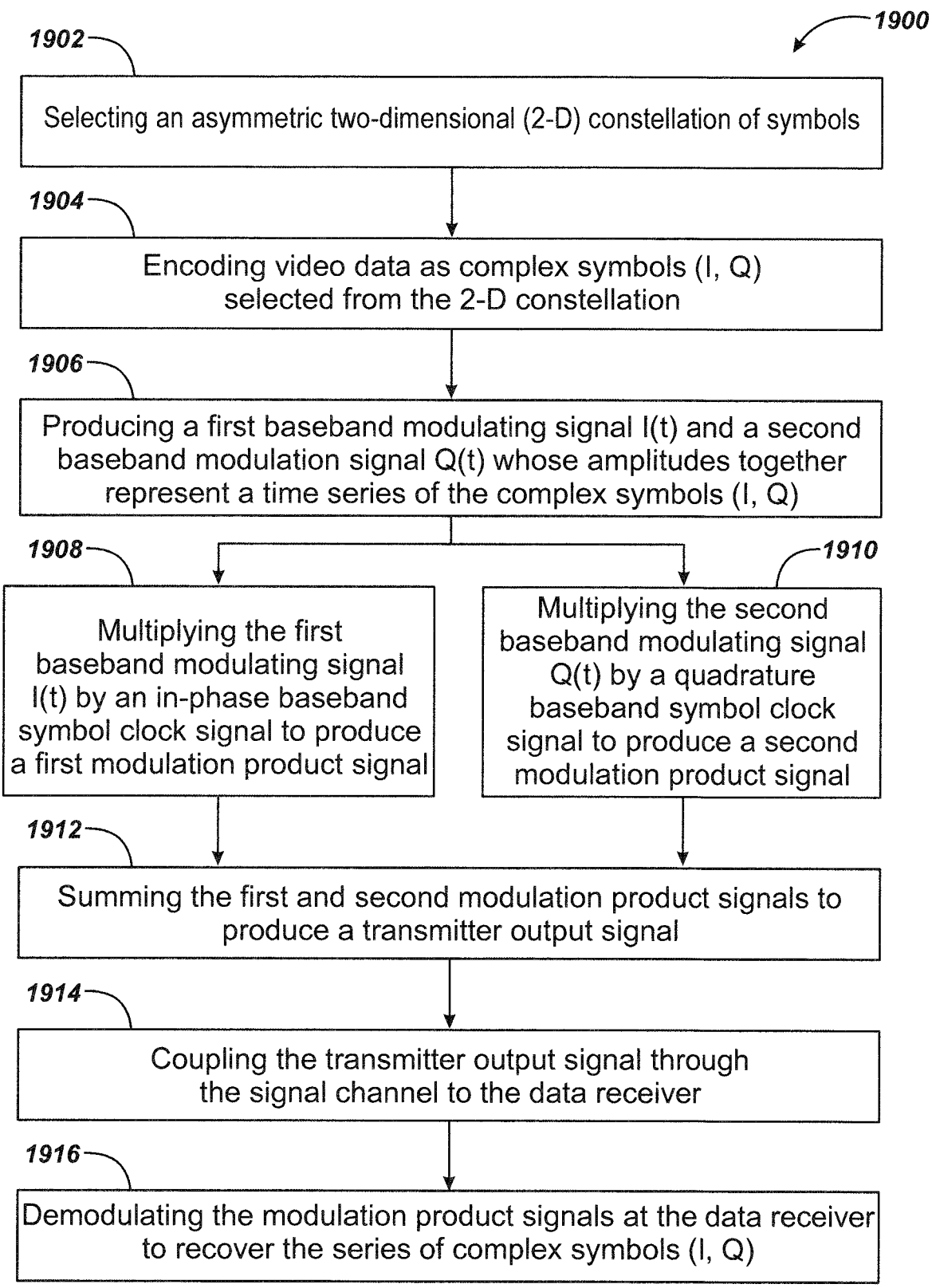
FIG. 19 is a flowchart illustrating an exemplary method of this invention for transferring a video signal through signal channel in a pipe inspection system of FIG. 17.

FIG. 19 is a flowchart illustrating an exemplary method 1900 of this invention for transferring video signal 1823 through signal channel 1827 in electronic portion 1800 of pipe inspection system 1701. Method 1900 begins at the step 1902 by first selecting a two-dimensional (2-D) constellation of symbols distributed on the phase plane asymmetrically about the origin, such as constellation 400 or constellation 500 discussed above in connection with FIGS. 5A-B, for example. Next, at the step 1904, the video signal data are encoded as complex symbols (I, Q) selected from the 2-D constellation, and, in the step 1906, first and second baseband modulating signals I(t) and Q(t) are produced, whose amplitudes together represent the time series of complex symbols (I, Q) and at least one of the baseband modulating signals has a substantially non-zero mean amplitude. Then, in the step 1908, the first baseband modulating signal I(t) is multiplied by an in-phase baseband symbol clock signal to produce a first modulation product signal as, in the step 1910, the second baseband modulating signal Q(t) is multiplied by a quadrature baseband symbol clock signal to produce a second modulation product signal. In the step 1912, the first and second modulation product signals are summed to produce a transmitter output signal, which is coupled through the signal channel to the data receiver in the step 1914. Finally, in the step 1916, the two modulation product signals are demodulated at the data receiver to recover the series of complex symbols (I, Q), thereby facilitating recovery of the video signal data (not shown).

Additional Example Embodiments

Various additional embodiments may be implemented based on the above-described symbol constellation and corresponding transmitter and receiver hardware and software elements. For example, one embodiment comprises a self-synchronizing communication system. The communication system may include, for example, a data transmitter which may include an input for accepting data, a Quadrature phase-shift keying (QPSK) encoder coupled to the data input for producing, responsive to the data, a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a substantially non-zero mean phase, a QPSK modulator coupled to the QPSK encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal, and an output for coupling the transmitter output signal to a signal channel. The communication system may further include a data receiver, including a signal input coupled to the signal channel for accepting the transmitter output signal, and a QPSK demodulator coupled to the signal input for recovering the series of complex symbols (I, Q) from the first and second modulation product signals.

The 2-D symbol constellation of the system may be, for example, circular symbol constellation, and the circular symbol constellation may be disposed asymmetrically about one of the two phase plane axes, such as one or both of an I and a Q axis. Alternately, or in addition, the 2-D symbol constellation may be a rectangular or other shaped symbol constellation. The signal channel may an electrical conductor, an optical fiber, or a free-space electromagnetic wave propagation path.

The system may further include in the data receiver, for example, a baseband symbol clock detector coupled to the signal input for detecting the first baseband symbol clock signal from the transmitter output signal, and a baseband symbol clock recovery oscillator coupled to the baseband symbol clock detector for producing a recovered baseband symbol clock signal synchronized with the first baseband symbol clock signal.

Another embodiment may implement a communication system for transferring data through a signal channel to a data receiver, with the system including a data transmitter. The data transmitter may include, for example, an input for accepting data, a Quadrature phase-shift keying (QPSK) encoder coupled to the data input for producing, responsive to the data, a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a phase representation that is substantially non-uniformly distributed about a phase circle, a QPSK modulator coupled to the QPSK encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal whose summation produces a substantially circular phase constellation, and an output for coupling the transmitter output signal through the signal channel to the data receiver.

The 2-D symbol constellation may be circular and may be disposed asymmetrically about one of the two phase plane axes, such as I and Q axes. Alternately, or in addition, the 2-D symbol constellation may be a rectangular or other shaped symbol constellation. The signal channel may an electrical conductor, an optical fiber, or a free-space electromagnetic wave propagation path.

Another embodiment may implement a remote inspection system including a video transmitter coupled through a signal channel to a video receiver and a corresponding method for transferring a video signal through the signal channel. The method may include, for example, encoding the video data to produce a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a phase representation that is substantially non-uniformly distributed about a phase circle, multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, summing the first and second modulation product signals to produce a transmitter output signal whose summation produces a substantially circular phase constellation, coupling the transmitter output signal through the signal channel to the data receiver, and demodulating the first and second modulation product signals at the data receiver to recover the series of complex symbols (I, Q).

The 2-D symbol constellation may, for example, be circular and may be disposed non-uniformly about one of the two phase plane axes. Alternately, or in addition, the 2-D symbol constellation may be a rectangular or other shaped symbol constellation. The signal channel may an electrical conductor, an optical fiber, or a free-space electromagnetic wave propagation path.

The method may further include, for example, detecting the first baseband symbol clock signal from the transmitter output signal at the video receiver, and producing a recovered baseband symbol clock signal that is synchronized with the first baseband symbol clock signal at the video receiver.

Another embodiment may implement a remote inspection system including a video transmitter coupled through a signal channel to a video receiver and a data modulator in the video transmitter for transferring a video signal through the signal channel. The data modulator may include, for example, an input for accepting data, a Quadrature phase-shift keying (QPSK) encoder coupled to the data input for producing, responsive to the data, a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a phase representation that is substantially non-uniformly distributed about a phase circle, and a QPSK modulator coupled to the QPSK encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the phases of the first and second baseband symbol clock signals are generally fixed in quadrature, and for summing the first and second modulation product signals to produce a transmitter output signal whose summation produces a substantially circular phase constellation.

The 2-D symbol constellation of the modulator may be, for example, circular and may be substantially non-uniformly distributed about one of the two phase plane axes. Alternately, or in addition, the 2-D symbol constellation may be a rectangular or other shaped symbol constellation. The signal channel may an electrical conductor, an optical fiber, or a free-space electromagnetic wave propagation path.

Another embodiment may implement a remote inspection system that may include a video transmitter. The video transmitter may include, for example, a video camera for producing video data, and a Quadrature phase-shift keying (QPSK) module coupled to the video camera. The QPSK module may include a symbol encoder coupled to the video camera for producing, responsive to the video data, a first baseband modulating signal I(t) and a second baseband modulating signal Q(t) whose phases together represent a time series of complex symbols (I, Q) each selected from a two-dimensional (2-D) constellation of symbols distributed on the phase plane about the origin such that at least one of the baseband modulating signals has a phase representation that is substantially non-uniformly distributed about a phase circle, a QPSK modulator coupled to the QPSK encoder for multiplying the first baseband modulating signal I(t) by a first baseband symbol clock signal to produce a first modulation product signal and multiplying the second baseband modulating signal Q(t) by a second baseband symbol clock signal to produce a second modulation product signal, where the first and second baseband symbol clock signals are generally fixed in quadrature, a summer circuit coupled to the QPSK modulator for summing the first and second modulation product signals to produce a transmitter output signal whose summation produces a substantially circular phase constellation, and a signal output for coupling the transmitter output signal to a signal channel. The system may further include a video receiver, which may include a video signal input coupled to the signal channel for producing a receiver input signal responsive to the transmitter output signal, a QPSK demodulator coupled to the video signal input for recovering the video data from the receiver input signal, and a video display coupled to the QPSK demodulator for producing images responsive to the video data.

The 2-D symbol constellation of the transmitter may be circular and may be substantially non-uniformly distributed about one of the two phase plane axes. Alternately, or in addition, the 2-D symbol constellation may be a rectangular or other shaped symbol constellation. The signal channel may an electrical conductor, an optical fiber, or a free-space electromagnetic wave propagation path.

The video receiver may include a baseband symbol clock detector coupled to the video signal input for detecting the first baseband symbol clock signal from the receiver input signal, and a baseband symbol clock recovery oscillator coupled to the baseband symbol clock detector for producing a recovered baseband symbol clock signal synchronized with the first baseband symbol clock signal.

Another embodiment may implement a pipe inspection system with a video transmitter. The video transmitter may include, for example, a video camera adapted to produce video data, and a Quadrature phase-shift keying (QPSK) modulator coupled to the video camera, the modulator including a symbol encoder for producing, responsive to the video data, a first baseband modulating signal $I_T(t)$ and a second baseband modulating signal $Q_T(t)$ whose phases together represent a time series of complex transmitter symbols $(I_T, Q_T)$ each selected from a two-dimensional (2-D) constellation of symbols distributed on the phase plane about the origin such that at least one of the baseband modulating signals has a phase representation that is substantially non-uniformly distributed about a phase circle, a baseband symbol clock oscillator for producing first and second baseband symbol clock signals generally fixed in quadrature, a dual multiplier coupled to the symbol encoder and baseband symbol clock oscillator for multiplying the first baseband modulating signal $I_T(t)$ by the first baseband symbol clock signal to produce a first modulation product signal and for multiplying the second baseband modulating signal $Q_T(t)$ by the second baseband symbol clock signal to produce a second modulation product signal, a summer coupled to the dual multiplier for summing the first and second modulation product signals to produce a transmitter output signal whose summation produces a substantially circular phase constellation, and a filter coupled to the summer for producing a filtered transmitter output signal. The system may further include a mechanical cable assembly coupled to the video transmitter for urging the video transmitter through a pipe under inspection and including an electrical conductor coupled to the QPSK modulator for accepting the filtered transmitter output signal.

The system may further include, for example, a video receiver, and the video receiver may include a signal conditioner coupled to the electrical conductor for producing a baseband receiver input signal representing the filtered transmitter output signal, a QPSK demodulator coupled to the signal conditioner, where the QPSK demodulator includes a baseband symbol clock detector for detecting the first baseband symbol clock signal from the baseband receiver input signal, a baseband symbol clock recovery oscillator coupled to the baseband symbol clock detector for producing a first recovered baseband symbol clock signal generally synchronized with the first baseband symbol clock signal and for producing a second recovered baseband symbol clock signal generally fixed in quadrature with the first recovered baseband symbol clock signal, a dual multiplier coupled to the baseband symbol clock recovery oscillator for multiplying the baseband receiver input signal by the first and second recovered baseband symbol clock signals to produce first and second demodulation product signals, respectively, a dual filter coupled to the dual multiplier for producing, responsive to the first and second demodulation product signals respectively, first and second baseband demodulated signals, $I_R(t)$ and $Q_R(t)$, whose phases together represent a time series of complex receiver symbols ($I_R$, $Q_R$), and a decoder coupled to the QPSK demodulator for recovering the video data from the first and second demodulated signals, $I_R(t)$ and $Q_R(t)$. The system may further include a video display coupled to the QPSK demodulator for producing images responsive to the video data.

The 2-D symbol constellation of the system may be circular and disposed asymmetrically about one of the two phase plane axes, such as the I or Q axes. Alternately, or in addition, the 2-D symbol constellation may be a rectangular or other shaped symbol constellation. The signal channel may an electrical conductor, an optical fiber, or a free-space electromagnetic wave propagation path.

In another aspect, the QAM receiver in a video inspection system or other system may implement automatic tuning functionality using digital filters.

In an exemplary video inspection system, data signals, such as digitized video and/or audio and/or associated information, may be transmitted from a camera head to a camera controller or other processing, storage, and/or display device using a cable. The transmitted signal may include a data channel and associated training and frame marker signaling sent using a defined frame structure. In an exemplary frame structure, a fixed number of symbols may be transmitted as frame payload data followed by a frame trailer. The frame trailer may include a special signaling sequence, denoted as a "frame marker," and a fixed set of symbols denoted as a "training sequence." The frame marker may be sent as a specially allocated symbol or symbols ("also denoted as a "reserved symbol") that is used for defining a frame boundary or endpoint. The training symbols may be sent as a pre-defined, fixed sequence of symbols. The payload data may include data as well as error detection and correction information such as checksums for the data, etc.

In accordance with one aspect, the reserved symbol or symbols may be used in signaling only during a frame marker period. In this configuration, the frame marker is unique and cannot be a valid frame data symbol. In an exemplary embodiment, the frame marker may be allocated a time period equal to a multiple of data symbols. In one embodiment, the multiple may be five, in which case the effective symbol rate for the frame marker is one fifth the frequency of actual frame data.

FIG. 36 illustrates an example frame 3600 structure for one exemplary embodiment. Frame 3600 includes a payload data sub-frame 3610, which may be video, audio, and/or associated or additional data or information. The payload data sub-frame 3610 may be followed by a training symbol(s) sub-frame 3615, which may be followed by a frame marker sub-frame 3620. The subsequent frame begins with sub-frame 3625 which may be another payload data sub-frame.

In an exemplary embodiment, the training sequence may be a defined sequence of valid data symbols (i.e., any valid QAM symbols, but not the reserved symbol(s)). In one embodiment, the training sequence consists of five data symbols, to which no forward error correction (FEC) encoding is applied. In this way, the symbols are sent "in the clear" and can be readily decode by simply applying a standard QAM demodulation process without requiring synchronization to any applied FEC.

In implementing signaling as described above, the reserved symbol(s) may be unique symbol(s) added to any QAM symbol constellation and/or may be a non-uniformly spaced symbol or asymmetric symbol such as those shown in FIG. 20, 21, 22, 23, 24, 25, 28, 29, 30, or 31.

In implementing a corresponding receiver, video inspection systems provided by SeekTech, Inc., assignee of the instant application, implement four different tune quality metrics (also denoted as "tuning metrics") including:

(1) Frame Marker Recovery Rate—This metric is a measure of how frequently the frame marker is found where it is expected to be found (based on system timing).
(2) Tuning (Training) Symbol Quality—This metric is a measure of the absolute value of error in the training symbol sequence.
(3) Reed-Solomon Block Error Rate—This metric is an average number of Reed-Solomon blocks that could not be corrected because there were too many symbol errors in a single Reed-Solomon block.
(4) Reed-Solomon Word Error Rate—This metric is a measure of the number of symbols corrected in the Reed-Solomon blocks. This value is only valid if the corresponding Reed-Solomon block was properly corrected (i.e., there were not so many bad symbols that the block could not be corrected).

Each of these metrics is only helpful at certain states of tune. For example, the Frame Marker Recovery Rate is only useful when the state of tune is relatively poor. This is because the Frame Marker symbol is the easiest feature of the QAM frame to identify. Even at a relatively poor state of tune, a typical receiver can reliably spot the marker frame. So there will typically quickly come a point where the receiver is finding every frame marker, but may still be far away from proper data decode tuning.

Consequently, the metrics above are listed in the order they should normally be used in the receiver in signal detection and processing. As the tuning process is performed at the receiver, the receiver will begin by looking at the Frame Marker Recovery Rate until it saturates to its maximum value. Then it switches to the Tuning Symbol Quality metric and tries to drive that metric towards zero until it begins to get a significant number of Reed-Solomon blocks to be decoded correctly. The value of the Tuning Symbol Quality metric where this occurs varies somewhat by the QAM symbol rate and symbol order, however, it usually begins to occur when the Tuning Symbol metric is less than a predetermined value that is a function of the signaling parameters, such as training symbols, symbol sequence size and/or symbol values, symbol frequency, QAM order, or other parameters. In an exemplary embodiment as described herein, a value of 110 decimal may be used, however, the particular value used will be determined as a function of the particular signaling implementation and/or channel characteristics. Once a significant number of Reed-Solomon blocks are being decoded reliably, then the system may be switched to the Reed-Solomon Block Error Rate metric, with the processing attempting to drive that metric to zero. When zero or approximately zero failed Reed-Solomon blocks are reached, the processing may then be switched to the Reed-Solomon Word Error Rate metric. The processing may then attempt to minimize the average rate at which the corrupted data words are received, and thus need to be corrected.

When the Reed-Solomon Block Error Rate metric has reached a constant value of zero, there are no longer any corrupted symbols getting through FEC, and the transmitted data stream has been recovered without any errors. However, continuing to tune based on the number of corrupted words that require correction may be used to provide additional margin for channel deterioration before the data stream is once again corrupted.

Figure 37:
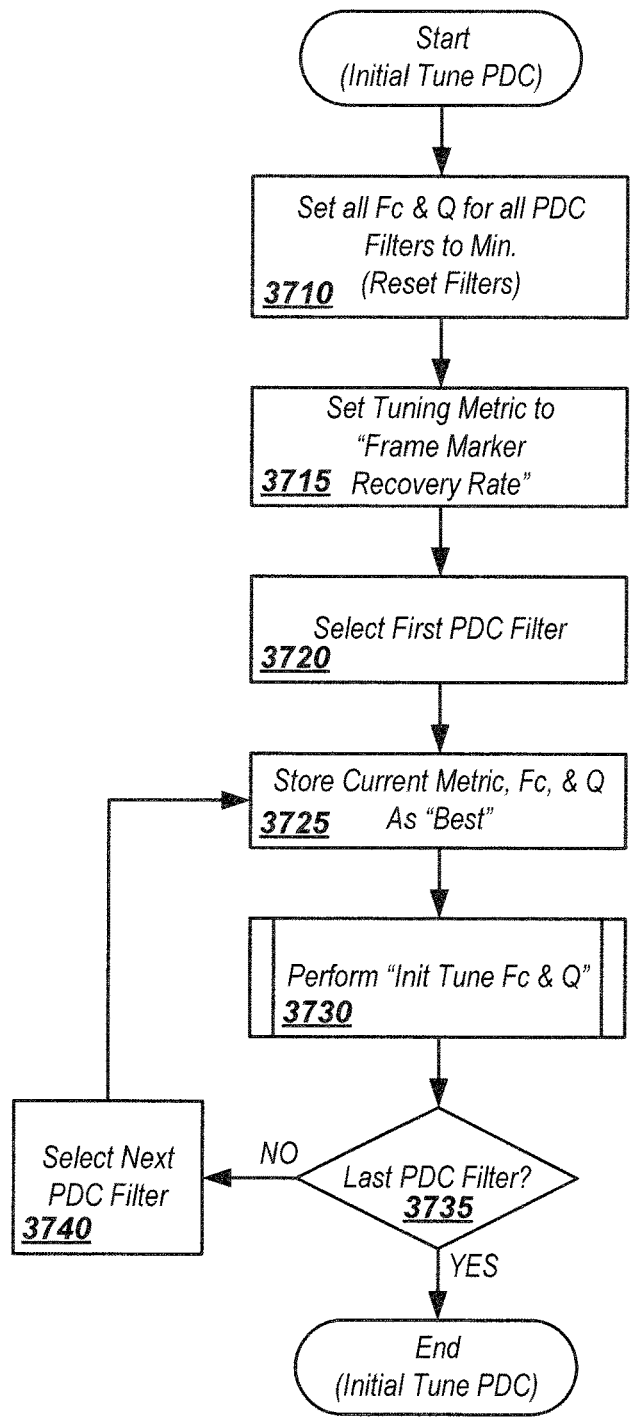
FIG. 37 illustrates details of an embodiment of an initial tuning sub-process 3700 in a digital filter QAM receiver.

As noted previously, non-linear phase (delay) distortion may be introduces in the transmission cable between the camera head and the camera controller/display device. Phase delay compensation (PDC) may be implemented in the receiver to correct for this distortion. In an exemplary embodiment, four PDCs are used and each PDC has two adjustment parameters, center frequency ($f_c$) and quality factor (Q). Each of these parameters are independent from each other and each of the phase delay compensation filters are independent of the others, resulting in a total of eight parameters that affect phase delay compensation. FIG. 37 illustrates details of an embodiment of a process 3700 for initial PDC tuning, and FIG. 38 illustrates details of a process embodiment 3800 for $f_c$ and Q adjustment.

Turning to FIG. 37, initial PDC tune process 3700 may begin at stage 3710, where the $f_c$ and Q filter values for all PDC filters are set to their minimum or reset values. At stage 3715, the tuning metric may be set to the "Frame Marker Recovery Rate" metric so as to optimize frame marker recovery. As noted previously, if a reserved symbol is used, this metric may be optimized using detection and processing of the reserved symbol(s). In the drawing figures, boxes marked with double bars on the sides represent sub-routine calls, or a process handshake in a parallel state machine-type implementation.

The process may proceed through each of the PDCs (e.g., four in the exemplary embodiment), with the first PDC filter selected at stage 3720. At stage 3725, the current tuning metric, $f_c$ and Q values may be stored as or marked "Best" value in memory. Initially, the tuning metric will be the Frame Marker Recovery Rate metric, but this may change during the initial tuning process for each PDC filter represented by stage 3730. At stage 3730, the sub-process of 3800 in FIG. 38 may be executed, which produces an initial tune of $f_c$ and Q for the currently selected PDC filter. A decision may be made at stage 3735 as to whether all of the PDC filters have been adjusted. If so, the process may end with initial tuning of all of the PDC filters complete. Alternately, the next PDC filter may be selected at stage 3740, and the process may be repeated at stage 3725 (which would save the newly selected PDC filter's initial $f_c$ and Q values as well a the current tuning metric value as the current "best" values).

Figure 38:
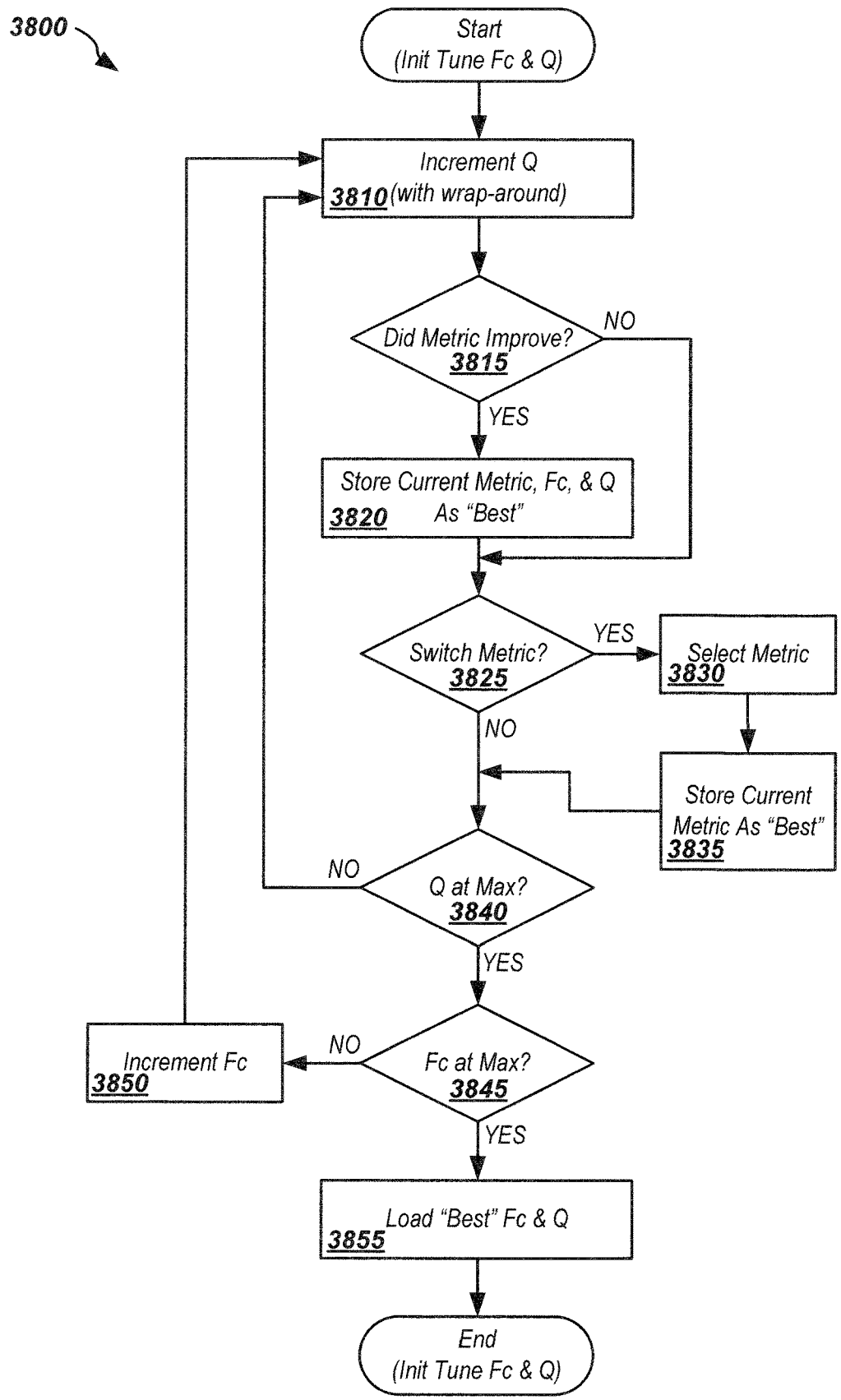
FIG. 38 illustrates details of an embodiment of an initial tuning sub-process 3800 in a digital filter QAM receiver.

Turning to FIG. 38, details of an initial PDC, $f_c$ and Q sub-process embodiment 3800 are illustrated. The entire sub-process of 3800 will typically be executed (from Start to End) each time the sub-process 3700 executes stage 3730. That is, 3810 through 3855 will be executed for each of the PDC Filters. Metrics may be cycled through using the ordering (1)-(4) as described previously herein. The $f_c$ and Q values from process embodiment 3800 may be initially used at the start of process 3800 (as shown herein, process 3700 may be the main "calling" process for each PDC filter and process 3800 the optimization process for a single PDC filter, then the current value for the center frequency and Q at stage 3810 would be the best tune so far for this PDC filter, and the values of that "best tuning metric" and corresponding [$f_c$,Q] for the currently selected PDC filter would already have been stored. Thus, the first action may be to move off of that "best tune so far" and see if this results in a better tune. This means that before stage 3810 is executed, the current PDC filter [$f_c$,Q] values would be at their minimum (or reset) values, but any "previous" PDC filters' [$f_c$,Q] values would be the best pair found by previous iterations of process 3800 on those previous filters).

At stage 3810, the Q setting may be incremented (with wrap-around incrementing when max values are incremented), and at stage 3815 a determination as to whether the tuning metric has been improved (it is noted that since we don't know what tuning metric will be selected each time step 3815 is evaluated, and the execution of step 3810 immediately preceeding step 3815 may have caused the selected tuning metric to change (either to a better or a worse metric). Thus, part of the evaluation of step 3815 may include taking into account which metric is now selected vs. which metric was stored as "best", not just the absolute value of the current metric vs. the absolute value of the stored "best" metric). If the metric has improved, the new metric may be stored at stage 3820, along with the $f_c$ and Q values, as a new reference or "best" value. If the metric has not improved, stage 3820 may be skipped, there is no change to the saved "best" values, and execution continues to stage 3825. At decision stage 3825, a decision may be made as to whether to switch metrics or not. The currently selected metric may be changed if a higher priority metric is now valid (in that case, stage 3830 should switch "up" to this better metric) or the currently selected metric is no longer valid (in that case, stage 3830 should switch "down" to the best metric that is currently still valid).

If metrics are to be switched, the next metric may be selected at stage 3830 and the current metric now selected may be stored at stage 3835 as the reference or best metric value. At stage 3840, a decision may be made as to whether the Q is at a maximum value. If not, processing may return to stage 3810, where Q may be incremented and processing continued to stage 3815. Alternately, processing may continue from stage 3840 to stage 3845, where a decision may be made as to whether the $f_c$ value is at a maximum. If not, processing may continue to stage 3850 where the $f_c$ value may be incremented and processing continued to stage 3810, where incrementing the Q will cause this to wrap around to the minimum Q value as the starting point to evaluate using the newly incremented $f_c$. Alternately, processing may continue to stage 3855, where the "best" or reference $f_c$ and Q values are loaded and used for currently selected PDC filter. At this point, the initial tuning of the currently selected filter is complete and initial tuning control resumes with stage 3735 of the sub-process of 3700. At this point, the initial tuning process may be completed, and the receiver should be getting proper data decode with a reasonable margin for degradation of the signal before errors begin to pass through the FEC processing section.

If either is not the case, the symbol frequency and/or symbol order (bit-width) may be changed accordingly and the initial tuning process repeated (the decision to change symbol frequency or symbol order and subsequent repetition of the initial tuning process is not explicitly illustrated in the figures). If there is a reasonable margin before errors begin to slip through the FEC processing, then the initial tuning process is complete and automatic tuning may change to a Fine Tuning Process stage.

In the Fine Tuning Process, the goal is to keep the receiver system at the optimum tune as the cable amplitude and/or phase responses change over time and from changes in the environment to which the cable is exposed. Fine tuning processing may be continuously done by cycling through the compensation filters and making minor adjustments to the parameters (in general, more than just the PDC filters may benefit from fine tuning adjustment, however, in the specific embodiments described herein, PDC filter tuning is provided as an example, where other fine tuning may be similarly implemented in different embodiments). If the optimum tuning point has moved, the parameters may be adjusted in response to the changes, which may be done before any degradation of the data stream is observable to a user.

In implementing fine tuning, each filter parameter may be offset from the current setting by a small amount in either direction from the "best" or reference value and a test made as to whether the tuning metric improves. If the system is properly decoding data, the current tuning metric should be the Reed-Solomon Word Error Rate (Metric (4) as described previously herein). If the change brings the tuning metric close to a point where the receiver is about to have uncorrected errors pass through, the metric should not be adjusted any further in that direction. As with the initial tuning process, the best setting should be restored to each parameter before proceeding to optimize another parameter.

Figure 39:
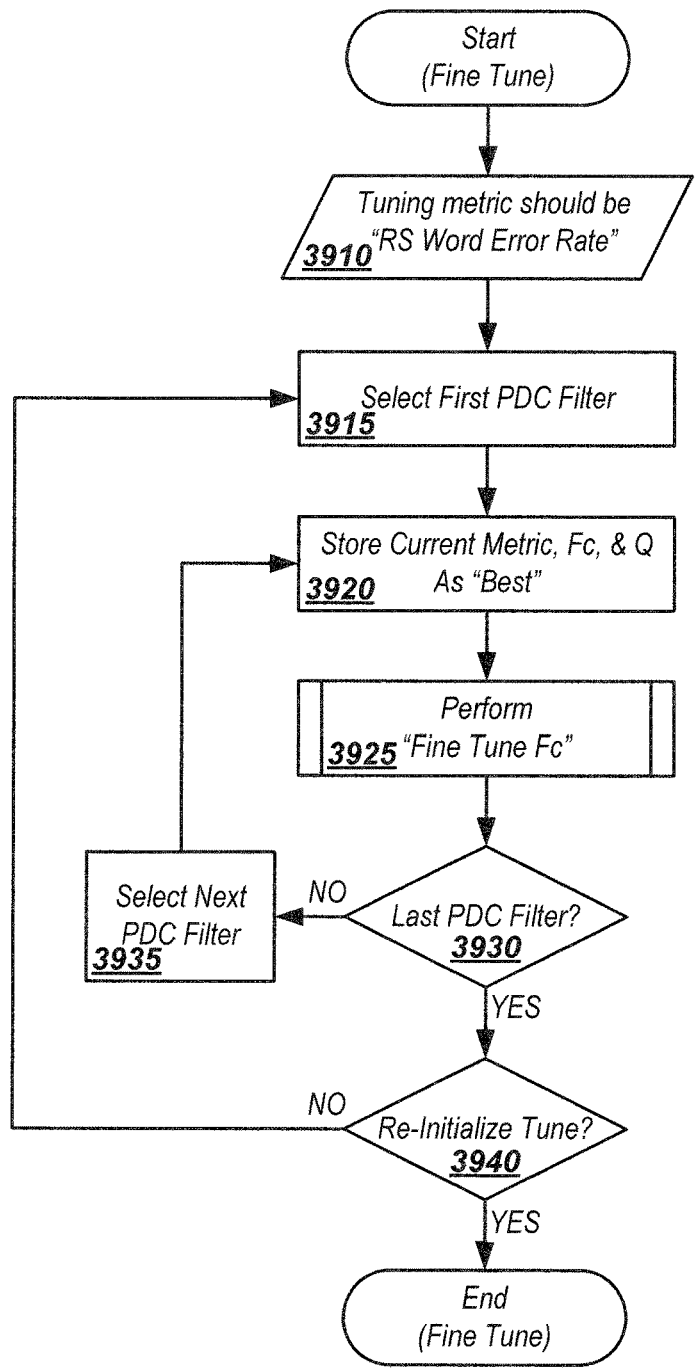
FIG. 39 illustrates details of an embodiment of a fine tuning process 3900 in a digital filter QAM receiver.
Figure 40:
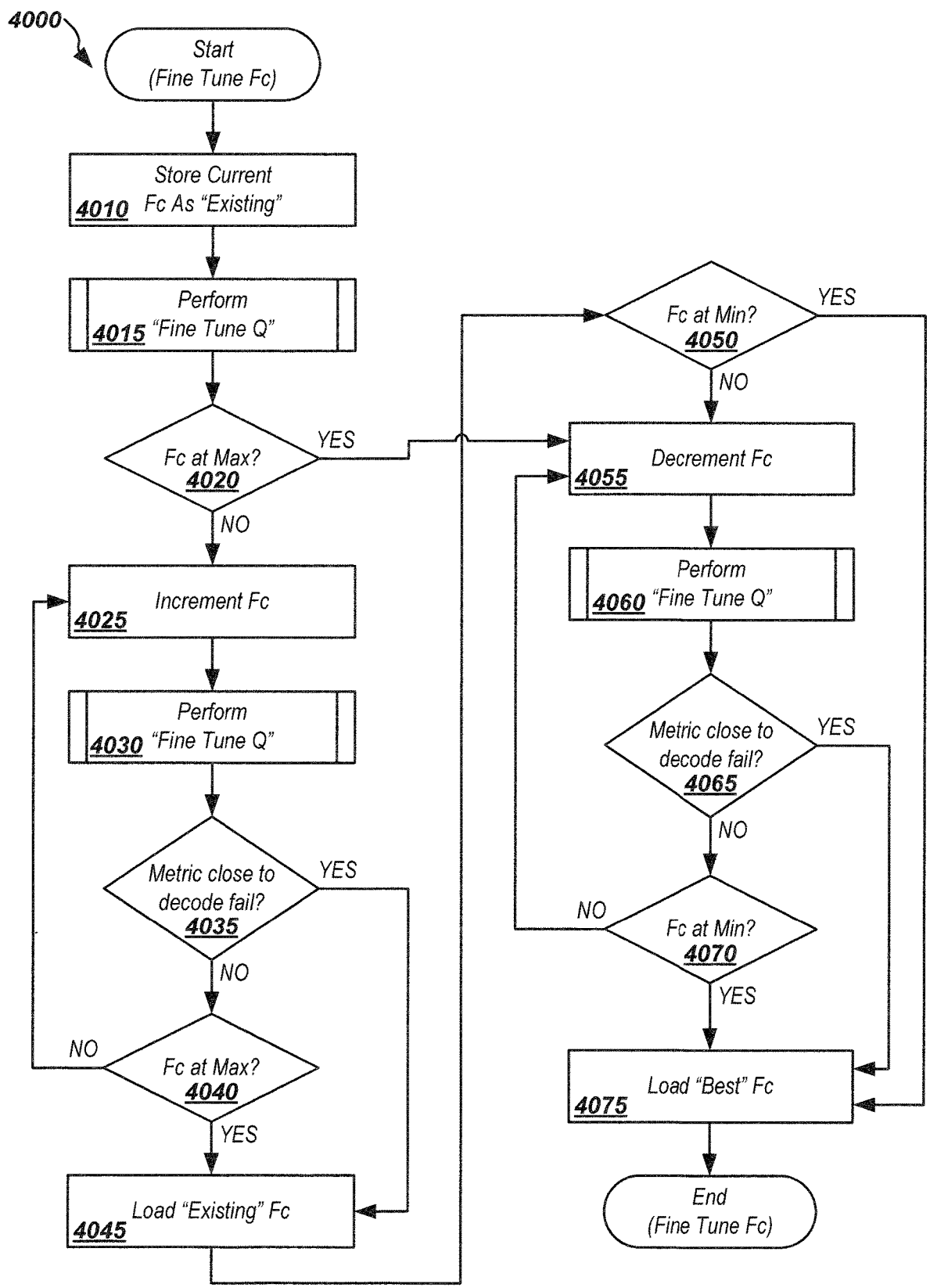
FIG. 40 illustrates details of an embodiment of a process 4000 for performing fine tuning of center frequency ($f_c$) in a digital filter QAM receiver.
Figure 41:
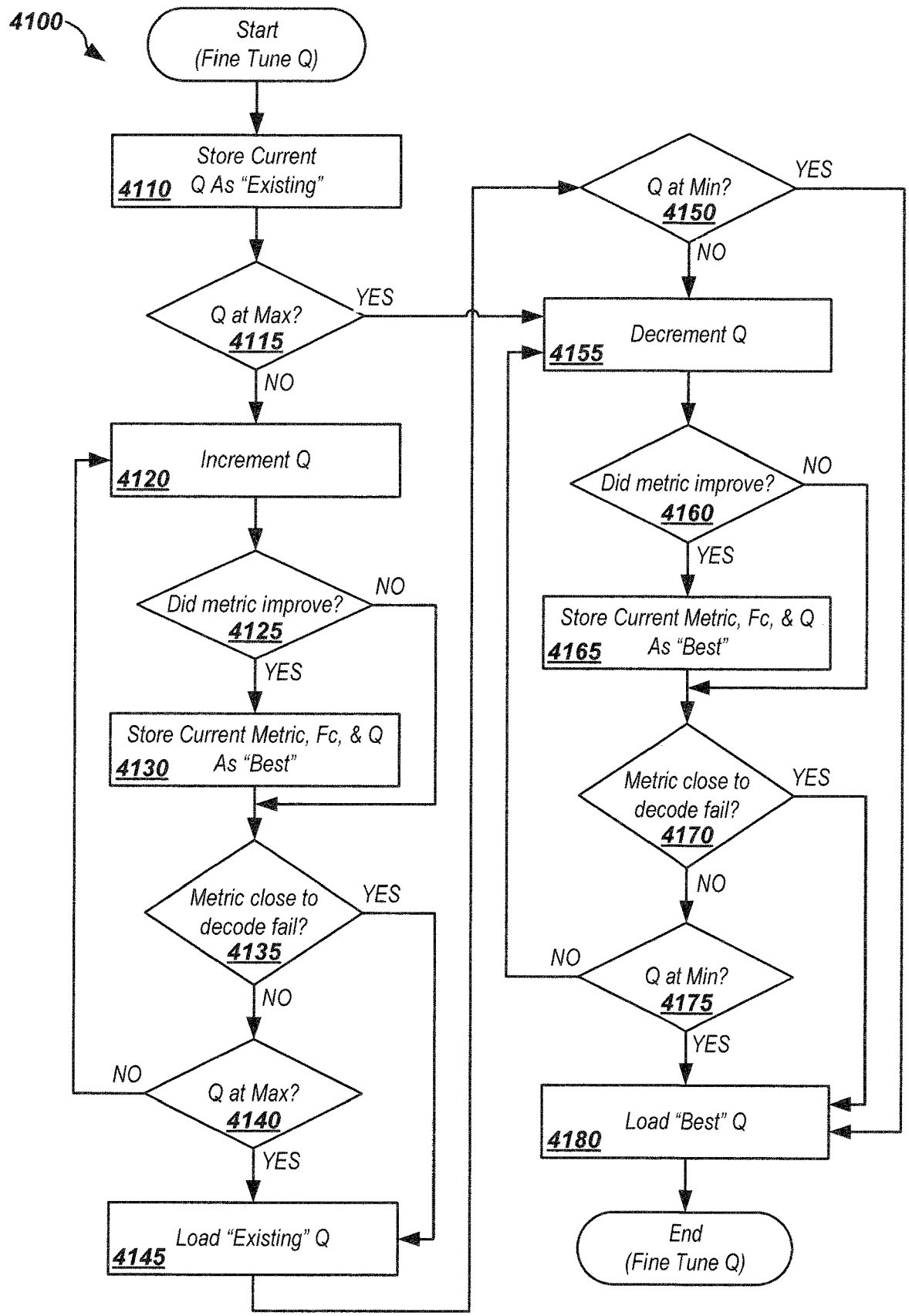
FIG. 41 illustrates details of an embodiment of a process 4100 for performing fine tuning of quality factor (Q) in a digital filter QAM receiver.

In an exemplary embodiment, the frequency compensation filter may be used only for gross amplitude compensation. This may be done since the processing to extract symbols from the QAM data stream typically automatically adjusts the amplitudes of the received QAM signal before symbol extraction, so that fine tuning for frequency compensation is automatically done. Since there is no need to fine tune the frequency compensation filter, the Fine Tuning Process may only perform tuning of the PDC filters. As noted previously, in an exemplary embodiment, four phase delay compensation filters may be used, with each one having center frequency ($f_c$) and quality factor (Q) as tuning parameters. An exemplary fine tuning process embodiment is shown subsequently in FIGS. 39, 40, and 41 as three sub-processes. FIG. 39 illustrates details of an embodiment of a Fine Tuning Process, FIG. 40 illustrates details of an embodiment of a Fine Tuning center frequency ($f_c$) sub-process, and FIG. 41 illustrates details of an embodiment of a Fine Tuning Quality (Q) factor sub-process. The tuning process may continue until a satisfactory tuning result is obtained or a time-out or other threshold occurs. If it becomes impossible to maintain error-free decoding using these example processes, the receiver may revert to the initial tuning processes described previously to determine where the tuning error occurred or during sudden system changes (e.g., the processes described herein may be beneficial during operation if, for example, the optimum tuning point suddenly moved too far away from the currently stored tuning settings, such as if a user changes a cable with a video inspection system turned on or if a dramatic change in the cable environment, such as crushing or damaging the cable). This is shown as stage 3940, "Re-Initialize Tuner," of FIG. 39. If the initial tuning process cannot fix the tuning stage, the symbol frequency and/or symbol order may be changed according to the initial tuning process, as described previously herein, and the initial tuning process restarted.

Turning to FIG. 39, Fine Tuning Process embodiment 3900 is illustrated. Process 3900 may begin at stage 3910, where it is confirmed that the tuning metric is still set to Reed-Solomon Word Error Rate, metric (4) as described previously, due to the initial tuning process having already been successfully completed. At stage 3915, the first of the plurality of PDC filters may be selected for tuning. At stage 3920, The current RS Word Error Rate metric, $f_c$ and Q values may be stored as or marked "Best" value in memory. At stage 3925, a fine tune of $f_c$ and Q may be done by executing the sub-process 4000 of FIG. 40, which in turn may execute the sub-process 4100 of FIG. 41 one or more times, and the resulting values stored in memory. A decision may be made at stage 3930 as to whether all of the PDC filters have been adjusted. If not, then the next filter is selected and the process is repeated starting at stage 3920. If all of the filters have been subject to a round of fine tuning, the process may proceed to the decision stage 3940. If fine tuning fails such that initial tuning should be re-done, such as if an adequate RS Word Error Rate metric cannot be obtained, then processing may return to the initial tuning process. Alternately, processing may continue to stage 3915 where pass through all of the PDC filters is performed by selecting the first filter again and proceeding through the fine tuning process again.

FIG. 40 illustrates details of an embodiment of a process 4000 for center frequency, $f_c$ fine tuning. At stage 4010, the current $f_c$ value may be stored as the "Existing" value. At stage 4015, Fine Tune Q processing may be implemented (such as described in process embodiment 4100 of FIG. 41). At stage 4020, a decision may be made as to whether $f_c$ is at a maximum value.

If $f_c$ is not at a maximum, $f_c$ may be incremented at stage 4025, and Fine Tune Q processing may be implemented at stage 4030. A decision stage 4035 may determine if the metric is close to a threshold decode fail value. If the metric is close to the decode fail threshold, processing may continue to stage 4045, where the existing $f_c$ value is loaded and execution continues to stage 4050. Alternately, if the metric is not close to the decode fail threshold at stage 4035, processing may continue to decision stage 4040, where a determination may be made as to whether $f_c$ is at a maximum. If not, processing may return to stage 4025 where $f_c$ may again be incremented. If $f_c$ is at a maximum at stage 4040, processing may continue to stage 4045 and then to stage 4050.

Alternately at stage 4020, if $f_c$ is determined to be a maximum, processing may continue to stage 4055, where $f_c$ is decremented. At stage 4060, the Fine Tune Q processing may be implemented and processing continued to decision stage 4065. If the metric is determined to be close to decode fail at stage 4065, processing may continue to stage 4075, where the "best" stored $f_c$ that was found during this round of fine tuning is loaded and the fine tuning of $f_c$ processing cycle ended. Alternately, if the metric is not close to decode fail at stage 4065, processing may continue to decision stage 4070, where a decision may be made as to whether $f_c$ is at a minimum. If not, processing may continue to stage 4055, where the $f_c$ value may again be decremented. If $f_c$ is at a minimum at stage 4070, processing may continue to stage 4075 where the $f_c$ value is loaded as the "best" or reference value and the fine tuning processing cycle ended.

FIG. 41 illustrates details of an embodiment of a corresponding process 4100 for quality factor, Q, fine tuning. At stage 4110, the current Q value may be stored as the "Existing" value. At stage 4115, a decision may be made as to whether Q is at a maximum value.

If Q is not at a maximum at stage 4115, Q may be incremented at stage 4120, and a decision stage 4125 may determine if the metric is the metric improved. If the metric has not improved, processing may continue to decision stage 4135. Alternately, if the metric is determined to have improved at stage 4125, processing may continue to stage 4130, where the metric, $f_c$, and Q may be stored as a "best" or reference value and processing continued to stage 4135. At decision stage 4135, a determination may be made as to whether the metric is close to a decode fail threshold. If it is close to fail, processing may continue to stage 4145, where the Q value is loaded as the existing value. If the metric is not close to decode fail at stage 4135, processing may continue to decision stage 4140, where a decision stage may be made as to whether Q is at a maximum value. If not, processing may return to stage 4120, where Q may be incremented. Alternately, if Q is at a maximum at stage 4140, processing may continue to stage 4145, where the Q value is loaded as the existing value, and processing may then continue to stage 4150.

At stage 4150, a determination may be made as to whether Q is at a minimum value. If it is, processing may proceed to stage 4180, where the Q value is loaded as the "best" or reference value. Alternately, at stage 4150, if Q is not at a minimum, processing may continue to stage 4155, where the Q value may be decremented and execution continue to decision stage 4160. At stage 4160, a determination may be made as to whether the metric improved. If it has, the current metric, $f_c$, and Q may be stored as a "best" or reference at stage 4165. If not, processing may continue from stage 4160 to decision stage 4170, where a determination may be made as to whether the metric is close to a decode fail threshold. If not, processing may continue to stage 4180, where the Q value is loaded as the "best" or reference value. Alternately, if the metric is not close to decode fail at stage 4170, processing may continue to decision stage 4175, where a determination may be made as to whether Q is at a minimum. If it is not, processing may return to stage 4155, where Q may again be decremented. If Q is at a minimum at stage 4175, processing may continue to stage 4180, where the Q value is loaded as the best or reference value.

Figure 42:
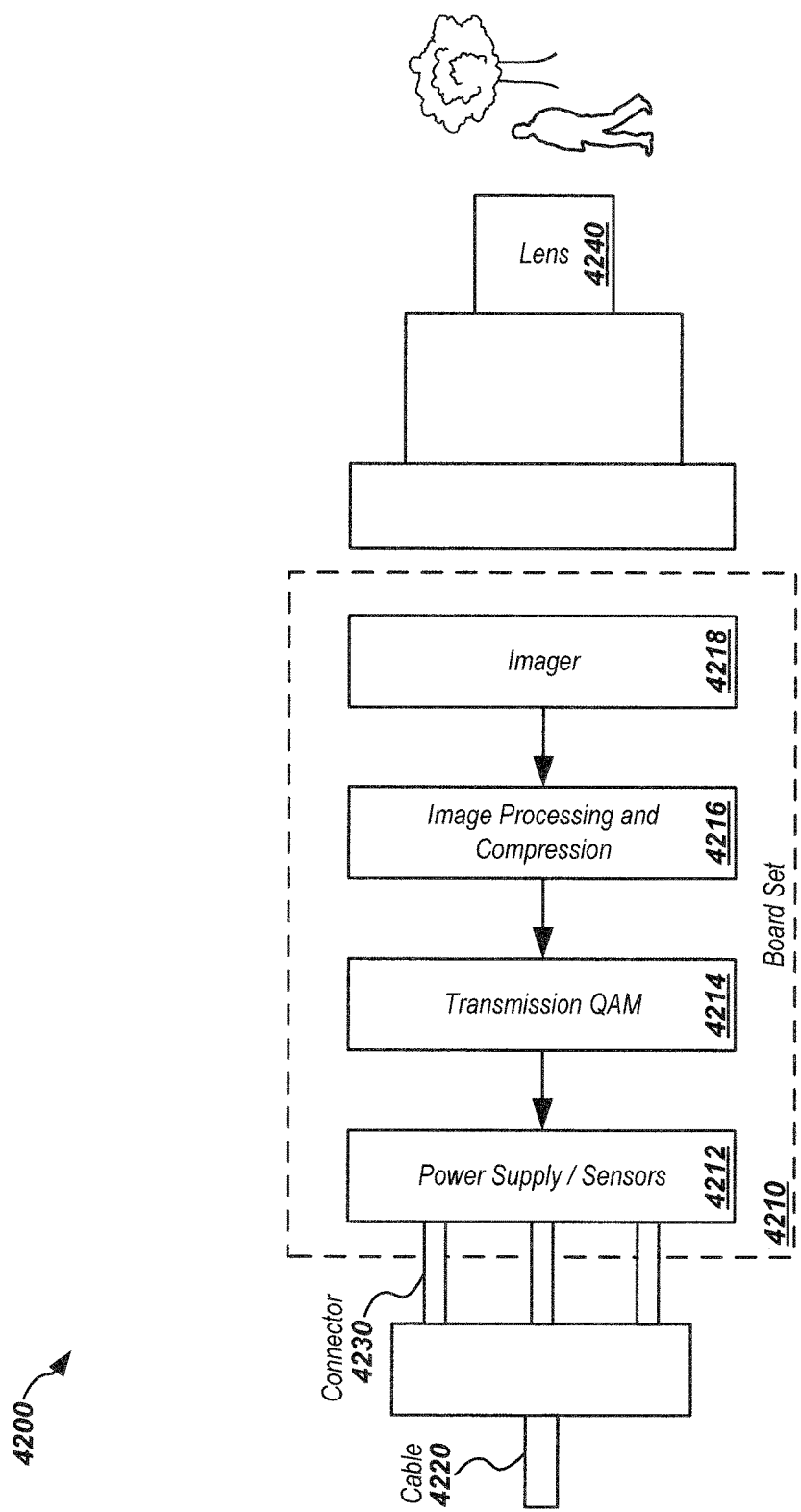
FIG. 42 illustrates details of an embodiment of a camera head including an image processing module and a QAM transmission module with an imager and imaging optics.

In another aspect, data compression, such as compression of video or images, may be implemented in a camera head in conjunction with a QAM transmitter module, such as a QAM transmitter module including signaling as described previously herein. In an exemplary embodiment, a video inspection camera head may be highly integrated, including signal processing and/or wired or wireless communication elements along with imaging optics, sensors, and associated elements such as power supplies and sensors. An example embodiment of such a compact, highly integrated camera head 4200 is shown in FIG. 42. Camera head 4200 may include optics such as one or more lenses 4220, associated mechanical support and/or focusing structures (not shown) and an impact-resistant, waterproof housing (not shown) in which electronics, in one or more printed circuit boards of a board set 4210, may be enclosed. The circuit boards may include an imager board 4218 on which one or more imaging elements may be mounted to receive light from a lens 4240 and generate an analog or digital video signal. The images board 4218 or other boards of board set 4210 may include other sensors, such as motion sensor such as accelerometers, compass sensors, magnetometers, temperature sensors, humidity or water leakage sensors, pressure sensors, or other sensor devices (not shown). Video output from the imager board 4218 may be provided to an image processing and compression board 4216, which may include one or more processing elements. Images may be processed to adjust various characteristics such as orientation, zoom, sharpness, color balance, and the like, and may then be compressed for transmission via a wired (or in some embodiments wireless) communication channel, such as via a cable 4220 coupled to the camera head 4200 via connector 4230. A communications module 4214 may be included to generate a QAM signal for transmission over the cable 4220. Power supplies and/or sensors may be disposed on a power supply board 4212 to provide power and/or control, and/or sensor information, which may be included with the transmitted data.

In some configurations, the apparatus or systems described herein may include means for implementing features or providing functions described herein. In one aspect, the aforementioned means may be a module including a processor or processors, associated memory and/or other electronics in which embodiments of the invention reside, such as to implement QAM signal processing, transmitter, and receiver functions as described herein.

In one or more exemplary embodiments, the electronic functions, methods and processes described herein and associated with QAM transmitter and receiver functions may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer processor. By way of example, and not limitation, such computer-readable media can comprise RAM, ROM, SRAM, Flash, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged, omitted, and/or expanded upon while remaining within the spirit and scope of the present disclosure.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps or stages described in connection with the embodiments disclosed herein may be implemented in one or more processing elements or modules include electronic hardware, computer software, firmware, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to QAM transmitter and receiver functions may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module including instructions storable in memory for execution by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a compression module of a camera head, a QAM transmitter, a QAM receiver, and/or in other associated modules. In the alternative, the processor and the storage medium may reside as discrete components in a camera head, transmitter, and/or receiver.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the appended claims and their equivalents.

We claim:

1. A QAM system for use in a video pipe inspection system, comprising:
    a QAM transmitter including:
    a non-transitory memory;
    a processor operatively coupled to the non-transitory memory, the processor programmed to:
    receive a digital data stream comprising images or video from the non-transitory memory; and
    map the digital data stream to ones of a plurality of symbol values corresponding to points on a symbol constellation including orthogonal I and Q axes, to generate a mapped data stream; wherein the points are arranged in a non-uniformly spaced rectangular symbol constellation such that the mapped data stream has non-zero energy at a symbol clock frequency so as to facilitate clock recovery at an associated QAM receiver; and
    an output circuit to provide the mapped data stream signal to a wired communications channel.

2. The QAM system of claim 1, further including a corresponding QAM receiver to recover a symbol clock from the mapped data stream, comprising:
    a receiver front end circuit;
    a receiver non-transitory memory; and
    a receiver processor operatively coupled to the receiver non-transitory memory, the receiver processor programmed to:
    receive the mapped data stream representing the images or video;
    decode the symbol values to extract the images or video; and
    store the decoded symbol values in the receiver non-transitory memory.

3. The QAM transmitter of claim 1, wherein the symbol constellation is a constellation having a non-uniformly spaced rectangular configuration of symbol constellation size four by four or larger with energy at the symbol clock frequency.

4. A QAM data transmission system for use in a video pipe inspection system, comprising:
    a transmitter including:
    a non-transitory memory;
    a processor operatively coupled to the non-transitory memory, the processor programmed to:
    receive a digital data stream comprising images or video; and
    map the digital data stream to ones of a plurality of symbol values corresponding to points on a symbol constellation including orthogonal I and Q axes having uniformly spaced rectangular configuration with non-random symbol probabilities, to generate a mapped data stream having non-zero energy at a symbol clock frequency so as to facilitate clock recovery at an associated QAM receiver; and
    an output circuit to provide the mapped data stream signal to a wired communications channel; and
    a receiver including: a receiver front end circuit;
    a receiver non-transitory memory;

a receiver processor operatively coupled to the receiver non-transitory memory, the receiver processor programmed to:

receive the mapped data stream representing the images or video;

decode the symbol values to extract the images or video; wherein the mapped data stream has non-zero energy at the symbol clock frequency; and store the decoded symbol values in the receiver non-transitory memory.

5. The system of claim 4, wherein the symbol constellation is a square constellation having non-random symbol probabilities and a symbol constellation of size four by four or larger.

* * * * *